Patented Mar. 7, 1950

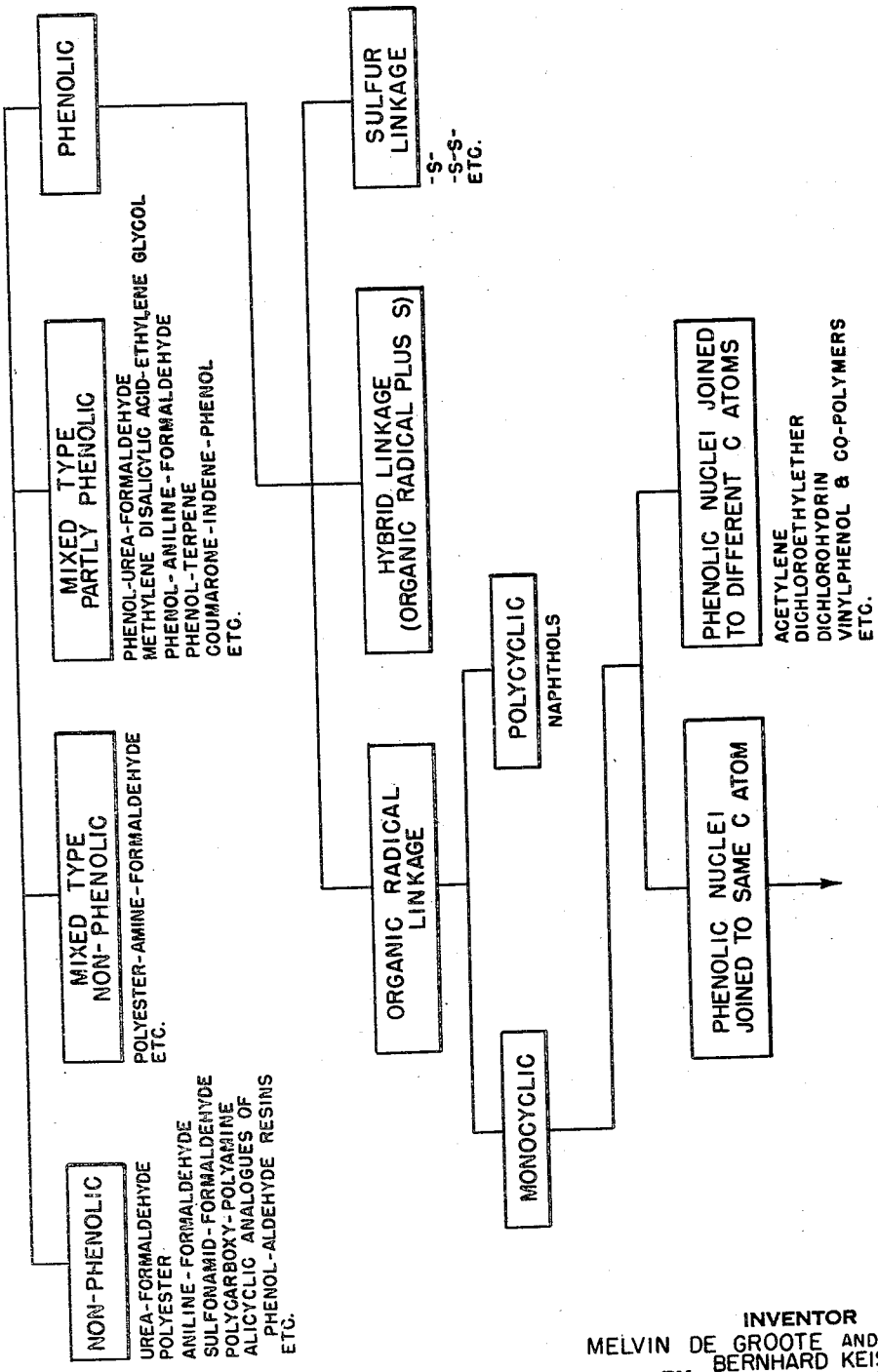

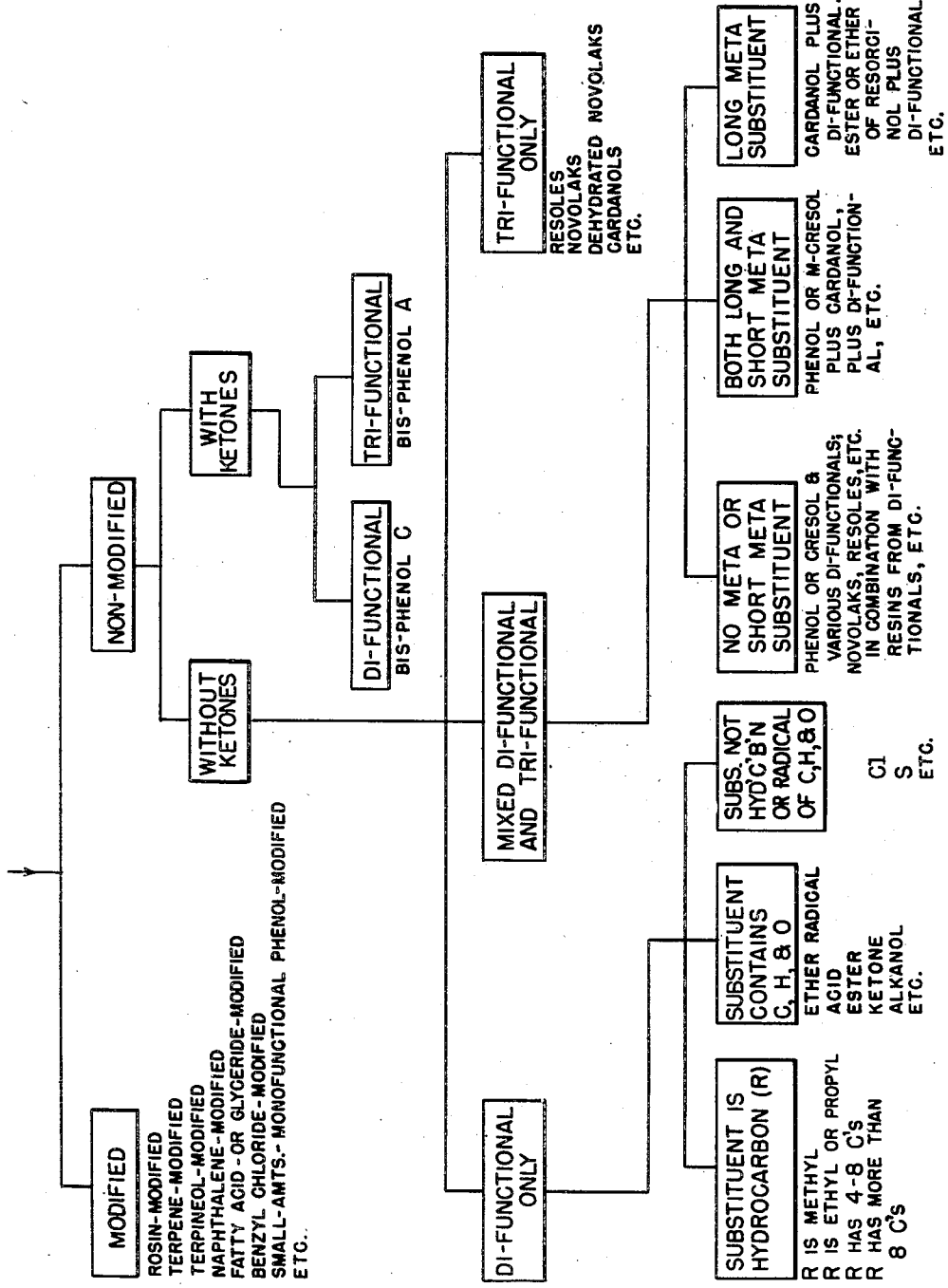

2,499,365

UNITED STATES PATENT OFFICE 2,499,365

CHEMICAL MANUFACTURE

Melvin De Groote, University City, and Bernhard Keiser, Webster Groves, Mo., assignors to Petrolite Corporation, Ltd., Wilmington, Del., a corporation of Delaware Application February 16, 1948, Serial No. 8,722
In Venezuela March 7, 1947

9 Claims. (Cl. 252—338)

This invention relates to processes and procedures particularly adapted for preventing, breaking, or resolving emulsions of the water-in-oil type, and particularly petroleum emulsions. This application is a continuation-in-part of co-pending applications Serial Nos. 518,660 and 518,661, filed January 17, 1944; Serial Nos. 666,816, 666,817, 666,818 and 666,821, filed May 2, 1946; Serial Nos. 727,282 and 727,283, filed February 7, 1947; and Serial Nos. 751,605, 751,610, 751,611 and 751,612, filed May 31, 1947, all now abandoned.

New chemical products or compounds, as well as the application of such chemical compounds, products, and the like, in various other arts and industries, along with methods for manufacturing said new chemical products or compounds which are of outstanding value in demulsification described herein are described and claimed in co-pending applications, Serial Nos. 751,611, 751,612, 751,620 and 751,623, filed May 31, 1947, all now abandoned.

Our invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

We have found that oxyalkylation-susceptible, fusible, organic solvent-soluble, water-insoluble resins, on oxyalkylation, and specifically, oxyethylation, yield products of unusual value for demulsification purposes provided that oxyalkylation is continued to the degree that hydrophile properties are imparted to the compound.

By "oxyalkylation-susceptible" we mean that the resin is capable of reacting with an alkylene oxide so that an alkyleneoxy radical or radicals is or are introduced into the resin molecule. Generally speaking, such reactive or labile hydrogen atoms are attached to nitrogen, oxygen, or sulfur, usually nitrogen or oxygen, as in resins having phenolic hydroxyl groups, amine or amido groups with nitrogen-linked hydrogen, alcoholiform hydroxyl groups, carboxy groups, or the like. There are some resins susceptible to oxyalkylation because of the presence of reactive ester radicals, as in certain products derived from olive oil. In any event, the resins used for the preparation of the products used in accordance with the invention must be capable of reaction with an alkylene oxide of the type hereinafter specified with introduction of oxyalkylene groups into the resin molecule.

By "fusible," we do not mean that the resin is thermoplastic in the sense in which that term is ordinarily applied to resins, namely, as identifying products which can be heated repeatedly without losing thermoplasticity but rather that the resin is sufficiently fusible to permit processing to produce the oxyalkylated products without giving insoluble materials or causing insolubilization or gel formation or rubberiness. In other words the products must be capable of being melted or softened by heat but the fact that they may not be capable of repeated fusing is not sufficient to warrant rejection for use as intermediates.

The term "solvent-soluble" we use to differentiate between useful resins which are soluble in at least one of the large number of organic solvents which are available, and to indicate that the resin consists of separate molecules, as distinguished from resins which are soluble in no solvent, any fragment of which is regarded as consisting of substantially a single molecule. It is not necessary that the resin be soluble in more than one of the available solvents, as what is here involved is the essential structural characteristic of the resin, that is, that it consist of separate molecules, and solubility in any one of the large number of solvents available is adequate to bring the resin within the class of useful resins. Included among the solvents available for determining this property of the resins are the hydrocarbon solvents, both aromatic and paraffinic, the chlorinated solvents, oxygenated solvents, including alcohols, ketones, ethers, chloroethers, esters, amines, phenols, etc.

We use the term "water-insoluble" to exclude those resins which are water-soluble, or have no appreciable hydrophile properties, in other words, to exclude such water-soluble resins as are produced from resorcinol, for example, for use as adhesives. The term does not exclude resins which are water-insoluble but soluble in aqueous alkali or aqueous acid, for example, certain salicylic acid and amine-derived resins.

Attention is directed to thirteen co-pending applications:

(1) In respect to the use as demulsifying agents of oxyalkylated 2,4,6 hydrocarbon-substituted phenol-aldehyde resins with the proviso that the hydrocarbon substituent in the phenolic nucleus has 4 to 8 carbon atoms, we refer to our co-pending application for patent, Serial No. 727,282, filed February 7, 1947 (abandoned).

(2) In respect to the same products as new compositions or as new products valuable for various purposes in addition to demulsification, we refer to our co-pending application, Serial No. 751,619, filed May 31, 1947 (abandoned).

(3) In respect to the use as demulsifying agents of oxyalkylated 2,4,6 hydrocarbon-substituted phenol-aldehyde resins with the proviso that the hydrocarbon substituent in the phenolic nucleus has 9 to 18 carbon atoms, we refer to our co-pending application, Serial No. 751,608, filed May 31, 1947 (abandoned).

(4) In respect to the same products as new compositions or as new products valuable for various purposes in addition to demulsification, we refer to our co-pending application, Serial No. 751,618, filed May 31, 1947 (abandoned).

(5) In respect to the use as demulsifying agents of oxyalkylated 2,4,6 hydrocarbon-substituted phenol-aldehyde resins with the proviso that the hydrocarbon substituent in the phenolic nucleus has at least 2 and not more than 3 carbon atoms, we refer to our co-pending application for patent, Serial No. 751,606, filed May 31, 1947 (abandoned).

(6) In respect to the same products as new compositions or as new products valuable for various purposes in addition to demulsification, we refer to our co-pending application, Serial No. 751,617, filed May 31, 1947 (abandoned).

(7) In respect to the use as demulsifying agents of oxyalkylated 2,4,6 hydrocarbon-substituted phenol-aldehyde resins with the proviso that the hydrocarbon substituent have 1 to 24 carbon atoms, we refer to our co-pending application, Serial No. 751,610, filed May 31, 1947 (abandoned).

(8) In respect to the same products as new compositions or as new products valuable for various purposes in addition to demulsification, we refer to our co-pending application, Serial No. 751,623, filed May 31, 1947 (abandoned).

(9) In respect to the use as demulsifying agents of oxyalkylated 2,4,6 hydrocarbon-substituted phenol-aldehyde resins with the proviso that the hydrocarbon substituent in the phenolic nucleus has at least 2 and not more than 24 carbon atoms, particularly derivatives of mixed resins in which phenols, having 4 to 8 carbon atoms in the substituent position, are mixed with phenols having 2 to 3 or 9 to 24 carbon atoms, we refer to our co-pending application, Serial No. 8,728, filed February 16, 1948.

(10) In respect to the same products as new compositions or as new products valuable for various purposes in addition to demulsification, we refer to our co-pending application Serial No. 8,729, filed February 16, 1948.

(11) In respect to the use as demulsifying agents of oxyalkylated 2,4,6 substituted phenol-aldehyde resins without limitation of the nature of the substituent which renders the phenol difunctional (for instance, it may be chlorine or may be a radical containing oxygen or nitrogen in addition to carbon and hydrogen) we refer to our co-pending application, Serial No. 8,724, filed February 16, 1948.

(12) In respect to the same products as new compositions or new products valuable for various processes in addition to demulsification, attention is directed to our co-pending application, Serial No. 8,725, filed February 16, 1948.

(13) In respect to the use as demulsifying agents of oxyalkylated phenolic resins, generally, we refer to our application Serial No. 8,723, filed February 16, 1948.

The present invention involves the use, as a demulsifier, of a hydrophile product resulting from the oxyalkylation of an oxyalkylation-susceptible, fusible, organic solvent-soluble, water-insoluble resin in which the number of introduced oxyalkylene groups is sufficient to impart to the product hydrophile properties, that is, to to make it sub-surface-active or surface-active as those terms are hereinafter defined, the alkylene radicals of the oxyalkylene groups being ethylene, propylene, butylene, hydroxypropylene or hydroxybutylene corresponding to the alpha-beta-alkylene oxides, ethylene oxide, alpha-beta-propylene oxide, alpha-beta-butylene oxide, glycide and methyl glycide. The number of oxyalkylene groups introduced is at least twice the number of structural units of the resin; and the radicals so introduced are indicated by the formula $(RO)n$ in which $n$ is a number from 1 to 20 and is statistically taken.

Included among the resins which are suitable for the preparation of the products used in the practice of the invention, all of which must conform to the requirements set forth above, are phenol-aldehyde resins, phenol-sulfur resins, phenol-acetylene resins, including resins produced from phenol and substituted phenols, including difunctional, trifunctional and tetrafunctional phenols, naphthols, bisphenols, salicylic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenol-glycerol resins, etc., non-phenolic resins having the necessary labile or reactive hydrogen including urea and substituted urea-aldehyde resins, sulfonamide-aldehyde resins, polycarboxy-polyamine resins, polyester resins, resins derived by ring hydrogenation of phenolic resins, and the like. Our experience, based upon very extensive investigation, is that the oxyalkylation of any resin conforming to the requirements set forth above gives an efficient demulsifying agent, providing only that the oxyalkylation is carried to an extent such that the product has hydrophile properties, that is, the product has emulsifying properties or is self-emulsifiable or self-dispersible or more hydrophile, e. g., water-soluble, and providing the product does not become rubbery and non-hydrophilic, presumably as a result of cross-linking or the like, during the oxyalkylation. Naturally, some products are more efficient than others, and indeed, the relative efficiency of the materials may vary from emulsion to emulsion, but we have found no hydrophilic oxyalkylated product from an oxyalkylation-susceptible, fusible, organic-solvent-soluble, water-insoluble resin which was not effective for demulsifying purposes.

More particularly, the present invention involves the use as a demulsifier of a compound having the following characteristics:

(1) Essentially a polymer, usually and advantageously linear, but not necessarily so, having at least 3 and preferably not over 15 or 20 structural units. It may have more.

(2) The parent resin polymer being fusible and organic solvent-soluble as hereinafter described.

(3) The parent resin polymer being free from cross-linking or structure which cross-links during the heating incident to the oxyalkylation procedure to an extent sufficient to prevent the possession of hydrophile or subsurface-active or surface-active properties by the oxyalkylated resin.

(4) Each alkyleneoxy group is introduced at a point in the resin structure where there is a reactive hydrogen atom or some other point of reactivity. If the resin is phenolic, alkyleneoxy groups are introduced at the phenolic hydroxyl positions.

(5) The total number of alkyleneoxy radicals introduced must be at least sufficient to introduce hydrophile properties, i. e., sufficient to endow the product with sufficient hydrophile property to have emulsifying properties, or be self-emulsifiable or self-dispersible or the equivalent as hereinafter described; and must be at least equal to twice the number of structural units in the resin. The invention is concerned particularly with the use of sub-surface-active and surface-active compounds.

(6) The parent resin must be water-insoluble. In this specification and in the appended claims, reference is made to resins having "structural units." It is well known that resins are formed by reaction of a polyfunctional (di-, tri-, tetra-, etc.) material with a material (also polyfunctional) which supplies a bridging or a linking radical, or by polymerization (homo- or hetero-), or by a combination of the two. Thus, in the production of most phenol-aldehyde resins, the phenol, whether trifunctional as with phenol, difunctional, as with paratertiary-butyl phenol, or tetrafunctional, as with certain bis-phenols, serves as a polyfunctional material and the aldehyde serves to supply bridging methylene radicals. The same is true of such resins as the urea-aldehyde resins. With such resins as these, the identification of the structural units is simple; they are the units or nuclei of the polyfunctional material with, except in the case of the terminal nuclei, a bridging radical attached thereto.

Similarly, identification is simple in the case of homo-polymers, as, for example, vinyl phenol resins, where each vinyl phenol nucleus represents a structural unit.

With such resins as the dicarboxy-diamine resins, e. g., the nylon-type resin, identification involves the difficulty of deciding which of the materials is to be regarded as the polyfunctional resinogen and which the material which supplies the bridging radical, but, for practical purposes, from the standpoint of the present invention, this is unimportant, as either may be regarded as the bridging radical with the other as the polyfunctional resinogen and the structural unit considered to be either one, with the other being the associated bridging radical.

With modified phenol resins, such as phenol-naphthalene-aldehyde resins, or terpene-phenol-aldehyde-resins, or phenol-ureo-aldehyde-resins, the identification of the structural unit must necessarily be arbitrary again, but for purposes of definition of the term as used in the present application, it will be defined in instances such as this as a combination of the nuclei of two of the reactants, that is, the residue formed when two of the initial reacting molecules have combined, for example, one terpene and one phenol molecule, or one phenol and one aldehyde molecule, or one urea and one formaldehyde molecule, or one cumarone and one indene molecule, or one cumarone and one phenol molecule, or one rosin and one phenol molecule, etc.

Thus, generally stated, the term "structural unit," as herein used to designate what may be regarded as the resin segments or building blocks or repeating units or recurring units of the resins, means the residue remaining after the combination of two molecular units of the resin-forming materials which are reacted to form the ultimate resin, each representing the nucleus or residue of a polyfunctional compound. In phenol aldehyde resins the unit is a phenolic group plus the methylene-bridging group; in polyester resins, the acid residue plus the alcohol residue; in modified phenol-aldehyde resins the phenolic group plus the aldehyde residue or the phenolic group plus the modifying radical or the modifying radical plus the aldehyde radical; in homopolymers such as that derived from vinyl phenol, the residue of a single molecule of the material polymerized; in urea-formaldehyde-phenol resins, either the phenol group plus the aldehyde group or the urea group plus the aldehyde group; in polycarboxy-polyamine resins, one polycarboxy residue plus one polyamine residue; in polyester resins, one polyacid residue plus one polyalcohol residue, etc. In many resins produced from two or more reactants, for example, a difunctional phenol plus an aldehyde, there will be one terminal structural unit (in some cases more than one) which lacks the bridging radical, but is nevertheless to be regarded as a structural unit.

We have also found that the remarkable properties of the present materials as demulsifiers persist in derivatives which bear a simple genetic relationship to the parent materials, and in fact to the ultimate resin polymer, for instance, in the products obtained by reaction of the oxyalkylated compounds with low molal monocarboxy acids, high molal monocarboxy acids, polycarboxy acids, or their anhydrides, alpha-chloro monocarboxy acids, epichlorohydrin, etc. The derivatives also preferably must be obtained from oxyalkylated products showing at least the necessary hydrophile properties per se.

For convenience, there is attached hereto a chart illustrating within obvious limitations, types of resins which are among those suitable for the production of products useful in the practice of this invention. The chart is not exhaustive.

The invention will be illustrated by the following specific examples, giving specific directions for preparing oxyalkylation susceptible, water-insoluble, organic-solvent-soluble, fusible resins (Examples 1a–381a) carrying out the oxyalkylation procedure to produce products useful in the practice of the invention (Examples 1b–98b and table) and using the products for demulsification (Examples 1c–3c) but it is not limited thereto. Each of the resins of Examples 1a–381a on oxyalkylation gives products, the oxyalkylation being carried out in each case by substantially the procedure of Examples 1b–98b, useful for demulsification by the procedures commonly used in present day practice, as hereafter described.

Example 1a

| | Grams |
|---|---|
| Para-tertiary butylphenol (1.0 mole) | 150 |
| Formaldehyde, 37% (1.0 mole) | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts include the following:

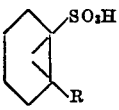

R is an alkyl hydrocarbon radical having 12–14 carbon atoms.

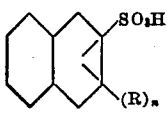

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: one for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol, in presence of a strong mineral acid as a catalyst and using formaldehyde, sometimes yields a resin which apparently has a very slight amount of cross-linking. Such resin is similar to the one described above except that it is somewhat opaque, and its melting point is higher than the one described above and there is a tendency to cure. Such a resin is generally dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If following a given procedure with a given lot of the phenol, such a resin is obtained, the amount of catalyst employed is advantageously reduced slightly or the time of reflux reduced slightly, or both, or an acid such as oxalic acid is used instead of hydrochloric acid. Purely as a matter of convenience due to better solubility in xylene, we prefer to use a clear resin but if desired either type may be employed.

Example 2a

The same procedure was followed as in Example 1a preceding, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that described in Example 1a, preceding. The solvent-free resin was reddish-amber in color, somewhat opaque but completely xylene-soluble. It was semi-soft or pliable in consistency. See what is said in Example 1a, preceding, in regard to the opaque appearance of the resin. What is said there applies with equal force and effect in the instant example.

Example 3a

| | Grams |
|---|---|
| Para-tertiary amylphenol (1.0 mole) | 164 |
| Formaldehyde, 37% (1.0 mole) | 81 |
| HCl (concentrated) | 1.5 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was dark red in color, hard, brittle, with a melting point of 128–140° C. It was xylene-soluble.

Example 4a

The phenol employed (164 grams) was para-secondary amylphenol, which is a liquid. The procedure followed was the same as that used in Example 1a, preceding. The solvent-free resin was hard and brittle, reddish-black in color and with a melting point of 80–85° C.

Example 5a

The phenol employed (164 grams) was a commercially available mixed amylphenol containing approximately 95 parts of para-tertiary amylphenol, and 5 parts of ortho-tertiary amylphenol. It was in the form of a fused solid. The procedure employed was the same as that used in Example 1a, preceding. The appearance of the resin was substantially the same as that of the product of Example 3a.

Sometimes resins produced from para-tertiary amylphenol and formaldehyde in the presence of an acid catalyst show a slight insolubility in xylene; that is, while completely soluble in hot xylene to give a clear solution they give a turbid solution in cold xylene. Such turbidity or lack of solubility disappears on heating, or on the addition of diethylethyleneglycol.

We have never noticed this characteristic property when using the commercial phenol of Example 5a which, as stated, is a mixture containing 95% para-tertiary amylphenol and 5% ortho-tertiary amylphenol. In fact, the addition of 5% to 8% of an ortho-substituted phenol, such as ortho-tertiary amylphenol to any difunctional phenol, such as the conventional para-substituted phenols herein mentioned, usually gives an increase in solubility when the resulting resin is high melting, which is often the case when formaldehyde and an acid catalyst are employed.

Example 6a

The phenol employed (164 grams) was ortho-tertiary amylphenol which is a liquid. The procedure followed was the same as that used in Example 1a, and the appearance of the resin was light amber in color and transparent. It was soft to pliable in consistency and xylene-soluble.

Example 7a

The phenol employed (178 grams) was para-tertiary hexylphenol. This is a solid at ordinary temperatures. The procedure followed was the same as that used in Example 1a preceding, and the appearance of the resin was substantially the same as that of the resin of Example 3a. The solvent-free resin is slightly opaque in appearance, reddish-amber in color, semi-hard to pliable in consistency, and xylene-soluble.

Example 8a

The phenol employed was commercial para-octylphenol. 206 grams of this phenol were employed instead of 164 grams of an amylphenol or 150 grams of a butylphenol and 150 grams of xylene were used instead of 100. Otherwise, the procedure was the same as that used in Example 1a. The solvent-free resin obtained was reddish-amber in color, soft to pliable in consistency, and xylene-soluble.

Example 9a

| | Grams |
|---|---|
| Para-phenylphenol | 170 |
| Formaldehyde, 37% | 81 |
| HCl (concentrated) | 1.5 |
| Monoalkyl ($C_{10}$–$C_{20}$, principally $C_{12}$–$C_{14}$) benzene monosulfonic acid sodium salt | 0.8 |
| Xylene | 150 |
| Diethyleneglycol diethylether | 50 |

This phenol was solid. The phenol, xylene, diethyleneglycol diethylether, and hydrochloric acid were mixed together and heated to give complete solution at approximately 140° C. The use of diethyleneglycol diethylether, or some equivalent solvent, was necessary for the reason that this particular phenol is not sufficiently soluble in xylene. Having obtained a complete solution in the manner indicated, it was allowed to cool to approximately 75–80° C. and, thereafter, formaldehyde was added and the procedure was the same as that used in Example 1a.

The final product contained not only xylene but also diethyleneglycol diethylether. Since this latter does not distill out readily (boiling point 189° C.) we did not obtain a solvent-free resin sample but used the product as such for oxyethylation. As pointed out elsewhere, the presence of a solvent is usually desirable in the oxyalkylation step. We have, however, examined a number of para-phenylphenol-formaldehyde acid-catalyzed resins which were hard, brittle resins, and melting in the neighborhood of 150° C. or thereabouts.

When ortho-hydroxydiphenyl is substituted for para-hydroxydiphenyl one can eliminate the diethyleneglycol diethylether and use the procedure described in Example 1a, without modification. Ortho-substituted phenols yield resins which have lower melting points than do the para-substituted phenols and are usually more xylene-soluble than resins obtained from the corresponding para-substituted phenols. The matter of the lower melting point is also illustrated in the case of para-tertiary amylphenol resins in comparison with ortho-tertiary amylphenol resins. The resin obtained from ortho derivative and formaldehyde melts at about 80° C. and upward, whereas the comparable para derivative resin melts at about 160° C. In this instance, both resins are xylene-soluble.

Example 10a

The same procedure was employed as in Example 1a, except that para-cyclohexylphenol, 176 grams, was employed along with 150 grams of xylene. This phenol was solid. The resulting resin minus solvents was opaque in appearance, xylene dispersible, amber in color, hard and brittle, with an approximate melting point of 170° C. It was sufficiently curable so as to prohibit distillation.

Example 11a

The same procedure was employed as in Example 1a, preceding, using 198 grams of commercial styrylphenol and 150 grams of xylene. Styrylphenol is a white solid. The resin was reddish black in color, hard and brittle, with a melting point of about 80° to 85° C.

Example 12a

| | Grams |
|---|---|
| Para-tertiary amylphenol (1.0 mole) | 164 |
| Formaldehyde, 37% (0.8 mole) | 64.8 |
| Glyoxal, 30% (0.1 mole) | 20.0 |
| Concentrated HCl | 2 |
| Monoalkyl ($C_{10}$–$C_{20}$, principally $C_{12}$–$C_{14}$) benzene monosulfonic acid sodium salt | .75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

Example 13a

| | Grams |
|---|---|
| Para-tertiary amylphenol (1.0 mole) | 164 |
| Glyoxal, 30.2% (0.5 mole) | 96 |
| Concentrated HCl | 2 |
| Monoalkyl ($C_{10}$–$C_{20}$, principally $C_{12}$–$C_{14}$) benzene monosulfonic acid sodium salt | .8 |
| Xylene | 150 |

The same procedure was followed as in Example 1a. There was a modest precipitate of an insoluble material, approximately 15 grams, which had an insoluble sponge-like carbonaceous appearance. It was removed by filtration of the xylene solution as in Example 12a preceding. The resulting solvent-free resin was clear, reddish amber in color, soft to fluid in consistency, and xylene-soluble.

Example 14a

| | Grams |
|---|---|
| Para-tertiary butylphenol (1.0 mole) | 150 |
| Acetaldehyde | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. When a sample of the resin was freed from the solvent, it was dark red, semi-hard or pliable in consistency, and xylene-soluble.

Example 15a

The same procedure was followed as in Example 14a, except that the para-tertiary butylphenol was replaced by an equal amount of para-secondary butylphenol. The appearance of the final resin on a solvent-free basis was substantially identical with the preceding example, except that is was somewhat more fluid in consistency and slightly tacky.

Example 16a

The same procedure was followed as in Example 14a, except that the 150 grams of para-tertiary butylphenol were replaced by 164 grams of para-tertiary amylphenol. The final solvent-free resin was clear and dark red in color. It was xylene-soluble and semi-hard or pliable in consistency.

Example 17a

The same procedure was followed as in Example 16a preceding except that the para-tertiary amylphenol was replaced by an equal amount of para-secondary amylphenol. The appearance of the resin was substantially identical with that of the resin of the preceding example, except that it was somewhat more fluid in consistency and slightly tacky.

Example 18a

The same procedure was followed as in Example 16a except that the amylphenol employed was the phenol described in Example 5a. The appearance of the resin on a solvent-free basis was substantially the same as that of Example 16a.

Example 19a

The same procedure was followed as in Example 16a except that the amylphenol employed was ortho-tertiary amylphenol. The resin on a solvent-free basis was transparent and reddish-black; it was soft to tacky in consistency and xylene-soluble.

Example 20a

The same procedure was followed as in Example 14a, except that the 150 grams of para-tertiary butylphenol were replaced by 206 grams of commercial para-octylphenol. The solvent-free resin was dark red in color, soft to tacky in consistency, and xylene-soluble.

Example 21a

The same procedure was employed as in Example 14a, except that the 150 grams of para-tertiary butylphenol were replaced by 170 grams of para-phenylphenol. The resin produced was at least dispersible in xylene when hot, giving the appearance of solubility. When the solution cooled, obvious separation took place. For this reason 100 grams of diethyleneglycol diethylether were added to the finished resin mixture, when hot, so as to give a suitable solution when cold. A small sample was taken before adding the diethyleneglycol diethylether and the xylene evaporated in order to determine the character of the resin. The solvent-free resin was opaque and reddish-black in color. It was soft and pliable in consistency.

Example 22a

The same procedure was followed as in Example 14a, except that 176 grams of para-cyclohexylphenol were employed instead of the para-tertiary butylphenol. The solvent-free resin was clear, dark red in appearance, soft to pliable in consistency, and xylene-soluble.

Example 23a

The same procedure was followed as in Example 14a, except that the phenol employed was commercial styrylphenol and the amount employed was 198 grams. The resin was soft-to-pliable, reddish-black in color, and xylene-soluble.

Example 24a

|  | Grams |
|---|---|
| Para-tertiary amylphenol (1.0 mole) | 164 |
| Heptaldehyde (1.0 mole) | 114 |
| Concentrated $H_2SO_4$ | 2 |
| Xylene | 100 |

The procedure employed was essentially the same as in the Example 14a where acetaldehyde was employed, but with the difference that due to the fact that the particular aldehyde was a higher boiling aldehyde it was not necessary to dilute it with xylene. For this reason all the xylene was added to the initial mixture, and the higher boiling aldehyde was added by means of the separatory funnel arrangement. Thus, the phenol, acid catalyst, and solvent were combined in a resin pot by the same procedure used as in Example 14a. The resin, after removal of the solvent by distillation, was clear, dark amber in color, had a soft, tacky appearance and was xylene-soluble.

Example 25a

|  | Grams |
|---|---|
| Para-secondary butylphenol (1.0 mole) | 150 |
| Heptaldehyde (1.0 mole) | 114 |
| Concentrated $H_2SO_4$ | 2 |
| Xylene | 100 |

The same procedure was employed as in Example 24a. The solvent-free resin had physical characteristics similar to those of the resin of Example 24a.

Example 26a

|  | Grams |
|---|---|
| Para-tertiary butylphenol (1.0 mole) | 150 |
| Heptaldehyde (1.0 mole) | 114 |
| Concentrated $H_2SO_4$ | 2 |
| Xylene | 100 |

This resin was prepared as in Example 24a preceding, with the resulting solvent-free resin being a clear, dark amber color, semi-hard or pliable, and xylene-soluble.

Example 27a

|  | Grams |
|---|---|
| Para-phenylphenol (1.0 mole) | 170 |
| Heptaldehyde (1.0 mole) | 114 |
| Concentrated $H_2SO_4$ | 2 |
| Xylene | 100 |

The resin was prepared as in Example 24a. The solvent-free resin was slightly opaque, dark amber in color, soft to fluid, and sufficiently xylene-dispersible to permit subsequent oxyalkylation.

Example 28a

|  | Grams |
|---|---|
| Para-cyclohexylphenol (3.0 moles) | 528 |
| Heptaldehyde (3.0 moles) | 342 |
| Concentrated $H_2SO_4$ | 6 |
| Xylene | 500 |

This resin, made as in Example 24a, in solvent-free form was clear, dark amber to black in color, semi-soft to pliable and xylene-soluble.

Example 29a

|  | Grams |
|---|---|
| Para-tertiary amylphenol (1.0 mole) | 164 |
| Benzaldehyde (1.0 mole) | 106 |
| Concentrated $H_2SO_4$ | 2 |
| Xylene | 100 |

This resin, made as in Example 24a, in solvent-free form was clear, dark red, hard, brittle, had a melting point of 160–165° C., and was xylene-soluble.

Example 30a

|  | Grams |
|---|---|
| Para-secondary butylphenol (1.0 mole) | 150 |
| Benzaldehyde (1.0 mole) | 106 |
| Concentrated $H_2SO_4$ | 2 |
| Xylene | 100 |

This resin, made following the procedure employed in Example 24a, in solvent-free form was clear, mahogany in color, semi-hard or pliable and xylene-soluble.

Example 31a

|  | Grams |
|---|---|
| Para-tertiary butylphenol (1.5 mole) | 225 |
| Benzaldehyde (1.5 mole) | 159 |
| Concentrated $H_2SO_4$ | 3 |
| Xylene | 200 |

The above reactants were combined by the procedure of Example 24a. The solvent-free resin was a clear, hard-brittle, reddish amber colored resin, which was xylene-soluble, and had a melting point of 180–185° C. It was to some degree heat curable.

Example 32a

|  | Grams |
|---|---|
| Para-phenylphenol (1.5 moles) | 255 |
| Benzaldehyde (1.5 moles) | 159 |
| Concentrated $H_2SO_4$ | 3 |
| Xylene | 200 |

This resin was made as in Example 24a. The resulting solvent-free resin was clear, dark red, hard, and brittle, with a melting point of 200–205° C. It was somewhat heat curable, and almost completely soluble in xylene, with some insoluble material which was dispersible. It was suitable for subsequent oxyalkylation.

Example 33a

|  | Grams |
|---|---|
| Para-cyclohexylphenol (3.0 moles) | 528 |
| Benzaldehyde (3.0 moles) | 318 |
| Concentrated $H_2SO_4$ | 6 |
| Xylene | 500 |

This resin, formed by combining the above reactants according to the procedure employed in Example 24a, was hard, brittle, xylene-soluble, reddish-black in color, and had a melting point of 165–170° C., with a tendency towards being heat curable.

Example 34a

|  | Grams |
|---|---|
| Para-tertiary amylphenol (1.0 mole) | 164 |
| Propionaldehyde, 96% (1.0 mole) | 60.5 |
| Concentrated $H_2SO_4$ | 2 |
| Xylene | 150 |

The above reactants were combined according to the procedure followed in Example 24a. The resulting solvent-free resin was clear, dark amber in color, soft to pliable, and xylene-soluble.

Example 35a

| | Grams |
|---|---|
| Para-secondary butylphenol | 150 |
| Propionaldehyde, 96% | 60.5 |
| Concentrated H₂SO₄ | 2 |
| Xylene | 100 |

This resin was prepared according to the procedure employed in Example 24a. The resulting solvent-free resin was clear, soft to fluid, dark amber in color, and was xylene-soluble.

Example 36a

| | Grams |
|---|---|
| Para-tertiary butylphenol (1.0 mole) | 150 |
| Propionaldehyde, 96% (1.0 mole) | 60.6 |
| Concentrated H₂SO₄ | 2 |
| Xylene | 100 |

This resin was prepared according to the procedure employed in Example 24a. The resulting solvent-free resin was clear, dark amber in color, xylene-soluble, hard and brittle, and has a melting point of 80–85° C.

Example 37a

| | Grams |
|---|---|
| Para-phenylphenol (3.0 moles) | 510 |
| Propionaldehyde, 96% (3.0 moles) | 182 |
| Concentrated H₂SO₄ | 6 |
| Xylene | 500 |

The resulting resin, prepared according to the procedure of Example 24a, when solvent-free, was opaque, hard, black, and xylene-insoluble, but sufficiently dispersible in xylene for subsequent oxyalkylation. Addition of a minor proportion of ethyleneglycol diethyl-ether completely solubilized the resin in xylene, a clear solution resulting.

Example 38a

| | Grams |
|---|---|
| Para-cyclohexylphenol (3.0 moles) | 528 |
| Propionaldehyde, 96% (3.0 moles) | 182 |
| Concentrated H₂SO₄ | 6 |
| Xylene | 500 |

The resulting resin, prepared according to directions in Example 24a, when solvent-free was clear, dark amber in color, xylene-soluble, hard and brittle, and had a melting point of 84–90° C.

Example 39a

| | Grams |
|---|---|
| Para-tertiary amylphenol | 164 |
| 2-ethyl-3-propyl acrolein | 126 |
| Concentrated H₂SO₄ | 2 |
| Xylene | 100 |

The procedure employed was the same as for the use of heptaldehyde, as in Example 24a. The resulting solvent-free resin was dark amber to black in color, and soft to fluid in consistency. It was xylene-soluble.

Example 40a

| | Grams |
|---|---|
| Para-tertiary butylphenol | 150 |
| 2-ethyl-3-propyl acrolein | 126 |
| Concentrated H₂SO₄ | 2 |
| Xylene | 100 |

The procedure employed was the same as for the use of heptaldehyde, as in Example 24a. The appearance of the resin was the same as the resin of the Example 39a.

Example 41a

| | Grams |
|---|---|
| Commercial para-octylphenol | 206 |
| 2-ethyl-3-propyl acrolein | 126 |
| Concentrated H₂SO₄ | 2 |
| Xylene | 100 |

The procedure employed was the same as for the use of heptaldehyde, as in Example 24a. The appearance of the resin was the same as the resin of Example 39a.

Example 42a

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 1a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

Example 43a

| | Grams |
|---|---|
| Para-tertiary amylphenol | 164 |
| Furfural (carbonate treated) | 70 |
| Potassium carbonate | 3.2 |

The procedure employed was the same as that of Example 42a. The amount of water distilled was 10 cc. and the amount of furfural, 3 cc. The resin was a bright black, xylene-soluble resin, semi-pliable to hard.

Example 44a

| | Grams |
|---|---|
| Para-tertiary amylphenol | 492 |
| Formaldehyde, 37% | 528 |
| NaOH in 30 cc. H₂O | 6.8 |
| Monoalkyl (C₁₀–C₂₀, principally C₁₂–C₁₄) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100 to 110° C. The resinous mixture was then permitted to cool sufficiently to permit the addition of 15 ml. of glacial acetic acid in 150 cc. H₂O. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

Example 45a

| | Grams |
|---|---|
| Para-secondary butylphenol | 450 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 44a. The resulting solvent-free resin was clear, light amber in color, and semi-fluid or tacky in consistency.

Example 46a

| | Grams |
|---|---|
| Para-phenylphenol | 510 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 500 |

The same procedure was employed as in Example 44a, except that the reaction product contained a considerable amount of a white crystalline solid which was alcohol-soluble and xylene-insoluble, necessitating the use of some isopropyl alcohol in effecting a separation. The resulting solvent-free resin had a grayish-white crystalline structure, and was hard, brittle, non-xylene-soluble but soluble in a xylene-diethyleneglycol diethylether mixture. This crystalline structure in phenylphenol resins has been noted in the literature.

Example 47a

| | Grams |
|---|---|
| Para-cyclohexylphenol | 528 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 300 |

This resin was made and worked up in the same manner as in Example 46a. The resin, after distillation and standing overnight, developed the same type of crystalline structure noted in the resin of the Example 46a. However, on cooling immediately after distillation, the resulting product was clear, light amber in color, and fairly soft in consistency.

Example 48a

| | Grams |
|---|---|
| Para-tertiary butylphenol | 450 |
| Formaldehyde, 30% | 652 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 300 |

The same procedure was followed as in Example 44a. The resulting resin was deep red in color, clear, and soft or semi-fluid in consistency.

Example 49a

This resin was prepared as in Example 44a except that the para-tertiary amylphenol-formaldehyde ratio was 1 to 1.1 moles. The resulting solvent-free resin was dark red in color, clear, and semi-hard or pliable in consistency.

Example 50a

The resin was prepared as in Example 48a except that the para-tetiary butylphenol-formaldehyde ratio was 1 to 1.1 moles. The resulting solvent-free resin was dark red in color, clear, hard, brittle, and had a melting point of 100–105° C.

Example 51a

| | | |
|---|---|---|
| Commercial para-octyl phenol | grams | 412 |
| Formaldehyde, 30% | do | 220 |
| NaOH in 20 cc. $H_2O$ | do | 4.5 |
| Monoalkyl ($C_{10}$–$C_{20}$, principally $C_{12}$–$C_{14}$) benzene monosulfonic acid sodium salt | grams | 1.5 |
| Xylene | do | 300 |
| Glacial acetic acid | cc | 10 |

This resin was prepared as in Example 44a. A small amount, approximately 1%, of an insoluble, infusible flocculent precipitate was noted dispersed throughout the resinous solution. This was filtered out before distillation. The resin, after vacuum distillation to 150° C. to remove the solvent, was dark red in color, clear, hard and brittle, with a melting point of 113–117° C.

Example 52a

Resin of Example 44a was subjected to vacuum distillation to 225° C., at 25 mm. Hg. The resulting product was a hard, brittle resin, xylene-soluble, and having a melting point of 145–150° C.

Example 53a

Resin of Example 45a was subjected to vacuum distillation to 225° C., at 25 mm. Hg. The resulting product was hard, brittle, black in color, xylene-insoluble, and infusible up to 220° C. However, if the vacuum distillation was taken to only 175 or 180° C., at 25 mm. Hg the resulting product was xylene-soluble and had a melting point of approximately 170° C.

Example 54a

Resin of Example 46a was subjected to vacuum distillation to 225° C., at 25 mm. Hg. The resulting product was opaque or crystalline, xylene-dispersible, and soluble in a mixed solvent of 75% xylene and 25% diethyleneglycol diethylether, with a melting point of 100–105° C.

Example 55a

Resin of Example 47a was subjected to vacuum distillation to 225° C., at 25 mm. Hg. The resulting product was opaque or crystalline, dark brown in color, xylene-soluble, and semi-hard or pliable in consistency.

Example 56a

Resin of Example 48a was subjected to vacuum distillation to 225° C., at 25 mm. Hg. The resulting product was hard, brittle, partially xylene-insoluble, but soluble in a mixed solvent of 75% xylene and 25% diethyleneglycol diethylether with an approximate melting point of 160–165° C. It was also heat curable.

Example 57a

Resin of Example 49a was subjected to vacuum distillation to 225° C., at 25 mm. Hg. The resulting product was dark amber to black in color, xylene-soluble, hard and brittle, with a melting point of 145–150° C.

Example 58a

Resin of Example 50a was subjected to vacuum distillation to 225 C., at 25 mm. Hg. The resulting resin was black in color, hard and brittle, xylene-dispersible, and soluble in a mixed solvent of 75% xylene and 25% diethyleneglycol diethylether, with a melting point of 165–170° C. It was also heat curable.

Example 59a

Resin of Example 51a was subjected to vacuum distillation to 225° C., at 25 mm. Hg. The resulting resin was dark amber in color xylene-soluble, hard and brittle, with a melting point of 115–120° C.

Example 60a

| | Grams |
|---|---|
| Commercial para-tertiary amylphenol (decribed in Example 5a) | 328 |
| Formaldehyde, 37% | 352 |
| NaOH in 20 cc. H₂O | 4.5 |
| Monoalkyl (C₁₀–C₂₀, principally C₁₂–C₁₄) benzene monosulfonic acid sodium salt | 1.5 |

The above reactants were refluxed with stirring for 2 hours. 200 grams of xylene were then added and the whole cooled to 90–100° C., and the NaOH neutralized with 10 cc. glacial acetic acid in 100 cc. H₂O. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—Soft, tacky, pale yellow
Heated to 190° C.—Hard, fairly brittle, pale yellow—low melting point
Heated to 200° C.—Hard, fairly brittle, pale yellow—105–115° C. melting point
Heated to 225° C.—Hard, brittle, amber—120°–125° C. melting point
Heated to 250° C.—Hard, brittle, dark amber—128–135° C. melting point
Heated to 275° C.—Very brittle, deep brown—155–160° C. melting point The above distillation was without the use of vacuum. It illustrates that heating alone, or heating with vacuum, changes a low-stage resin into a medium or high-stage resin.

Example 61a

This resin was obtained by the vacuum distillation of resin of Example 3a. Vacuum distillation was conducted up to 250° C. at 25 mm. Hg. The resulting resin was hard, brittle, amber colored, and had a slightly higher melting point than the resin prior to vacuum distillation, to wit, 140–145° C. It was xylene-soluble. The molecular weight, determined cryoscopically using benzene, was approximately 1400.

Example 62a

This resin was obtained by the vacuum distillation of resin of Example 8a. Vacuum distillation was conducted up to 225° C. at 25 mm. Hg. The resulting resin was xylene-soluble, hard, brittle, reddish black in color, with a melting point of 140–145° C. Note that this resin, prior to vacuum distillation, was soft to pliable in consistency.

Example 63a

This resin was obtained by the vacuum distillation of resin of Example 10a. Vacuum distillation was conducted up to 225° C. at 25 mm. Hg. The resulting resin was xylene-dispersible, soluble in a mixture of xylene and diethyleneglycol diethylether, dark brown in color, and hard and brittle in nature. It had a melting point of 180–185° C. This was moderately higher than the resin prior to vacuum distillation.

Example 64a

This resin was obtained by the vacuum distillation of resin of Example 9a. Vacuum distillation was conducted up to 225° C. at 25 mm. Hg. The resulting resin was semi-hard but still contained some diethyleneglycol diethylether. Unquestionably, if completely separated from this solvent it would have been a hard solid resin. Such residual solvent was not eliminated lest there be danger of pyrolysis.

Example 65a

This resin was obtained by the vacuum distillation of resin of Example 16a. Vacuum distillation was conducted up to 225° C. at 25 mm. Hg. The resulting resin had the same physical characteristics as the undistilled resin except that it was slightly more viscous.

Example 66a

This resin was obtained by the vacuum distillation of resin of Example 15a. Vacuum distillation was conducted up to 225° C. at 25 mm. Hg. The resulting resin was semi-hard to pliable.

Example 67a

This resin was obtained by the vacuum distillation of resin of Example 20a. Vacuum distillation was conducted up to 225° C. at 25 mm Hg. The resulting resin was hard to pliable.

In the immediately preceding examples describing the production of resins by the vacuum distillation of resins of earlier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds which have little tendency to form rubbery derivatives during oxyethylation.

Example 68a

| | Grams |
|---|---|
| Commercial para-tertiary amylphenol (described in Example 5a) | 164 |
| Formaldehyde, 37% | 81 |
| Monoalkyl (C₁₀–C₂₀, principally C₁₂–C₁₄) benzene monosulfonic acid sodium salt | .8 |
| Xylene | 200 |

No catalyst was added in this example. The reactants were placed in an autoclave and stirred while heating to a temperature of approximately 160° C. The total period of reaction was 5½ hrs. During the early part of this period the temperature was 156° C. with a gauge pressure of 110 pounds. During the last part of the period, probably due to the absorption of formaldehyde, the pressure dropped to 75 pounds gauge pressure while the temperature held at about 150° C. After this 5½ hour reaction period the autoclave was allowed to cool. The liquids were withdrawn and the xylene solution of the resin was decanted away from the small aqueous layer. The xylene solution, containing a bit of the aqueous layer carried over mechanically, was subjected to vacuum distillation up to 150° C. at 25 mm. Hg.

The resulting resin was fairly hard and brittle, xylene-soluble, dark, amber in color, with a melting point of 55° to 66° C., and a molecular weight of 490. If desired, one may use considerably higher pressure so as to speed up the reaction and also in order to obtain resins of higher molecular weight. We have employed the same procedure with moderately higher temperatures and definitely higher pressures.

*Example 69a*

|  | Grams |
|---|---|
| Menthylphenol, technically pure (1.0 mole) | 232 |
| Formaldehyde, 37% (1.0 mole) | 81 |
| Concentrated HCl | 2 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 1a. The solvent solution so obtained was used as such in subsequent oxyalkylation steps. We have also removed the solvent by conventional means, such as evaporation, distillation or vacuum distillation. The resin obtained in the operation above described was clear, reddish amber in color, hard, brittle and had a melting point of about 115° to 120° C.

*Example 70a*

|  | Grams |
|---|---|
| Nonylphenol (para) (3.0 moles) | 660 |
| Formaldehyde, 37% (3.0 moles) | 243 |
| Concentrated HCl | 9 |
| Monoalkyl ($C_{10}$–$C_{20}$, principally $C_{12}$–$C_{14}$) benzene monosulfonic acid sodium salt | 2.5 |
| Xylene | 300 |

The procedure followed was the same as that used in Example 1a. The phenol employed was a heavy, sirupy liquid, largely or almost entirely para with possibly a small percentage of ortho present. The solvent-free resin was clear, reddish amber in color and semi-soft or pliable in consistency.

*Example 71a*

|  | Grams |
|---|---|
| Octadecylphenol (1.0 mole) | 346 |
| Formaldehyde, 37% (1.0 mole) | 81 |
| Concentrated HCl | 3.2 |
| Monoalkyl ($C_{10}$–$C_{20}$, principally $C_{12}$–$C_{14}$) benzene monosulfonic acid sodium salt | 1.6 |
| Xylene | 200 |

The procedure followed was the same as that used in Example 1a preceding. The phenol employed was a liquid. It was largely or entirely the para isomer with possibly a small amount of ortho present. The resulting solvent-free resin was soft to pliable in consistency, clear and reddish amber in color.

*Example 72a*

|  | Grams |
|---|---|
| Crude para-cumylphenol (1.27 moles) | 268 |
| Formaldehyde, 37% (2.0 moles) | 162 |
| Concentrated HCl | 2.5 |
| Monoalkyl ($C_{10}$–$C_{20}$, principally $C_{12}$–$C_{14}$) benzene monosulfonic acid sodium salt | 1 |
| Xylene | 250 |

The so-called crude para-cumylphenol was a comparatively high grade product containing 90% to 95% of the phenol and the impurities present were hydrocarbons with less than ½% of phenol (hydroxy-benzene). The phenol was a yellowish colored solid, having a somewhat waxy appearance. The procedure followed was that of Example 1a. The resulting solvent-free resin was slightly opaque, amber in color and hard but not particularly brittle. It had a melting point of 80° to 85° C.

*Example 73a*

|  | Grams |
|---|---|
| Para-decylphenol (1.0 mole) | 234 |
| Formaldehyde, 37% (1.0 mole) | 81 |
| HCl (concentrated) | 2 |
| Monoalkyl ($C_{10}$–$C_{20}$, principally $C_{12}$–$C_{14}$) benzene monosulfonic acid sodium salt | 1.2 |
| Xylene | 200 |

The procedure followed was the same as that used in Example 1a preceding. The phenol was a straw colored liquid, having a little phenolic odor. The solvent-free resin obtained was reddish amber in color and semi-soft or pliable in consistency.

*Example 74a*

|  | Grams |
|---|---|
| Para-dodecylphenol (1.0 mole) | 262 |
| Formaldehyde, 37% (1.0 mole) | 81 |
| HCl (concentrated) | 3.5 |
| Monoalkyl ($C_{10}$–$C_{20}$, principally $C_{12}$–$C_{14}$) benzene monosulfonic acid sodium salt | 2.5 |
| Xylene | 250 |

The procedure followed was the same as that used in Example 1a. The phenol was a straw colored liquid, having a little phenolic odor. The solvent-free resin obtained was deep red in color and semi-soft or pliable in consistency.

*Example 75a*

|  | Grams |
|---|---|
| Nonylphenol (1.0 mole) | 220 |
| Formaldehyde, 37% (0.865 mole) | 70 |
| Glyoxal, 30% (0.065 mole) | 12.5 |
| Concentrated HCl | 2 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a preceding. When glyoxal is used it is not unusual for a very small amount of carbonaceous material to be formed. This was true in this case as the amount formed represented a few percent of the total amount of resin. This was removed by merely filtering the xylene solution. The solvent-free resin was clear in appearance, reddish amber in color and semi-hard to pliable in consistency.

*Example 76a*

|  | Grams |
|---|---|
| Menthylphenol, technically pure (1.0 mole) | 232 |
| Acetaldehyde (1.0 mole) | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. The solvent-free resin was hard but not brittle, reddish amber in color and had a melting point of about 50° to 55° C.

Example 77a

|  | Grams |
|---|---|
| Nonylphenol, para (0.773 mole) | 170 |
| Acetaldehyde (.773 mole) | 34 |
| Concentrated H₂SO₄ | 3 |
| Xylene | 75 |

The same procedure was followed as in Example 76a, except that nonylphenol was used instead of menthylphenol. The solvent-free resin was reddish amber in color and soft to pliable in consistency.

Example 78a

|  | Grams |
|---|---|
| Octadecylphenol (0.5 mole) | 173 |
| Acetaldehyde (0.5 mole) | 22 |
| Concentrated H₂SO₄ | 1 |
| Xylene | 75 |

The same procedure was followed as in Example 76a, except that octadecylphenol was used instead of menthylphenol. The solvent-free resin was soft to semi-brittle in consistency and dark red in color.

Example 79a

|  | Grams |
|---|---|
| Menthylphenol (3.0 moles) | 696 |
| Heptaldehyde (3.0 moles) | 343 |
| Concentrated H₂SO₄ | 6 |
| Xylene | 500 |

The procedure employed was essentially the same as in Example 76a where acetaldehyde was employed, but with the difference that due to the fact that heptaldehyde is a higher boiling aldehyde, it was not necessary to dilute it with xylene. For this reason all the xylene was added to the initial mixture, and the heptaldehyde was added by means of the separatory funnel arrangement. Thus, the phenol, acid catalyst, and solvent were combined in a resin pot by the same procedure used in Example 76a. The resin, after removal of the solvent by distillation, was clear, dark red in color, had a soft, tacky appearance and was xylene-soluble.

Example 80a

|  | Grams |
|---|---|
| Nonylphenol (1.0 mole) | 220 |
| Heptaldehyde (1 mole) | 114 |
| Concentrated H₂SO₄ | 2 |
| Xylene | 150 |

The same procedure was followed as in Example 79a preceding. The solvent-free resin was dark amber in color and semi-fluid or tacky in consistency.

Example 81a

|  | Grams |
|---|---|
| Menthylphenol (1.0 mole) | 232 |
| Benzaldehyde (1.0 mole) | 106 |
| Concentrated H₂SO₄ | 2 |
| Xylene | 150 |

The procedure followed was the same as in Example 79a. The solvent-free resin was semi-hard to pliable and reddish amber in color.

Example 82a

|  | Grams |
|---|---|
| Nonylphenol (1.5 moles) | 330 |
| Benzaldehyde (1.5 moles) | 159 |
| Concentrated H₂SO₄ | 3 |
| Xylene | 200 |

The procedure followed was the same as in Example 79a. The solvent-free resin was clear, semi-soft to pliable and dark amber in color.

Example 83a

|  | Grams |
|---|---|
| Menthylphenol (1.0 mole) | 232 |
| Propionaldehyde, 96% (1.0 mole) | 60.5 |
| Concentrated H₂SO₄ | 2 |
| Xylene | 150 |

The same procedure was followed as in Example 79a. The solvent-free resin was dark amber in color, semi-hard or pliable in consistency, with a tendency towards tackiness.

Example 84a

|  | Grams |
|---|---|
| Nonylphenol (1.0 mole) | 220 |
| Propionaldehyde, 96% (1.0 mole) | 60.5 |
| Concentrated H₂SO₄ | 2 |
| Xylene | 150 |

The same procedure was followed as in Example 79a. The solvent-free resin was dark amber in color and semi-fluid or tacky in consistency.

Example 85a

|  | Grams |
|---|---|
| Nonylphenol (1.0 mole) | 220 |
| 2-ethyl-3-propyl acrolein (1.0 mole) | 126 |
| Concentrated H₂SO₄ | 2.5 |
| Xylene | 100 |

The same procedure was followed as in Example 79a. The solvent-free resin was black in color and soft to fluid in consistency.

Example 86a

|  | Grams |
|---|---|
| Menthylphenol (1.0 mole) | 232 |
| 2-ethyl-3-propyl acrolein (1.0 mole) | 126 |
| Concentrated H₂SO₄ | 2.5 |
| Xylene | 150 |

The same procedure was followed as in Example 79a. The solvent-free resin was black in color and soft to fluid in consistency.

Example 87a

|  | Grams |
|---|---|
| Menthylphenol (2.0 moles) | 464 |
| Formaldehyde, 37% (5.0 moles) | 405 |
| NaOH in 30 c. c. H₂O | 6.8 |
| Monoalkyl (C₁₀–C₂₀, principally C₁₂–C₁₄) benzene monosulfonic acid sodium salt | 2 |
| Xylene | 300 |

The above reactants were combined in a resin pot similar to that previously described, equipped with stirrer and reflux condenser. The reactants were heated with stirring under reflux for 2 hours at 100° to 110°. The resinous mixture was then permitted to cool sufficiently to permit the addition of 15 ml. of glacial acetic acid in 150 c. c. H₂O. On standing, a separation was effected and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The solvent-free resin was light amber in color, non-brittle, and semi-pliable to hard.

*Example 88a*

| | |
|---|---|
| Nonylphenol (3.0 moles) grams | 660 |
| Formaldehyde, 30% (6.6 moles) do | 652 |
| NaOH in 30 c. c. H$_2$O do | 6.8 |
| Monoalkyl (C$_{10}$–C$_{20}$, principally C$_{12}$–C$_{14}$) benzene monosulfonic acid sodium salt grams | 2 |
| Xylene do | 300 |
| Glacial acetic acid ml | 15 |

The procedure used was the same as that of Example 87a. The solvent-free resin was clear, dark amber in color and soft to fluid in consistency.

*Example 89a*

| | |
|---|---|
| Nonylphenol (3.0 moles) grams | 660 |
| Formaldehyde, 30% (3.3 moles) do | 330 |
| NaOH in 30 c. c. H$_2$O do | 6.8 |
| Monoalkyl (C$_{10}$–C$_{20}$, principally C$_{12}$–C$_{14}$) benzene monosulfonic acid sodium salt grams | 2 |
| Xylene do | 100 |
| Glacial acetic acid ml | 15 |

The same procedure was followed as in Example 87a. The solvent-free resin was clear, dark red in color and semi-fluid or tacky in consistency.

*Example 90a*

| | Grams |
|---|---|
| Nonylphenol (1.0 mole) | 220 |
| Furfural (Na$_2$CO$_3$ treated) (1.0 mole) | 96 |
| Potassium carbonate | 12 |
| Xylene | 200 |

The furfural was shaken with dry sodium carbonate prior to use to eliminate any acids, etc. The procedure employed was substantially that described in detail in Technical Bulletin No. 109 of the Quaker Oats Company, Chicago, Illinois. The materials, except the xylene, were heated under the reflux condenser for two hours in the same resin pot arrangement described in Example 1a. At the end of this heating or reflux period the trap was set to remove the water, and the xylene added after most of the water had distilled. The maximum temperature during and after removal of water was approximately 205° C. The resin was a reddish black, clear resin, xylene-soluble, and semi-soft to pliable in consistency.

*Example 91a*

| | Grams |
|---|---|
| Menthylphenol (1.0 mole) | 232 |
| Furfural (Na$_2$CO$_3$ treated) (1.0 mole) | 96 |
| Potassium carbonate | 12 |
| Xylene | 200 |

The procedure followed was identical with that in Example 90a. The solvent-free resin was reddish black in color, hard, brittle, with a melting point of 158° to 163° C., and showed a definite tendency towards being heat curable.

*Example 92a*

A duplication of the resin described under the heading of Example 88a was prepared and subjected to distillation. Distillation without vacuum was first employed to eliminate the xylene. After the elimination of xylene the resin was subjected to vacuum distillation to 225° C., at 25 mm. Hg. The resulting resin was black in color, semi-fluid but of distinctly greater viscosity or hardness than the undistilled resin, and was still perfectly xylene-soluble.

*Example 93a*

A duplicate sample of the resin described under the heading "Example 89a" was prepared and subjected to vacuum distillation, in the same manner as described in Example 92a, preceding. The resin obtained by the vacuum distillation was reddish-black in color, had a melting point of 100° to 105° C., and was xylene-soluble.

*Example 94a*

A duplicate of the resin described in Example 69a was prepared and subjected to vacuum distillation in the same manner as described in Example 92a. The resulting resin was a hard, brittle, amber colored resin, xylene-soluble and had a melting point of 145° to 150° C.

*Example 95a*

A duplicate of the resin described in Example 70a was prepared and subjected to distillation, including vacuum distillation, in the same manner as described in Example 92a. The resulting resin was a clear, hard, brittle, xylene-soluble resin, amber colored, and had a melting point of 80° to 85° C.

*Example 96a*

A duplicate of the resin described in Example 87a was prepared and subjected to distillation, including vacuum distillation, in the same manner as described in Example 92a. The resulting product was hard and brittle, with a melting point of 135° to 140° C. Otherwise the physical characteristics were approximately the same as in the non-distilled product.

*Example 97a*

| | Grams |
|---|---|
| Nonylphenol (31 moles) | 6,820 |
| Formaldehyde, 37% (42 moles) | 3,430 |
| NaOH (in 200 c. c. H$_2$O) | 93 |
| Xylene | 2,040 |

The above reactants were combined in a 5-gallon autoclave and heated with stirring in the following manner:

| Time | Temperature | Pounds per Square Inch |
|---|---|---|
| | °C. | |
| 10:30 a. m. | 25 | 0 |
| 11:00 a. m. | 100 | 15 |
| 11:30 a. m. | 127 | 40 |
| 12:00 noon | 148 | 60 |
| 1:00 p. m. | 177 | 130 |
| 1:30 p. m. | 185 | 160 |
| 2:00 p. m. | 194 | 185 |

The reaction was stopped at this point, sufficient cooling water was applied to lower the temperature to approximately 80° C., or cool enough to permit opening the autoclave and adding 202 grams of glacial acetic acid to neutralize the NaOH.

The product was then removed from the autoclave and the resin solution diluted further so as to effect a ready separation of the aqueous layer. After twice washing with water to remove the excess formaldehyde, acetic acid and formed salt, the resin was subjected to vacuum distillation to 149° C. at 25 mm. Hg vacuum. The resulting resin was reddish black in color, xylene-soluble, hard but not brittle, and had a melting point of 85° to 90° C.

Example 98a

| | Grams |
|---|---|
| Nonylphenol (22.5 moles) | 4,980 |
| Formaldehyde, 37% (25.5 moles) | 2,076 |
| Monoalkyl ($C_{10}$–$C_{20}$, principally $C_{12}$–$C_{14}$) benzene monosulfonic acid sodium salt | 15 |
| NaOH (in 200 c. c. $H_2O$) | 67 |
| Xylene | 4,000 |

The above reactants were combined in a 5-gallon autoclave and heated with stirring, under pressure. The reactants were heated for 1¾ hours after temperature had reached 110° C. The maximum temperature was 190° C. and the maximum pressure was 245 pounds per square inch.

After cooling, more than sufficient (148 grams) glacial acetic acid was added to neutralize the alkaline catalyst. The resin mixture was diluted, washed and distilled in a manner similar to that in the Example 97a. The resulting solvent-free resin, after vacuum (25 mm.) distillation to 150° C., was semi-hard to pliable, amber colored, and xylene-soluble. If the vacuum distillation is further carried to 200° C., the resulting product is a hard, brittle resin with a melting point of 90° to 95° C. It is amber in color and xylene-soluble.

Example 99a

| | Grams |
|---|---|
| Nonylphenol (34 moles) | 7,470 |
| Formaldehyde, 37% (38 moles) | 3,114 |
| Xylene | 2,020 |
| Catalyst | None |

The above reactants were combined in a 5-gallon autoclave. They were heated with stirring under pressure for a total heating time (time starting when temperature reached 100° C.) of 5 hours with a maximum temperature of 200° C., and maximum gauge pressure of 235 pounds per square inch.

After removing the resin mixture from the autoclave, it was diluted further with approximately 7000 grams of xylene. This was done to thin the resin sufficiently to permit a ready separation of the water and unreacted formaldehyde. After twice washing the xylene resin solution with water to assure the removal of any unreacted formaldehyde, the solution was subjected to vacuum distillation (25 mm.) to 145° C., to remove the xylene.

The resulting resin was clear, xylene soluble, amber colored and semi-hard or pliable in consistency.

Example 100a

| | Grams |
|---|---|
| Para-ethylphenol, technically pure (2.0 moles) | 244 |
| Formaldehyde, 37% (2.06 moles) | 167 |
| Concentrated HCl | 3.8 |
| Monoalkyl ($C_{10}$–$C_{20}$, principally $C_{12}$–$C_{14}$) benzene monosulfonic acid sodium salt | 1.5 |
| Xylene | 200 |

The phenol, formaldehyde and acid catalyst were combined without the solvent in the resin pot described in Example 1a. Heat was applied with gentle stirring and the temperature was raised to 80°–85° C., at which point a mild exothermic reaction took place. This reaction raised the temperature to approximately 100°–105° C. The reaction mixture was then permitted to reflux gently by the application of heat. This period of gentle reflux was continued for approximately one-half hour. At the end of this time there was obtained a viscous, creamy mass. The 200 grams of xylene previously indicated were added to the reaction mass during this creamy stage so as to thin it sufficiently to permit efficient agitation. The solvent-diluted mass was refluxed for one hour longer at approximately 105° C. before attempting to remove the water by the usual trap arrangement. At this point, that is after 1½ hours refluxing, the trap arrangement was changed from the reflux position to the normal water entrapment position. The water of solution and the water of reaction were permitted to distill out and collect in the trap. As the water distilled out the temperature gradually increased to approximately 150° C., which required somewhat less than three hours. The solvent-free resin was amber in color, xylene soluble and had a comparatively high melting point, to wit, 200° to 210° C. The final product contained approximately 40% xylene and 60% resin.

Example 101a

| | Grams |
|---|---|
| Para-ethylphenol, technically pure (2.0 moles) | 244 |
| Formaldehyde, 37½% (2.05 moles) | 162 |
| Concentrated HCl | 2.5 |
| Monoalkyl ($C_{10}$–$C_{20}$, principally $C_{12}$–$C_{14}$) benzene monosulfonic acid sodium salt | 1.0 |
| Xylene | 150 |

It will be noted that the reactants in this example are substantially the same as in the preceding example. The amount of xylene used, however, is somewhat less. In the instant procedure the xylene was added at the beginning of the reaction. More specifically, the procedure is as follows. The equipment used was the same.

In this instance the phenol, formaldehyde, acid catalyst and solvent were combined in the resin pot above described. Heat was applied with gentle stirring and the temperature was raised to 80°–85° C. at which point an exothermic reaction took place. This reaction raised the temperature to approximately 105°–110° C. The reaction mixture was then permitted to reflux at 100°–105° C., for between one and 1½ hours. The reflux trap arrangement was then changed from the reflux position to the normal water entrapment position. The water of solution and the water of reaction were permitted to distill out and collect in the trap. As the water distilled out the temperature gradually increased to approximately 150° C., which required between 1½ to 2 hours. At this point the water recovered in the trap, after making allowance for a small amount of water held up in the solvent, corresponded to the expected quantity.

Example 102a

The same procedure was followed as in Example 101a except that the para-ethylphenol was replaced by an equal amount of ortho-ethylphenol. The ortho-ethylphenol was an amber colored liquid. The resin is amber and semi-fluid.

Example 103a

| | Grams |
|---|---|
| Para-isopropylphenol,[1] technically pure (1.0 mole) | 136 |
| Formaldehyde, 37% (1.0 mole) | 81 |
| HCl (concentrated) | 1.5 |
| Monoalkyl ($C_{10}$–$C_{20}$, principally $C_{12}$–$C_{14}$) benzene monosulfonic acid sodium salt | .3 |

| | Grams |
|---|---|
| Xylene | 100 |
| Diethyl Carbitol (Diethyl Carbitol is a trade name for the diethyl ether of diethylene glycol) | 50 |

¹ Para-isopropylphenol is a white solid.

The same procedure was followed as in Example 101a preceding except that the Diethyl Carbitol was not added at the beginning of the reaction. When the resinification reaction was complete the xylene solution was not clear but had a cloudy appearance. 50 grams of Diethyl Carbitol were added at this point so as to produce a clear solution. Due to the fact that Diethyl Carbitol boils at a comparatively high temperature no effort was made to obtain any solvent-free resin in order to determine its appearance or melting point.

*Example 104a*

The phenol employed was ortho-isopropylphenol. This was a viscous liquid, having a pale amber color. Otherwise the procedure followed was the same as that in the preceding example. The resin seemed to be distinctly more xylene-soluble than the corresponding resin obtained from the para derivative. The Diethyl Carbitol was added purely by way of precaution.

*Example 105a*

| | Grams |
|---|---|
| Thymol (1 mole) | 151 |
| Formaldehyde, 37% (1 mole) | 81 |
| HCl (concentrated) | 1.5 |
| Monoalkyl ($C_{10}$–$C_{20}$, principally $C_{12}$–$C_{14}$) benzene monosulfonic acid sodium salt | 0.8 |
| Xylene | 200 |

The same procedure was followed as in Example 101a. The solvent-free resin was a hard, brittle amber colored product, with a melting point of 148° to 153° C. The resin showed some tendency towards being heat curable. The thymol employed was of pharmaceutical quality.

*Example 106a*

| | Grams |
|---|---|
| Para-ethylphenol (2.0 moles) | 244 |
| Acetaldehyde (2.0 moles) | 88 |
| Concentrated $H_2SO_4$ | 2.5 |
| Xylene | 150 |

The phenol, acid catalyst, and 50 grams of xylene were combined in the resin pot previously described. The initial mixture did not include the aldehyde. The mixture was heated with stirring to approximately 150° C. and permitted to reflux.

The remainder of the xylene, 100 grams, was then mixed with the acetaldehyde; this mixture was added slowly to the materials in the resin pot, with constant stirring, by means of the separatory funnel arrangement. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to 1½ hours before removing the water by means of the trap arrangement. After the water was removed the remainder of the procedure was essentially the same as in Example 100a. The solvent-free resin was reddish black in color and soft to pliable in consistency. The resin solution as obtained contained just a trifle over 30% xylene.

*Example 107a*

| | Grams |
|---|---|
| Para-ethylphenol (2.0 moles) | 244 |
| Propionaldehyde, 96% (2.0 moles) | 121 |
| Concentrated $H_2SO_4$ | 2.5 |
| Xylene | 150 |

The procedure followed was the same as that described under Example 106a. The solvent-free resin was dark amber in color, and soft to pliable in consistency. The resin solution contained a little in excess of 30% xylene.

*Example 108a*

| | Grams |
|---|---|
| Para-ethylphenol (2.0 moles) | 244 |
| Benzaldehyde (2.0 moles) | 212 |
| Concentrated $H_2SO_4$ | 2.5 |
| Xylene | 150 |

The procedure followed was the same as that described in Example 106a. The solvent-free resin was clear, reddish amber in color, and semi-hard or pliable in consistency. The solution contained a little over 25% xylene.

*Example 109a*

| | Grams |
|---|---|
| Para-isopropylphenol (1.0 mole) | 136 |
| Benzaldehyde (1.0 mole) | 106 |
| Concentrated $H_2SO_4$ | 1.8 |
| Xylene | 100 |

The same procedure was followed as in Example 106a. The resin obtained was opaque or dark amber to black in color, and soft to fluid in consistency. This solution contained somewhat less than 30% xylene.

*Example 110a*

| | Grams |
|---|---|
| Para-ethylphenol (2.0 moles) | 244 |
| Butyraldehyde (1.05 moles) | 75.6 |
| Concentrated $H_2SO_4$ | 4.0 |
| Xylene | 100 |

The same procedure was followed as in Example 106a. The resin obtained was dark red in color and soft to fluid in appearance. The solution contained approximately 25% xylene.

*Example 111a*

| | Grams |
|---|---|
| Para-ethylphenol (2.0 moles) | 244 |
| Heptaldehyde (1.05 moles) | 119.5 |
| Concentrated $H_2SO_4$ | 4 |
| Xylene | 100 |

The same procedure was followed as in Example 106a. The resin obtained was dark red in color, fluid in consistency, and the solution contained 22½% xylene.

*Example 112a*

| | Grams |
|---|---|
| Para-ethylphenol (2.0 moles) | 244 |
| Furfural (treated with $Na_2CO_3$) (2.0 moles) | 192 |
| Potassium carbonate | 12 |
| Xylene | 250 |

The furfural was shaken with dry sodium carbonate prior to use to eliminate any acids, etc. The procedure employed was substantially that described in detail in Technical Bulletin No. 109 of the Quaker Oats Company, Chicago, Illinois. The reactants were heated under the reflux condenser for two hours in the same resin pot arrangement. The separatory funnel device was not employed. No xylene or other solvent was added. The amount of material vaporized and condensed was comparatively small except for the water of reaction. At the end of this heating or reflux period the trap was set to remove the water. The maximum temperature during and after removal of water was approximately 202° C. The resin was a reddish black, clear, hard, brittle resin, having a melting point of 175° C. to 180° C., and definitely heat-curable. When the resinification was complete, as a matter of convenience instead of pouring the hot resin and subsequently dissolving it in xylene, the amount of xylene indicated was added simply for purposes of dilution. The product contains about 38% xylene.

Example 113a

|  | Grams |
|---|---|
| Para-ethylphenol (4.0 moles) | 488 |
| Formaldehyde, 37% (4.4 moles) | 356 |
| NaOH in 30 c. c. $H_2O$ | 6.8 |
| Xylene | 350 |

The above reactants were combined in a resin pot similar to that previously described, equipped with stirrer and reflux condenser. The reactants were heated with stirring under reflux for 2 hours at 100° C. to 110° C. The resinous mixture was then permitted to cool sufficiently to permit the addition of 15 ml. of glacial acetic acid in 150 c. c. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The product was semi-hard to pliable and light amber in color. The solution as prepared contained approximately 36% xylene.

Example 114a

|  | Grams |
|---|---|
| Para-isopropylphenol (4.0 moles) | 544 |
| Formaldehyde, 37% (4.4 moles) | 356 |
| NaOH in 30 c. c. $H_2O$ | 6.8 |
| Xylene | 350 |

The procedure followed was the same as in Example 113a, using 15 ml. of glacial acetic acid as mentioned in that example.

Example 115a

A resin was made which was the duplicate of that of Example 111a. This resin was then heated under vacuum so as to eliminate the xylene and also cause further polymerization.

Example 116a

The same procedure was followed as in Example 115a but instead of using a resin prepared from 244 grams of para-ethylphenol as described in Example 111a, there was employed instead a resin made in the same manner from para-isopropylphenol, in which 272 grams of the isopropylphenol replaced the 244 grams of para-ethylphenol. Otherwise the procedure was identical with that described in Example 111a. The vacuum distillation of the resin so obtained was exactly identical with that described in Example 115a.

Example 117a

|  | Grams |
|---|---|
| Ortho-isopropylphenol (3.5 moles) | 475 |
| Formaldehyde, 37% (3.85 moles) | 312 |
| Xylene | 500 |

No catalyst was used. The reactants were placed in an autoclave and stirred while heating to a temperature of approximately 165° C. The total period of reaction was 9½ hours. During the early part of this period the temperature was 167° C. with a gauge pressure of 150 pounds. During the last part of the period, the pressure was 140 pounds gauge pressure while the temperature held at about 150° C. After this 9½ hour reaction period the autoclave was allowed to cool. The liquids were withdrawn and the xylene solution of the resin was decanted away from the small aqueous layer. To the xylene solution were added 1,000 grams of xylene, and the solution was washed several times to remove excess formaldehyde. The solvent and any water were removed by vacuum distillation to 150° C. at 20 mm., giving a reddish-black, semi-viscous or fluid, xylene-soluble resin. If desired, one may use considerable higher pressures so as to speed up the reaction and also in order to obtain resins of higher molecular weight. We have employed the same procedure with moderately higher temperatures and definitely higher pressures.

Example 118a

|  | Grams |
|---|---|
| Paracresol (1.0 mole) | 108 |
| Formaldehyde, 37% (1.0 mole) | 81 |
| Concentrated HCl | 1.5 |
| Monoalkyl ($C_{10-20}$, principally $C_{12}$–$C_{14}$) benzene monosulfonic acid sodium salt | 0.8 |
| Xylene | 100 |

The phenol used was paracresol of commerce. The procedure followed was that described in Example 1a. The resin was dark and brittle, and melted at 114–120° C.

Example 119a

The same procedure was followed as in Example 118a except that commercial orthocresol was used instead of commercial paracresol. The resulting resin was a dark brown resin.

Example 120a

The same procedure was followed as in Example 118a except that 122 grams of xylenol of the following structure were employed instead of the cresol:

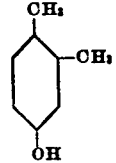

This particular xylenol is a solid at ordinary room temperature, has a purity in excess of 95%, and is sometimes known in the trade as 1,2,4 xylenol. The resulting resin was a hard resin, dispersible in xylene but not too soluble.

Example 121a

|  | Grams |
|---|---|
| Paracresol (3.0 moles) | 324 |
| Acetaldehyde (3.0 moles) | 132 |
| Concentrated $H_2SO_4$ | 6 |
| Xylene | 100 |

The phenol, acid catalyst, and 50 grams of the xylene were combined in the resin pot previously described. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 118a. The resin obtained was a semi-hard pliable material of reddish amber color.

Example 122a

| | Grams |
|---|---|
| Paracresol (2.0 moles) | 216 |
| Benzaldehyde (2.0 moles) | 212 |
| Concentrated H$_2$SO$_4$ | 5 |
| Xylene | 100 |

The procedure employed was essentially the same as in Example 121a where acetaldehyde was employed, but with the difference that due to the fact that the particular aldehyde was a higher boiling aldehyde it was not necessary to dilute it with the xylene. For this reason all the xylene was added to the initial mixture, and the higher boiling aldehyde was added by means of the separatory funnel arrangement. Thus, the phenol, acid catalyst, and solvent were combined in a resin pot by the same procedure used as in Example 121a. The resin was reddish in color and brittle in consistency.

Example 123a

| | Grams |
|---|---|
| Orthocresol (2.0 moles) | 216 |
| Butyraldehyde (2.0 moles) | 144 |
| Concentrated H$_2$SO$_4$ | 4 |
| Xylene | 100 |

The procedure followed was identically the same as that in Example 122a. The solvent-free resin obtained was soft to tacky in consistency.

Example 124a

| | Grams |
|---|---|
| Orthocresol (2.0 moles) | 216 |
| Heptaldehyde (2.0 moles) | 228 |
| Concentrated H$_2$SO$_4$ | 4.0 |
| Xylene | 100 |

The procedure followed was the same as that used in Example 122a. The solvent-free resin obtained was dark red in color and soft to fluid in consistency.

Example 125a

| | Grams |
|---|---|
| 1,3,4 xylenol (sometimes called 1,2,4, xylenol) (2.0 moles) | 244 |
| Heptaldehyde (2.0 moles) | 228 |
| Concentrated H$_2$SO$_4$ | 4 |
| Xylene | 100 |

The procedure followed was the same as that used in Example 122a. The solvent-free resin obtained was soft to fluid in consistency and reddish black in color.

Example 126a

| | Grams |
|---|---|
| Paracresol (1.0 mole) | 108 |
| Furfural (1.0 mole) | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 118a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was dark and gummy.

Example 127a

| | Grams |
|---|---|
| Paracresol (0.9258 mole) | 100 |
| Formalin (1.15 moles) | 95.81 |
| Abietic acid (0.06 mole) | 20 |
| Ammonium hydroxide (30%) | 3 |

The reactants were placed in a three-necked 500 cc. flask and stirred until the abietic acid had dissolved. Stirring was continued and the contents heated to about 97.5° and refluxed at this temperature for 45 minutes. At this time a trap arrangement was added to the apparatus so as to remove the water in the conventional manner. At the time the removal of water started there was no apparent separation of the mixture. Approximately 88 grams of water were removed and the product heated at approximately 150° C. for 15 minutes after no more water came over. The final product was a dark brittle resin.

Example 128a

| | Grams |
|---|---|
| Eicosanyl phenol (90% purity as described) (1.0 mole) | 416 |
| Formaldehyde (37%) (1.1 moles) | 90 |
| Concentrated HCl | 3 |
| Monoalkyl (C$_{10}$–C$_{20}$, principally C$_{12}$–C$_{14}$) benzene monosulfonic acid sodium salt | 1.5 |
| Xylene | 150 |

The eicosanyl phenol was a dark amber colored viscous liquid obtained by the alkylation of phenol with the tertiary carbinol obtained by the Grignard reaction of ethyl caprate and amyl bromide in molar proportions of 1:2. This material contained at least 90% substituted phenol considered to be primarily para-substituted with some ortho- and perhaps an insignificant amount of meta-substituted phenol. The procedure followed was that of Example 1a. The resulting resin was amber colored, hard, and with a somewhat tacky feel, possibly the result of the 10% impurities in the phenol used.

Example 129a

The procedure was the same as that of Example 128a except that the 416 grams of eicosanyl phenol were replaced by 447 grams of docosanyl phenol, prepared in the same way but with the use of ethyl laurate instead of ethyl caprate. The resin obtained was similar in appearance to that of Example 128a but was somewhat softer.

Example 130a

The procedure followed was the same as that of Example 128a except the eicosanyl phenol was replaced by 478 grams of tetracosanyl phenol, prepared in the same manner but with the use of ethyl myristate. The resin obtained was similar in appearance to that of Example 128a but was considerably softer.

Phenols with hydrocarbon substituents containing 20 to 24 carbon atoms have also been prepared in other ways, for example, by the monochlorination of waxes from Pennsylvania crudes having molecular weights indicating the presence of 20 to 24 carbon atoms in the molecule. A phenol prepared in this way, using zinc chloride as the alkylation catalyst, converted to a resin as in Example 128a by using 447 grams of the phenol to allow for the presence of impurities, gave a dark, tacky to semi-hard resin. The cut was selected to have an average molecular weight of 22 carbon atoms, to give a mixture of difunctional phenols with 20 to 24 carbon atom substituents, although the presence of lighter or heavier materials in the selected fraction, which presumably carried over into the phenol, is not improbable, because a product having an average molecular weight of, say, 22 carbon atoms, is equivalent to either a $C_{20}$–$C_{24}$ fraction or a $C_{18}$–$C_{26}$ fraction, etc.

Example 131a

| | Grams |
|---|---|
| Orthocresol (1.0 mole) | 108 |
| Para-ethylphenol (1.0 mole) | 122 |
| Formaldehyde, 37% (2.0 moles) | 162 |
| Concentrated HCl | 4 |
| Monoalkyl ($C_{10}$–$C_{20}$, principally $C_{12}$–$C_{14}$) benzene monosulfonic acid sodium salt | 1.5 |
| Xylene | 200 |

The procedure followed was the same as that of Example 1a. The solvent-free resin was hard, brittle, amber, and melted at 135–140° C.

Example 132a

The resin was made in the same manner as outlined in Example 131a, except that 1,3,4 xylenol (1,2,4 xylenol counting the methyl position as No. 1 position) was substituted in molecular proportion for the orthocresol. Thus, instead of using 108 grams of orthocresol there was used 122 grams of xylenol. In all other respects the procedure was identical. The resulting resin, minus solvent, was somewhat harder than that obtained employing orthocresol. It had a melting point of about 160° to 165° C., but otherwise the appearance was the same as that of the resin derived from cresol.

Example 133a

The resin was made in the same manner as in Example 131a, except that the para-ethylphenol was replaced by para-tertiaryamyl phenol in molecular proportion. Thus, 122 grams of para-ethylphenol were replaced by 164 grams of amylphenol and the amount of xylene was increased from 200 grams to 250 grams. The solvent-free resin was hard, brittle, and amber in color. It was slightly opalescent, fairly soluble in xylene, and had a melting point of 135° to 145° C.

Example 134a

The same procedure was followed as in Example 131a, except that the orthocresol was replaced by xylenol and the ethylphenol by para-tertiaryamylphenol. Thus, instead of using 108 grams of orthocresol there was used 122 grams of 1,3,4 xylenol; instead of using 122 grams of para-ethylphenol there was used 164 grams of para-tertiaryamylphenol, and 250 grams of xylene were used instead of 200 grams. The resultant resin on a solvent-free basis was hard, brittle, and reddish in color. It was not completely soluble in xylene but was reasonably soluble. The resin itself had a melting point of 180° to 185° C.

Example 135a

The same procedure was followed as in Example 131a, except that the para-ethylphenol was replaced by a molar equivalent of para-nonylphenol. Specifically, 122 grams of para-ethylphenol were replaced by 220 grams of para-nonylphenol. The amount of xylene was reduced from 200 grams to 100 grams. The solvent-free resin was reddish amber in color, xylene-soluble, and soft or pliable in consistency.

Example 136a

The same procedure was followed as in Example 131a except that the orthocresol was replaced by 1,3,4 xylenol, and the para-ethylphenol was replaced by para-nonylphenol. Specifically, 108 grams of orthocresol were replaced by 122 grams of 1,3,4 xylenol, and 122 grams of para-ethylphenol were replaced by 220 grams of para-nonylphenol. The xylene was increased from 200 to 250 grams. The solvent-free resin obtained was amber in color, xylene-soluble, and somewhat harder in nature than resin in the previous example.

Example 137a

The same procedure was followed as in Example 131a, except that the para-ethylphenol was replaced by an equimolar amount of para-phenylphenol. Specifically, 122 grams of para-ethylphenol were replaced by 170 grams of para-phenylphenol. The xylene was increased from 200 to 250 grams. The resin obtained was hard and brittle, having a melting point of about 130° to 135° C. It was reddish amber in color, and not particularly transparent, being somewhat opaque in appearance. It was not particularly soluble in xylene but dispersed sufficiently for the purpose intended.

Example 138a

The same procedure was followed as in Example 131a, except that 108 grams of orthocresol were replaced by 122 grams of 1,3,4 xylenol, and 122 grams of para-ethylphenol were replaced by 170 grams of para-phenylphenol. The xylene was increased from 200 grams to 300 grams. The solvent-free resin was hard, brittle, and not particularly transparent. It was xylene dispersible to an extent sufficient for the purpose intended but not completely soluble. The solvent-free resin had a melting point of 150° to 155° C.

Example 139a

The same procedure was followed as in Example 131a, except that the orthocresol was replaced by an equal weight of paracresol and the 122 grams of paraethylphenol were replaced by 198 grams of para-phenylethylphenol (para-styrylphenol). The solvent-free resin obtained was hard, brittle, greenish-black in color, with a melting point of 130° to 135° C.

Example 140a

| | Grams |
|---|---|
| Orthocresol (1.0 mole) | 108 |
| Para-ethylphenol (1.0 mole) | 122 |
| Acetaldehyde (2.0 moles) | 88 |
| Concentrated $H_2SO_4$ | 4 |
| Xylene | 200 |

The phenol, acid catalyst, and 50 grams of the xylene were combined in the resin pot previously described. The initial mixture did not include the aldehyde. The mixture was heated with stirring to approximately 150° C. and permitted to reflux. The remainder of the xylene, 150 grams, was then mixed with the acetaldehyde; and this mixture was added slowly to the materials in the resin pot, with constant stirring, by means of the separatory funnel arrangement. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 131a. The resulting resin minus solvent was reddish-black in color, xylene-soluble, and very soft or semi-fluid in consistency.

Example 141a

The same procedure was followed as in Example 140a, except that the 108 grams of orthocresol were replaced by 122 grams of 1,3,4 xylenol. The solvent-free resin obtained was reddish-black in color, soft or semi-fluid in consistency, and xylene-soluble.

Example 142a

The same procedure was followed as in Example 140a, except that the 122 grams of para-ethylphenol were replaced by 164 grams of para-tertiaryamylphenol. In all other respects the procedure was identical. The solvent-free resin was dark reddish-black in color, xylene-soluble, and soft or semi-fluid in consistency.

Example 143a

The same procedure was followed as in Example 140a, except that the 108 grams of orthocresol were replaced by 122 grams of 1,3,4 xylenol, and the 122 grams of para-ethylphenol were replaced by 164 grams of para-tertiaryamylphenol. The solvent-free resin was dark red in color, soft to fluid in consistency, and xylene-soluble.

Example 144a

The same procedure was followed as in Example 140a, except that the 122 grams of para-ethylphenol were replaced by 220 grams of para-nonylphenol. The solvent-free resin was dark red in color, readily soluble in xylene, and almost fluid in consistency.

Example 145a

The same procedure was followed as in Example 140a, except that the 108 grams of orthocresol were replaced by 122 grams of 1,3,4 xylenol, and the 122 grams of para-ethylphenol were replaced by 220 grams of para-nonylphenol. The solvent-free resin was dark red in color, readily soluble in xylene, and almost fluid in consistency.

Example 146a

The same procedure was followed as in Example 140a, except that the 122 grams of para-ethylphenol were replaced by 170 grams of para-phenylphenol. The resin, minus solvents, is dark red in color, soluble in xylene, and semi-hard or tar-like in consistency.

Example 147a

The same procedure was followed as in Example 140a, except that the 108 grams of orthocresol were replaced by 122 grams of 1,3,4 xylenol, and the 122 grams of para-ethylphenol were replaced by 170 grams of para-phenylphenol. The solvent-free resin obtained was dark red in color, soluble in xylene, semi-hard or pliable in consistency, and a trifle harder than the sample described in Example 146a.

Example 148a

| | Grams |
|---|---|
| Menthylphenol (1.0 mole) | 232 |
| Paracresol (1.0 mole) | 108 |
| Butyraldehyde (2.0 moles) | 144 |
| Concentrated $H_2SO_4$ | 5 |
| Xylene | 200 |

The procedure employed was essentially the same as in Example 140a where acetaldehyde was employed, but with the difference that due to the fact that the particular aldehyde was a higher boiling aldehyde it was not necessary to dilute it with xylene. For this reason all the xylene was added to the initial mixture, and the higher boiling aldehyde was added by means of the separatory funnel arrangement. Thus, the phenol, acid catalyst, and solvent were combined in a resin pot by the same procedure used as in Example 140a. The solvent-free resin was dark red, semi-hard in consistency, and xylene-soluble.

Example 149a

| | Grams |
|---|---|
| Menthylphenol (1.0 mole) | 232 |
| Para-cresol (1.0 mole) | 108 |
| Heptaldehyde (2.0 moles) | 228 |
| Concentrated $H_2SO_4$ | 5 |
| Xylene | 200 |

The procedure employed was the same as described in the preceding example. The resulting resin was a viscous fluid, dark red in color and xylene-soluble.

Example 150a

| | Grams |
|---|---|
| Menthylphenol (1.0 mole) | 232 |
| Para-cresol (1.0 mole) | 108 |
| Formaldehyde, 37% (2.2 moles) | 176 |
| Concentrated HCl | 4 |
| Monoalkyl ($C_{10}$–$C_{20}$, principally $C_{12}$–$C_{14}$) benzene monosulfonic acid sodium salt | 1 |
| Xylene | 200 |

The procedure followed was the same as that described in Example 131a. The resin obtained was hard, brittle and almost black in color, and xylene-soluble.

Example 151a

| | Grams |
|---|---|
| Menthylphenol (1.0 mole) | 232 |
| Para-cresol (1.0 mole) | 108 |
| Acetaldehyde (2.0 moles) | 88 |
| Concentrated $H_2SO_4$ | 5 |
| Xylene | 130 |

The same procedure was followed as in Example 140a. The resulting resin was semi-hard, dark red in color, and xylene-soluble.

Example 152a

The ortho cresol para-tertiary amyl phenol resin of Example 133a was subjected to distillation in vacuum (25 mm. Hg) up to 200° C. to remove xylene and a slight amount of oily material. The resultant resin was a hard, dark brown resin, distinctly harder than the xylene-free resin prior to vacuum distillation. It had a melting point in the neighborhood of 140° C. It was xylene soluble.

Example 153a

| | Grams |
|---|---|
| Para-tertiary butylphenol (1.0 mole) | 1.50 |
| Orthocresol (1.0 mole) | 108 |
| Formaldehyde, 37% (2.0 moles) | 162 |
| Concentrated HCl | 4 |
| Monoalkyl ($C_{10}$–$C_{20}$, principally $C_{12}$–$C_{14}$) benzene monosulfonic acid sodium salt | 1.5 |
| Xylene | 200 |

The procedure followed was the same as in Example 1a. The resin was a hard, dark red resin which was xylene soluble.

Example 154a

| | Grams |
|---|---|
| Para-octylphenol (1.0 mole) | 206 |
| Orthocresol (1.0 mole) | 108 |
| Formaldehyde, 37% (2.0 moles) | 162 |
| Concentrated HCl | 4.5 |
| Monoalkyl ($C_{10}$–$C_{20}$, principally $C_{12}$–$C_{14}$) benzene monosulfonic acid sodium salt | 2 |
| Xylene | 200 |

The procedure followed was the same as in Example 1a. The resin was a hard, dark red resin, which was xylene soluble.

Example 155a

| | Grams |
|---|---|
| 4-ethyl 3-methylphenol (2.0 moles) | 272 |
| Formaldehyde, 37% (2.0 moles) | 162 |
| Concentrated HCl | 2.5 |
| Monoalkyl ($C_{10}$–$C_{20}$, principally $C_{12}$–$C_{14}$) benzene monosulfonic acid sodium salt | 1.0 |
| Xylene | 150 |

The procedure followed was the same as that of Example 1a. The product was a hard, amber resin.

Example 156a

| | Grams |
|---|---|
| Thymol (U. S. P.) (1.0 mole) | 150 |
| Formaldehyde, 37% (1.1 moles) | 90 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 200 |

The procedure followed was the same as that of Example 1a. The solvent-free resin was a hard, brittle, amber-colored resin, soluble in xylene, with a melting point of 148° to 150° C. It showed a tendency to be curable on prolonged heating.

Example 157a

| | Grams |
|---|---|
| Orthocresol (0.5 mole) | 54 |
| Amylphenol (0.5 mole) | 82 |
| Benzaldehyde (1.0 mole) | 106 |
| Sulfuric acid | 3 |
| Xylene | 200 |

The procedure followed was that of Example 24a. The solvent-free resin was xylene-soluble, clear, reddish black in color, hard and brittle, with a melting point of 135° to 140° C.

Example 158a

| | Grams |
|---|---|
| Orthocresol (2.0 moles) | 216 |
| Para-tertiary amylphenol (2.0 moles) | 328 |
| Formaldehyde, 37% | 370 |
| NaOH in 36 cc. $H_2O$ | 8.5 |
| Xylene | 240 |

The procedure followed was that of Example 44a. The solvent-free resin was xylene-soluble, almost colorless, and semi-solid or tacky in consistency.

Example 159a

| | Grams |
|---|---|
| Orthocresol (1.0 mole) | 108 |
| Para-isopropylphenol (1.0 mole) | 136 |
| Formaldehyde, 37% (2.0 moles) | 162 |
| Concentrated HCl | 4 |
| Monoalkyl ($C_{10}$–$C_{20}$, principally $C_{12}$–$C_{14}$) benzene monosulfonic acid sodium salt | 1.5 |
| Xylene | 200 |

The procedure followed was the same as that used of Example 1a. The solvent-free resin was hard, brittle, amber in color and xylene-soluble.

Example 160a

| | Grams |
|---|---|
| Paraphenylethylphenol (Styryl) (1.0 mole) | 198 |
| Para-ethylphenol (1.0 mole) | 122 |
| Formaldehyde, 37% (2.0 moles) | 162 |
| Concentrated HCl | 4 |
| Monoalkyl ($C_{10}$–$C_{20}$, principally $C_{12}$–$C_{14}$) benzene monosulfonic acid sodium salt | 1.5 |
| Xylene | 200 |

The procedure was the same as in Example 1a. The resin was hard, brittle, greenish-black and melted at 115–120° C.

Example 161a

| | Grams |
|---|---|
| Menthylphenol [1] (1.0 mole) | 232 |
| Para-tertiaryamylphenol (1.0 mole) | 164 |
| Formaldehyde, 37% (2.2 moles) | 176 |
| Concentrated HCl | 4.5 |
| Monoalkyl ($C_{10}$–$C_{20}$, principally $C_{12}$–$C_{14}$) benzene monosulfonic acid sodium salt | 1.5 |
| Xylene | 200 |

[1] Menthylphenol may be considered as para-(1-para-menthyl) phenol, the formula for which is $C_{10}H_{19}$·$C_6H_4OH$.

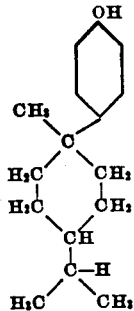

The same procedure was followed as in Example 1a. The resin obtained was a hard, brittle product, dark red in color, with a melting point of 145° to 150° C.

Example 162a

| | Grams |
|---|---|
| Menthylphenol (1.0 mole) | 232 |
| Para-tertiarybutylphenol (1.0 mole) | 150 |
| Formaldehyde, 37% (2.2 moles) | 176 |
| Concentrated HCl | 4 |

Monoalkyl (C$_{10}$–C$_{20}$, principally C$_{12}$–C$_{14}$)
  benzene monosulfonic acid sodium salt__ 1.5
Xylene _____ 200

The procedure followed was that of Example 1a. The resin obtained was a hard, brittle, dark red product, having a melting point of 155° to 160° C.

Example 163a

| | Grams |
|---|---|
| Menthylphenol (1.0 mole) | 232 |
| Para-nonylphenol (1.0 mole) | 220 |
| Formaldehyde, 37% (2.0 moles) | 162 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 200 |

The procedure followed was that of Example 1a. The resulting product was an amber colored resin having a melting point of 115° to 120° C.

Example 164a

| | Grams |
|---|---|
| Menthylphenol (1.0 mole) | 232 |
| Part-phenylethylphenol (Styryl) (1.0 mole) | 198 |
| Formaldehyde, 37% (2.2 moles) | 176 |
| Monoalkyl (C$_{10}$–C$_{20}$, principally C$_{12}$–C$_{14}$) benzene monosulfonic acid sodium salt | 2 |
| Concentrated HCl | 5 |
| Xylene | 200 |

The procedure followed was the same as in Example 1a. The resulting product was hard, not particularly brittle, dark red in color and had a melting point of 95° to 100° C.

Example 165a

| | Grams |
|---|---|
| Para-phenylethylphenol (Styryl) (1.0 mole) | 198 |
| Para-tertiaryamylphenol (1.0 mole) | 164 |
| Formaldehyde, 37% (2.0 moles) | 162 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 200 |

The same procedure was followed as in Example 1a. The resulting resin was hard, brittle and amber in color. It had a melting point of 110° to 115° C.

Example 166a

| | Grams |
|---|---|
| Para-phenylethylphenol (Styryl) (1.0 mole) | 198 |
| Para-tertiarybutylphenol (1.0 mole) | 150 |
| Formaldehyde, 37% (2.0 moles) | 162 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 200 |

The same procedure was followed as in Example 1a. The solvent-free resin was hard, brittle, and amber in color. It had a melting point of 120° to 125° C.

Example 167a

| | Grams |
|---|---|
| Menthylphenol (1.0 mole) | 232 |
| Para-phenylphenol (1.0 mole) | 170 |
| Formaldehyde, 37% (2.2 moles) | 176 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 250 |

The same procedure was followed as in Example 1a. The resin obtained was hard, brittle, dark brown in color, and had a melting point (230°–240° C.) that suggested some cross-linking had taken place. It was dispersible in xylene but not clearly soluble.

Example 168a

| | Grams |
|---|---|
| Para-nonylphenol (1.0 mole) | 220 |
| Para-tertiaryamylphenol (1.0 mole) | 164 |
| Formaldehyde, 37% (2.2 moles) | 180 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 200 |

The same procedure was followed as in Example 1a. The solvent-free resin was clear, reddish-amber in color, and semi-hard to pliable in consistency.

Example 169a

| | Grams |
|---|---|
| Para-phenylethylphenol (Styryl) (1.0 mole) | 198 |
| Para-nonylphenol (1.0 mole) | 220 |
| Formaldehyde, 37% (2.0 moles) | 162 |
| Concentrated HCl | 4 |
| Monoalkyl (C$_{10}$–C$_{20}$, principally C$_{12}$–C$_{14}$) benzene monosulfonic acid sodium salt | 1.5 |
| Xylene | 200 |

The procedure followed was the same as in Example 1a. The resulting solvent-free resin was amber in color, hard and brittle in consistency, and had a melting point of 75° to 80° C.

Example 170a

| | Grams |
|---|---|
| Para-phenylethylphenol (Styryl) (1.0 mole) | 198 |
| Para-ethylphenol | 122 |
| Acetaldehyde (2.0 moles) | 88 |
| Concentrated H$_2$SO$_4$ | 5 |
| Xylene | 200 |

The phenol, acid catalyst, and 50 grams of the xylene were combined in the resin pot. The initial mixture did not include the aldehyde. The mixture was heated with stirring to approximately 150° C. and permitted to reflux.

The remainder of the xylene, 150 grams, was then mixed with the acetaldehyde; and this mixture was added slowly to the materials in the resin pot, with constant stirring, by means of the separatory funnel arrangement. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. The solvent-free resin was dark red in color, and soft or pliable in consistency.

Example 171a

| | Grams |
|---|---|
| Para-phenylethylphenol (Styryl) (1.0 mole) | 198 |
| Para-butylphenol (1.0 mole) | 150 |
| Acetaldehyde (2.0 moles) | 88 |
| Concentrated H$_2$SO$_4$ | 5 |
| Xylene | 100 |

The same procedure was followed as in Example 170a. The resin was dark red in color, soft to pliable in consistency.

Example 172a

| | Grams |
|---|---|
| Para-phenylethylphenol (Styryl) (1.0 mole) | 198 |
| Para-amylphenol (1.0 mole) | 164 |
| Concentrated $H_2SO_4$ | 5 |
| Acetaldehyde (2.0 moles) | 88 |
| Xylene | 200 |

The procedure followed was the same as in Example 170a. The solvent free resin was dark red in color and soft to pliable in consistency.

Example 173a

| | Grams |
|---|---|
| Para-phenylethylphenol (Styryl) (1.0 mole) | 198 |
| Para-nonylphenol | 220 |
| Acetaldehyde (2.0 moles) | 88 |
| Concentrated $H_2SO_4$ | 5 |
| Xylene | 200 |

The procedure followed was the same as in Example 170a. The solvent-free resin was dark red in color and soft to pliable in consistency.

Example 174a

| | Grams |
|---|---|
| Menthylphenol (1.0 mole) | 232 |
| Para-butylphenol (1.0 mole) | 150 |
| Acetaldehyde (2.0 moles) | 88 |
| Concentrated $H_2SO_4$ | 5 |
| Xylene | 130 |

The procedure followed was the same as in Example 170a, except that the second addition of xylene consisted of 80 grams of xylene instead of 150 grams. The solvent-free resin obtained was hard, brittle, dark red in color. It was xylene-soluble and had a melting point of 40° to 45° C.

Example 175a

| | Grams |
|---|---|
| Menthylphenol (1.0 mole) | 232 |
| Para-phenylphenol (1.0 mole) | 170 |
| Acetaldehyde (2.0 moles) | 88 |
| Concentrated $H_2SO_4$ | 5 |
| Xylene | 120 |

The procedure followed was the same as in Example 170a, except that the second addition of xylene consisted of 70 grams. The resulting solvent-free resin was dark red in color, hard and semi-brittle in consistency, and had a melting point of 45° to 50° C. It was dispersible in xylene but did not give a clear solution in xylene.

Example 176a

| | Grams |
|---|---|
| Menthylphenol (1.0 mole) | 232 |
| Para-phenylethylphenol (Styryl) (1 mole) | 198 |
| Acetaldehyde (2.0 moles) | 88 |
| Concentrated $H_2SO_4$ | 5 |
| Xylene | 120 |

The procedure followed was the same as in Example 170a, except that the second addition of xylene consisted of 70 grams. The resulting resin was dark red, hard, semi-brittle, and had a melting point of 30° to 35° C.

Example 177a

| | Grams |
|---|---|
| Menthylphenol (1.0 mole) | 232 |
| Para-phenylethylphenol (Styryl) (1.0 mole) | 198 |
| Butyraldehyde (2.0 moles) | 144 |
| Concentrated $H_2SO_4$ | 5 |
| Xylene | 120 |

The procedure employed was essentially the same as in Example 170a where acetaldehyde was employed, but with the difference that due to the fact that the particular aldehyde was a higher boiling aldehyde it was not necessary to dilute it with the xylene. For this reason all the xylene was added to the initial mixture, and the higher boiling aldehyde was added by means of the separatory funnel arrangement. The resin, after removal of the solvent was dark red in color and soft to pliable in consistency.

Example 178a

| | Grams |
|---|---|
| Menthylphenol (1.0 mole) | 232 |
| Para-tertiarybutylphenol (1.0 mole) | 150 |
| Butyraldehyde (2.0 moles) | 144 |
| Concentrated $H_2SO_4$ | 5 |
| Xylene | 120 |

The procedure followed was the same as in Example 177a. The solvent-free resin was dark red in color and soft to pliable in consistency.

Example 179a

| | Grams |
|---|---|
| Menthylphenol (1.0 mole) | 232 |
| Para-tertiaryamylphenol (1.0 mole) | 164 |
| Butyraldehyde (2.0 moles) | 144 |
| Concentrated $H_2SO_4$ | 5 |
| Xylene | 200 |

The procedure followed was the same as in Example 177a. The resulting resin was soft and fluid and dark red in color.

Example 180a

| | Grams |
|---|---|
| Menthylphenol (1.0 mole) | 232 |
| Para-phenylphenol (1.0 mole) | 170 |
| Butyraldehyde (2.0 moles) | 144 |
| Concentrated $H_2SO_4$ | 5 |
| Xylene | 100 |

The procedure followed was the same as in Example 177a. The solvent-free resin was dark red in color, soft to pliable in consistency, but it was not clearly soluble in xylene, that is, not entirely.

Example 181a

| | Grams |
|---|---|
| Menthylphenol (1.0 mole) | 232 |
| Para-tertiarybutylphenol (1.0 mole) | 150 |
| Heptaldehyde (2.0 moles) | 228 |
| Concentrated $H_2SO_4$ | 5 |
| Xylene | 130 |

The procedure followed was the same as in Example 177a. The resulting solvent-free resin was dark red, pliable, and completely soluble in xylene.

Example 182a

| | Grams |
|---|---|
| Menthylphenol (1.0 mole) | 232 |
| Para-tertiaryamylphenol (1.0 mole) | 164 |
| Heptaldehyde (2.0 moles) | 228 |
| Concentrated $H_2SO_4$ | 5 |
| Xylene | 130 |

The procedure followed was the same as in Example 177a. The solvent-free resin was dark red in color and soft to pliable in consistency.

Example 183a

| | Grams |
|---|---|
| Menthylphenol (1.0 mole) | 232 |
| Para-phenylphenol (1.0 mole) | 170 |
| Heptaldehyde (2.0 moles) | 228 |
| Concentrated $H_2SO_4$ | 5 |
| Xylene | 250 |

The same procedure was followed as in Example 177a. The resulting resin was dark red in color, soft and rather sticky, and completely xylene-soluble.

Example 184a

| | Grams |
|---|---|
| Menthylphenol (1.0 mole) | 232 |
| Para-phenylethylphenol (Styryl) (1.0 mole) | 198 |
| Heptaldehyde (2.0 moles) | 228 |
| Concentrated $H_2SO_4$ | 5 |
| Xylene | 200 |

The procedure followed was the same as in Example 177a preceding. The resulting resin was a soft, sticky product, dark red in color and perfectly soluble in xylene.

Example 185a

| | Grams |
|---|---|
| Decylphenol | 158 |
| Formaldehyde (37%) | 54.6 |
| Concentrated HCl | 2 |
| Monoalkyl ($C_{10}$–$C_{20}$, principally $C_{12}$–$C_{14}$) benzene monosulfonic acid sodium salt | 1 |
| Xylene | 150 |

The procedure followed was that of Example 1a. The solvent-free resin was clear, reddish amber in color, xylene-soluble and hard and brittle in consistency. It had a melting point of 110° to 115° C.

Example 186a

| | Grams |
|---|---|
| Dodecylphenol | 262 |
| Formaldehyde (37%) | 90 |
| Concentrated HCl | 3 |
| Monoalkyl ($C_{10}$–$C_{20}$, principally $C_{12}$–$C_{14}$) benzene monosulfonic acid sodium salt | 1 |
| Xylene | 100 |

The procedure followed was that of Example 1a. The solvent-free resin was clear, reddish-amber in color, xylene-soluble, and soft to semi-fluid in consistency.

Example 187a

| | | |
|---|---|---|
| Dodecylphenol (1.0 mole) | grams | 262 |
| Formaldehyde, 37% (1.1 mole) | do | 90 |
| NaOH in 30 cc. $H_2O$ | do | 4.5 |
| Monoalkyl ($C_{10}$–$C_{20}$, principally $C_{12}$–$C_{14}$) benzene monosulfonic acid sodium salt | grams | 1.0 |
| Xylene | do | 200 |
| Glacial acetic acid | ml | 10 |

The procedure followed was that of Example 44a. The solvent-free resin was clear, reddish-amber in color, xylene-soluble, and soft to semi-fluid in consistency.

Example 188a

| | Grams |
|---|---|
| Dodecylphenol | 262 |
| Benzaldehyde | 106 |
| Concentrated $H_2SO_4$ | 2.5 |
| Xylene | 100 |

The procedure followed was that of Example 24a. The solvent-free resin was clear, reddish-black in color, xylene-soluble, and soft to pliable in consistency.

Example 189a

| | Grams |
|---|---|
| Butyl salicylate (2.0 moles) | 388 |
| Formaldehyde, 37% (2.3 moles) | 182 |
| Concentrated HCl | 20 |
| Monoalkyl ($C_{10}$–$C_{20}$, principally $C_{12}$–$C_{14}$) benzene monosulfonic acid sodium salt | 2.5 |
| Xylene | 200 |

The same procedure was followed as in Example 1a. The resin was soft, and amber in color.

Example 190a

| | Grams |
|---|---|
| Amyl salicylate (2.0 moles) | 416 |
| Formaldehyde, 37% (2.3 moles) | 182 |
| Concentrated HCl | 20 |
| Monoalkyl ($C_{10}$–$C_{20}$, principally $C_{12}$–$C_{14}$) benzene monosulfonic acid sodium salt | 2.5 |
| Xylene | 200 |

The same procedure was followed in Example 1a. The resin was soft and amber in color.

Example 191a

| | Grams |
|---|---|
| Octyl salicylate (2.0 moles) | 500 |
| Formaldehyde, 37% (2.3 moles) | 182 |
| Concentrated HCl | 25 |
| Monoalkyl ($C_{10}$–$C_{20}$, principally $C_{12}$–$C_{14}$) benzene monosulfonic acid sodium salt | 3.0 |
| Xylene | 250 |

The same procedure was followed as in Example 1a. The resin was soft, and amber in color.

Example 192a

| | Grams |
|---|---|
| Methylsalicylate, U. S. P. grade (2.0 moles) | 304 |
| Formaldehyde, 37% (2.3 moles) | 182 |
| Concentrated HCl | 20 |
| Monoalkyl ($C_{10}$–$C_{20}$, principally $C_{12}$–$C_{14}$) benzene monosulfonic acid sodium salt | 1.5 |
| Xylene | 200 |

The phenol, formaldehyde and acid catalyst were combined in the resin pot and reacted following the procedure of Example 1a. The resulting resin was soft, amber in color and had a tendency to show a very weak hydrophile effect.

Example 193a

The procedure followed was the same as in Example 192a except that the methyl salicylate was replaced by 333 grams of technically pure ethyl salicylate. The resulting resin was similar in appearance but showed hardly any hydrophile property.

Example 194a

The same procedure was followed as in Example 192a, except that the methyl salicylate was replaced by 390 grams of butyl salicylate of reagent quality, the amount of concentrated hydrochloric acid was increased to 25 grams, the amount of the sulfonate to 2 grams and the amount of xylene to 230 grams. The finished resin had the same appearance as the resin of Example 192a but showed no hydrophile effect whatever.

Example 195a

| | Grams |
|---|---|
| Para-hydroxy ethylbenzoate | 156 |
| Formalin (formaldehyde, 37%) | 88 |
| Oxalic acid (dissolved in 1 part water) | 1.6 |

The reaction time and conditions were the same as in Example 1a, except no alkylaryl sulfonate was added. The reacted components were dehydrated by heating at atmospheric pressure between 100° and 150° C. until a hard non-tacky resin was obtained.

On heating further to a temperature of 250° C. without vacuum and removing a small amount of additional water, there was obtained an almost transparent, very light amber colored resin, which was not only hard but also brittle.

*Example 196a*

|   | Grams |
|---|---|
| Salicylic acid (U. S. P. grade) | 150 |
| Formaldehyde, 30% | 75 |
| Water | 200 |
| Concentrated HCl | 5 |

The above ingredients were combined in a conventional glass flask with a stirring device and condenser. The mixture was refluxed for 20 hours at a temperature of approximately 100° C., or slightly in excess thereof. At the end of this time there separated out an aqueous layer and a resinous layer, and the aqueous layer was withdrawn. The non-aqueous layer, which was more or less a solid, was heated to 240°-250° C., during which time the remainder of the water present was eliminated. The resultant resin was clear, brittle and hard. It was not xylene soluble, but was soluble in a mixture consisting of 50% xylene and 50% diethylene glycol diethylether.

*Example 197a*

|   | Grams |
|---|---|
| Salicylic acid | 150 |
| Hexamethylenetetramine | 34 |
| Alcohol (ethyl) | 400 |

The above mixture was refluxed for 20 hours. At the end of this time the mixture was heated to 150° C. with a distillation of all the alcohol. The resultant product was a dark red hygroscopic resin. This resin was then dissolved in 600 grams of anhydrous methyl alcohol, and 2 grams of paratoluene sulfonic acid added as a catalyst. This mixture was then refluxed for 20 hours. At the end of this time the alcohol was removed along with water of esterification. The resin was dissolved again in another 600-gram lot of methyl alcohol and again refluxed for 20 hours. At the end of this time the alcohol and water were distilled off again and the resin dissolved for a third time in 600 grams of anhydrous methyl alcohol and again refluxed for 20 hours. At the end of this period of time the methanol and water formed were distilled off, yielding the methyl ester in presence of a small amount of sulfonic acid present as a catalyst.

The resin was dark red in color and very soft. It was not soluble in xylene but 100 grams of resin made a very satisfactory solution with 50 parts of xylene and 50 parts of diethylene glycol diethylether.

*Example 198a*

|   | Grams |
|---|---|
| Salicylic acid (2.0 moles) | 276 |
| Formaldehyde, 37% (2.0 moles) | 162 |
| Concentrated HCl | 3 |
| Monoalkyl (C₁₀–C₂₀, principally C₁₂–C₁₄) benzene monosulfonic acid sodium salt | 1 |
| Xylene | 475 |
| Diethylene glycol diethylether | 50 |

The same procedure was followed as was described under the heading of Example 1a, except that the initial reflux period was 2½ hours instead of 1½ hours. At the end of this first reflux period there was still a strong odor of formaldehyde present. Two grams more of concentrated hydrochloric acid were added. The mixture was then refluxed for 5½ hours more at which time there was still a strong odor of formaldehyde present in a sample of the aqueous distillate from the reflux condenser. As a result, 10 more grams of hydrochloric acid were added and the reflux procedure continued for a third period of seventeen hours. During this last reflux period the trap arrangement was changed so as to permit the aqueous distillate to distill over and be trapped. This distillate still carried some odor of formaldehyde and there was also some uncombined salicylic acid remaining in the hot solution; probably more than 90%, possibly 95% of the reactants, entered into the reaction. The salicylic acid remaining in the reaction mass was filtered out hot. On cooling, the solution became thick and sirupy but was of sufficient solubility and viscosity to be suitable for oxyalkylation.

*Example 199a*

|   | Grams |
|---|---|
| Salicylic acid (2.0 moles) | 276 |
| HCHO, 37% (2.0 moles) | 162 |
| Water | 600 |
| Xylene | 100 |

The same procedure was followed as in Example 1a preceding, except that the reflux period was eight hours. At the end of this time there was still a strong odor of formaldehyde present in the vapors and there was present in the flask unreacted salicylic acid. For this reason another mole of formaldehyde was added (81 grams) and the resinification period repeated for another 8 hours. At the end of this time the water was distilled off along with the unreacted formaldehyde.

The value of salicylic acid as a resin-making compound for the production of compounds for use in the present invention rests not so much in the use of the product as such, as in its use in admixture with other phenolic reactants. Thus, if one makes a mixture of approximately 4 moles of para-amylphenol, for example, and one mole of salicylic acid and resinifies the mixture, there are two advantages: (1) the mixture is soluble, or at least it can be handled in xylene much more advantageously than resins from salicylic acid alone, and (2) one obtains a resin which has certain possibilities for further reaction which are not present in the usual hydrocarbon substituted phenol resin. A resin molecule is obtained which may be indicated in its simplest aspect in the following manner:

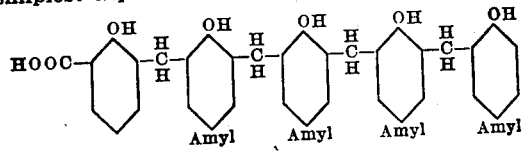

The above formula is, of course, an idealized structure for obvious reasons because the salicylic acid nucleus presumably can appear at any point in the resin molecule. Such resin, or for that matter a resin having an increased number of salicylic acid radicals, can be oxyalkylated in the same manner as other phenol-aldehyde resins.

The reactive carboxyl radical permits a number of variations. Thus, the resin can be reacted with reagents such as ethylene glycol, glycerol, triethanolamine, diethanolamine, etc.

*Example 200a*

| | Grams |
|---|---|
| Salicylic acid (0.5 mole) | 69 |
| Para-tertiaryamylphenol (2.0 moles) | 328 |
| Monoalkyl ($C_{10}$-$C_{20}$, principally $C_{12}$-$C_{14}$) benzene monosulfonic acid sodium salt | 1.5 |
| Concentrated HCl | 20 |
| Xylene | 400 |
| Formaldehyde | 208 |

The same procedure was followed as in Example 1a, except that the amount of hydrochloric acid employed is comparatively high, to wit, 20 grams, and the reflux time, instead of being 1½ hours is 3 hours. Only a very small amount of salicylic acid was lost on evaporation. The resin is soft and tacky, and xylene-soluble.

*Example 201a*

The same procedure was followed as in the preceding example, through the point where all the water had been removed, leaving the anhydrous resin in the solution of xylene. The temperature at this point was about 145° C. Eighty-five grams of triethanolamine, commercial grade (about 6/10 mole) were then added. More xylene was then allowed to distill out until the temperature rose to 180° to 185° C. The mass was then allowed to reflux at this temperature for approximately three hours with the usual trap arrangement. During this period substantially all the water of esterification was eliminated, the amount of water being approximately 10 cubic centimeters.

When all the water had been eliminated the xylene which distilled out earlier between the range of 145° to 185° C., was again added to the mixture so as to give a uniform solution containing about 60 parts of resin and 40 parts of xylene.

*Example 202a*

The same procedure was followed as in Example 201a, except that the 85 grams of triethanolamine were replaced by 18 grams of ethyleneglycol. In all other respects the procedure was exactly the same.

The cheapest salicylate is methylsalicylate. A resin can be prepared from methylsalicylate alone or methylsalicylate in combination with para-amylphenol, para-butylphenol, or any one of a number of other phenols as described, and then the resin can be subjected to alcoholysis in presence of an alkali so as to replace the methyl radical by some higher radical. This is illustrated by alcoholysis with hexyl alcohol, octyl alcohol, decyl alcohol, benzyl alcohol, cyclohexyl alcohol, oleyl alcohol, styryl alcohol, ethyleneglycol, diethylene glycol, phenoxyethanol, etc. The salicylic acid ester of the corresponding alcohol is also useful as an initial raw material, instead of methyl salicylate.

The carboxyl radical of salicylic acid remaining in a salicylic acid resin, such as those illustrated above may be reacted, not only with ethyleneglycol and triethanolamine, as illustrated, but with other conventional reactants such as ammonia, primary amines, such as amylamine, secondary amines such as diamylamine, ethyl etharolamine, diethanolamine, butyl ethanolamine, and propanolamines, hexanolamines, butanolamines, pentanolamines, and cyclohexyl-amines and a variety of other suitable compounds in which the final effect is simply that of an acylation reaction.

*Example 203a*

| | Grams |
|---|---|
| Para-chlorophenol (1.0 mole) | 128.5 |
| Formaldehyde, 37% (1.33 mole) | 109 |
| Concentrated HCl | 3 |
| Monoalkyl ($C_{10}$-$C_{20}$, principally $C_{12}$-$C_{14}$) benzene monosulfonic acid sodium salt | 2 |
| Xylene | 150 |

The same procedure was followed as described in Example 1a. The resulting resin was dark in color and hard and brittle in consistency.

Other phenols of the kind previously mentioned include dimethylaminomethylphenol. This is a mixture of

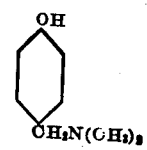

and

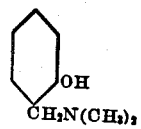

As in the case of salicylic acid the most desirable products are those in which dimethylaminomethylphenol contributes a portion of the phenolic reactants. This is illustrated by the following example:

*Example 204a*

| | Grams |
|---|---|
| Dimethylaminomethylphenol (¼ mole) | 37.5 |
| Para-tertiaryamylphenol (1.0 mole) | 164 |
| Formaldehyde, 37% (1¼ moles) | 102 |
| Concentrated HCl (¼ mole) | 26.5 |
| Xylene | 200 |

The same procedure was followed as in Example 1a, except that no monoalkyl benzene monosulfonic acid sodium salt was added; and the amount of hydrochloric acid employed was sufficient to neutralize the basic amine radical and leave a slight excess. The acid was added to the basic phenol first and after the neutralization was complete, with the slight acidity as indicated, the aldehyde was then added and heat was applied. The solvent-free product was amber in color, slightly opaque and soft to pliable in consistency. Such resin, when treated with strong caustic, is of course, converted into a resin having a free basic radical.

*Example 205a*

| | Grams |
|---|---|
| Para-pentenylphenol (2.0 moles) | 324 |
| Formaldehyde, 37% (2.4 moles) | 162 |
| Concentrated HCl | 4.5 |
| Monoalkyl ($C_{10}$-$C_{20}$, principally $C_{12}$-$C_{14}$) benzene monosulfonic acid sodium salt | 1.5 |
| Xylene | 100 |

The same procedure was followed as in Example 1a. The resin obtained, minus solvents, was greenish black, clear, semi-soft to fluid, and xylene soluble. The unsaturation in the pentenyl radical can be eliminated in any suitable manner desired. Treatment with chlorine gives a useful resin in which the phenol substituent is chloro-substituted hydrocarbon.

Example 206a

| | Grams |
|---|---|
| Para-pentenylphenol (1.0 mole) | 162 |
| Propionaldehyde, 97% (1.0 mole) | 61 |
| Concentrated H₂SO₄ | 2 |
| Xylene | 100 |

The same procedure was followed as in Example 24a. The resin obtained was reddish black in color, hard, brittle, xylene-soluble and had a melting point of 115° to 120° C. Chlorination gave a useful resin chloro-substituted in the phenol nucleus side chain.

Example 207a

| | Grams |
|---|---|
| Carvacrol C. P | 300 |
| Formaldehyde (37%) | 200 |
| Xylene | 200 |
| Monoalkyl (C₁₆–C₂₀, principally C₁₂–C₁₄) benzene monosulfonic acid sodium salt | 1.5 |
| Concentrated HCl | 4 |

The same procedure followed was that described in Example 1a. The solvent-free resin was hard to semi-brittle, dark red in color, and xylene-soluble.

Example 208a

| | Grams |
|---|---|
| Carvacrol C. P | 300 |
| Benzaldehyde | 212 |
| Xylene | 100 |
| Concentrated H₂SO₄ | 4 |

The procedure followed was that described in Example 24a. The solvent-free resin was reddish-black in color, semi-soluble to pliable, and xylene-soluble.

Example 209a

| | Grams |
|---|---|
| Carvacrol C. P | 300 |
| Propionaldehyde | 122 |
| Xylene | 150 |
| Concentrated H₂SO₄ | 4 |

The procedure followed was that described in Example 24a. The solvent-free resin was dark amber to black in color, fluid, and xylene-soluble.

Example 210a

| | Grams |
|---|---|
| Carvacrol C. P | 300 |
| Butyraldehyde | 144 |
| Xylene | 150 |
| Concentrated H₂SO₄ | 4 |

The procedure followed was that described in Example 24a. The solvent-free resin was dark amber to black in color, fluid in consistency, and xylene-soluble.

Example 211a

| | Grams |
|---|---|
| Betanaphthol | 75 |
| Ethyl alcohol | 50 |
| Formaldehyde, 37% | 43.3 |
| Concentrated HCl | 2 |

The above reactants were heated in a reflux condenser until the solution solidified to a thick magma of fine, light crystals. This required about 3 hours. The solvent and water were removed by distillation and the residue heated to 200° C. to 210° C. until it was no longer crystalline when cool. This required about 15 minutes. The final resin obtained was a purple colored non-crystalline resin with a slight tendency to be somewhat rubbery.

Example 212a

The same procedure was followed as in the preceding example except that the hydrochloric acid was replaced by an equal amount of ammonium chloride as a catalyst. The resin obtained was similar to the one previously described but did not show any rubbery tendency whatsoever.

The foregoing examples have illustrated the production of suitable resins from difunctional phenols and aldehydes. For the preparation of such resins, suitable phenols include: Para- and ortho-cresols; para- and ortho-ethyl-phenol; 3-methyl-4-ethyl-phenol; 3-methyl-4-propyl-phenol; 2-ethyl-3-methyl-phenol; 2-propyl-3-methyl-phenol; para- and ortho-propyl-phenol; para-tertiary - butyl - phenol; para - secondary-butyl-phenol; para-tertiary-amyl-phenol; para-secondary-amyl-phenol; para - tertiary - hexyl-phenol; para - isooctyl - phenol; ortho - phenyl - phenol; para-phenyl-phenol; thymol; ortho-benzyl-phenol; para-benzyl-phenol; para-cyclohexyl-phenol; para-tertiary-decyl-phenol; para-dodecyl-phenol; para-tetradecyl-phenol; para-octadecyl-phenol; para-nonyl-phenol; para-menthyl-phenol; para-eicosanyl-phenol; para-docosanyl-phenol; para-tetracosanyl-phenol; para-beta-naphthyl-phenol; para-alpha-naphthyl-phenol; para-pentadecyl-phenol; that of the formula

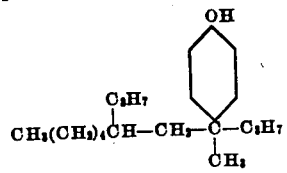

para-tertiary-alkyl-phenols of the formula

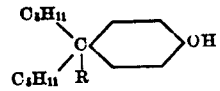

in which R is C₉H₁₉ to C₁₃H₂₇; para- and ortho-cetyl-phenols; para-cumyl-phenol; phenols of the formula

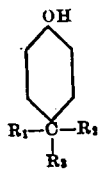

in which R₁ represents a straight chain hydrocarbon radical containing at least 7 carbon atoms and R₂ and R₃ represent hydrocarbon radicals the total number of carbon atoms attached to the tertiary carbon being at least 11; and phenols of the formula

in which R₁ represents an alkyl hydrocarbon radical containing at least 7 carbon atoms in a straight chain and R₂ represents an alkyl hydrocarbon radical containing at least 2 carbon atoms, the total number of carbon atoms in R₁ and R₂ being at least 11; and the corresponding ortho-para substituted meta-cresols and 3,5-xylenols; the alkyl salicylates, including methyl salicylate, butyl salicylate, amyl salicylate, octyl salicylate, nonyl salicylate, dodecyl salicylate; benzyl salicylate; cyclohexyl salicylate; oleyl salicylate; styryl salicylate; phenoxy ethyl salicylate; p-hydroxy-ethyl-benzoate; salicylic acid; p-chlorophenol; o-chlorophenol; o- and p-dimethylaminomethyl - phenol; p - pentenyl - phenol; guaiacol; catechol; p-phenoxyphenol; p-hydroxybenzophenone; hydroxyphenylheptadecyl ketone; hydroxyphenylheptadecenyl ketone; hydroxyphenylundecyl ketone; beta-naphthol; methyl naphthol; and carvacrol.

For the production of aldehyde-linked resins, including not only those derived from difunctional phenols, but also those derived from trifunctional and tetrafunctional phenols (e. g., bis-phenols) and modified phenolic resins involving aldehyde-derived bridges, any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde on one hand and a comparable product prepared from the same phenolic reactant and heptaldehyde on the other hand. The former, as shown in certain of the preceding examples, is a hard, brittle solid, whereas the latter is soft and tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form vinyl condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionaldehyde, butyraldehyde, 2-ethylhexanal, ethyl-butyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes although usually this has no advantage.

The following discussion and examples illustrate suitable modified phenolic resins, a large number of which are known, including resins derived in part from materials which themselves form polymers or are resinous. In some instances the structure becomes complex by the fact that some type of linkage other than bridging enters into the combination. Thus, there are a variety of known polyethenic resins such as vinyl resins, acrylic resins, coumarone - indene resins, etc. Without attempting more than just the briefest description for the herein described purpose, the resin-forming part of three such ethylenic molecules may be depicted in the following manner:

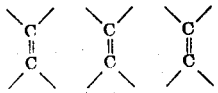

The addition trimer obtained therefrom may be depicted in the following manner:

This sort of structure can be combined with a phenol to yield a phenol-modified resin. This structure may be shown in the following manner:

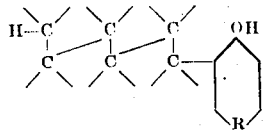

This type of resin is prepared by employment of a polymerizable monomer such as coumarone, indene, various terpenes, vinyl compounds, such as vinylacetate, styrene, etc. Such resins may be depicted as a mixed type resin, partly phenolic, for the reason that a substantial or even the larger part of the resin molecule is the addition polymer of some other type of resin as noted and perhaps only the terminal position is occupied by a phenolic nucleus.

Vinylphenol polymers are satisfactory, if solvent soluble. Thus, we have examined a series of four polyvinylphenols in which the molecular weights were as follows: 280, 410, 545 and 1280. The latter was insoluble in any suitable solvent. The one having a molecular weight of 545 was soluble in diethyleneglycol diethylether, and, after being oxyethylated in such solution, gave a good product. The one of the lowest molecular weight was a thick, viscous, amber fluid, and the other three were solids.

Our efforts to obtain a vinylbutylphenol, vinylamylphenol, and the like, by using the corresponding para-substituted tertiary phenol and introducing a vinyl group in the ortho position have been unsatisfactory, but based on fragmentary experience our best conjecture in the matter is that such compounds, if obtainable in a practical way and at a reasonable cost, would give highly effective demulsifiers.

The more important modified phenol resins are those in which a phenol-aldehyde resin has been prepared and then such resin modified by combination with a structure having reactive unsaturation or the equivalent. Possibly the commonest reactant employed for modification is rosin.

Referring again to a simple representation of a phenolaldehyde resin, as for example one obtained from amyl-phenol and formaldehyde, one may employ the following representation:

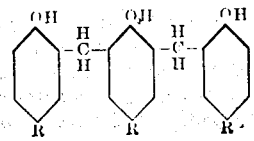

Proper manipulation yields a modification which in its simplest aspects is illustrated in the following manner:

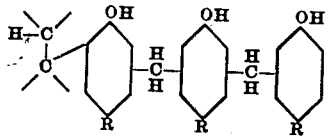

Needless to say, reaction can take place at both terminal nuclei. Thus, one finds gradation going all the way from modified phenol-aldehyde resins to phenol-modified resins of addition polymers. These resins meet the requirements of what has been said herein as to the suitable resins which can be oxyalkylated to produce satisfactory and effective demulsifying agents.

We have prepared a variety of rosin-modified phenol-aldehyde resins with and without the use of glycerin and with or without the use of maleic anhydride, and have purchased in the open market resins of this type, manufactured from amylphenol, butylphenol, or paraphenyl-phenol, and oxyalkylated them and obtained effective demulsifying agents. For example, one company (Cook Paint and Varnish Company, Kansas City, Missouri) sells two types of resins which are marketed under the identifications of Nos. R–3339 and R–3334. Both are prepared from rosin and paraphenylphenol. The first mentioned does not have any added glycerin and the second one does. The first mentioned has an acid number of approximately 60, and the second has an acid number of about 65. These are examples of suitable rosin-modified resins.

Other modified resins which yield effective demulsifiers on oxyalkylation include those in which styrene is employed. These are well known. Similarly, alpha-terpineol-modified phenol-aldehyde resins are entirely satisfactory as a raw material for the oxyalkylation process, yielding, after oxyalkylation, effective demulsifiers. It is our preference to employ resins obtained from difunctional phenols, such as para-tertiary-amylphenol in combination with alpha-terpineol (pine oil), either alone or in combination with rosin.

Still another modification involves the use of benzyl chloride as a modifying agent. We have treated resins obtained from difunctional phenols, such as amylphenol, etc., and formaldehyde, with benzyl chloride, so as to evolve hydrochloric acid and thus modify the resin and obtained useful products on oxyalkylation. Another modification involves the use of naphthalene, or other condensed ring structure.

We have also prepared useful products from resins in which a monofunctional phenol is employed to modify the character of the resin, e. g., by the use of diamylphenol in the known way. The modified resin when subjected to the oxyalkylation procedure, gave a useful product.

*Example 213a*

100 parts of U. S. P. phenol were mixed with 5 parts of 66° Baumé sulfuric acid and the mixture heated to 150° C. To this mixture was added about 155 parts of alpha-terpineol, i. e., approximately equimolecular proportions of the phenol and the oxyterpene were used, although considerable deviation from such proportions may be had without affecting the quality of the final resin. The addition of the terpineol should be made while the temperature of the mixture is somewhat below the boiling point of the oxyterpene, and at a temperature sufficiently high to induce chemical reaction between the phenol and the terpineol with subsequent resin formation. After the addition of the oxyterpene had been completed, the mixture was subjected to distillation in vacuo, until a brittle resin was produced which was purified by the usual washing and purifying operations.

*Example 214a*

100 parts of metacresol were treated with 5 parts of syrupy phosphoric acid and the mass heated to 150° C., whereupon 150 parts of terpineol were added slowly with stirring, and the heating continued until all the terpineol had been added. The mass was then distilled in the usual way until a brittle resin remained.

*Example 215a*

Gaseous hydrogen chloride was passed into 100 parts by weight of dipentene (technical grade) to the saturation point. The increase in weight amounted to 40% to 50%. The dark brown liquid reaction product was distilled in vacuo. During distillation inert impurities of the dipentene at first passed over. The fraction passing over between 110° and 118° C., (14 mms.) contained almost pure dihydrochloride.

209 grams of this fraction were gradually introduced with constant stirring into 282 grams of molten phenol in the presence of a few per cent of aluminum chloride. After the last addition, heating to 50°–60° C. was continued for a further 16 hours.

A vigorous current of steam was then passed through the thickly liquid reaction product, whereby the excess of phenol employed and a small quantity of dipentene, which was reformed from the di-hydrochloride, passed over. The residue, which amounted to 300 grams, was a light yellow, fairly hard, resinous mass.

A white crystalline compound, in all probability (1.8) di-hydroxydiphenyl-menthane (diphenol-menthane), separated out during the operation.

*Example 216a*

A mixture of 500 grams of ortho-cresol and 15 grams of zinc chloride was added in small portions to 209 grams of dipentene di-hydrochloride. The temperature was first maintained slightly over 40° C., and after the vigorous reaction had abated, was raised to 90° C., and maintained at this point for several hours.

After the reaction mixture had been washed and the excess of cresol employed had been expelled by distillation, 320 grams of a light brown, solid, resinous condensation product was obtained.

*Example 217a*

500 grams of a technical mixture of meta- and paracresol, 10 grams of aluminum chloride, and 140 grams of a mixture of dipentene hydrochlorides (containing about 40 grams of combined hydrogen chloride) were brought together and gently warmed. As soon as distinct evolution of hydrogen chloride was observed, 500 grams of technical dipentene were added in small portions. Each addition was at first followed by an exothermic reaction, and each further addition was delayed until hydrogen chloride was again evolved. Finally, the mixture was heated to 60–65° C. for a further 40 hours.

After further working up the crude condensate, 905 grams of a light brown, resinous, solid condensation product, 70 grams of dipentene fractions which had not taken part in the reaction and 100 grams of cresol which had not taken part in the condensation, were obtained.

Example 218a

Hydrogen chloride was passed at about 40° C. into domestic pine oil, until an increase in weight of 55% had been reached. One hundred parts of the product freed from the aqueous portion formed during the conversion was condensed at 60° to 80° C., with an equal quantity, by weight, of phenol in the presence of zinc chloride (1 part). A reaction could be observed even before the addition of the catalyst, which, after the addition, proceeded very vigorously and was completed in a few hours. After removing the unreacted phenol terpene compound, 110 parts of a light colored condensation product of hard, resinous nature were obtained.

Instead of employing all the conversion product from the pine oil and the hydrogen chloride for the condensation, it can be cooled down to about 10° C., where it sets a crystalline mass, about half of which is isolated in the form of pure white crystals by suctional filtration. These mainly consisted of dipentene di-hydrochloride, and, if reacted with phenol, as hereinbefore described, give an almost colorless, very hard, resinous, high molecular phenol. The hydrohalides obtained from the various terpenes, particularly the hydrochlorides, may represent mono-derivatives or di-derivatives, or derivatives having three or more moles of hydrohalide introduced per mole of terpene. Similar useful reactants can be obtained by the use of chlorine, particularly diluted chlorine, so as to yield products which may be utilized in the same manner as those derived from the hydrohalides.

Example 219a 100 grams of the crystalline diphenol-menthane (see Example 215a) were dissolved in 50 grams of benzene and 50 grams of alcohol, and then reacted with 32 grams of aqueous formaldehyde (40% volume) with the addition of 5 grams of concentrated hydrochloric acid by boiling the mixture for 6 to 8 hours under a reflux condenser.

After removing the watery layer and evaporating the solvent in a suitable manner, an almost colorless, very hard resin was obtained which melted between 115° and 130° C. It dissolved easily both in alcohol and in aromatic or hydroaromatic hydrocarbons, such as xylol or turpentine.

The non-purified, resinous diphenol-menthane reacted with formaldehyde in the same way, gave a very pale resin having very similar properties. The proportion of formaldehyde may be increased, e. g., up to about 35 grams, to obtain resins having higher melting point; when the proportion of formaldehyde was increased up to about 40 grams, a still harder, extremely high melting resin was obtained which was only soluble in alcohol and acetone and the like, but not in hydrocarbons.

Similar resins were also obtained by replacing the aqueous formaldehyde by corresponding proportions of its anhydrous polymers. Solvents may be omitted in this case and the catalyst considerably reduced, and the formaldehyde may be replaced by acetaldehyde or other homologues, or paraldehyde. The resin obtained from acetaldehyde, however, lacked hardness and light color as compared with those obtained from formaldehyde.

Example 220a 100 grams of high molecular phenol of Example 216a were condensed following the procedure of Example 219a by means of a strong acid with 15 grams of paraformaldehyde without a solvent and, with 40 grams of aqueous formaldehyde (40% volume) in the presence of the inert solvent. The resins obtained are less hard and of lower melting point and of darker color than the resin from diphenol menthane and formaldehyde described above.

Example 221a 100 grams of the high molecular phenol of Example 218a were dissolved in toluol, and brought into contact with 73 grams of aqueous formaldehyde (40% volume), in presence of about 8 grams of sodium hydroxide with agitation. After several weeks most of the formaldehyde employed had been combined, corresponding to about 2 moles per 1 mole of the phenolic substance employed. The time required for this combining may be reduced considerably by raising the temperature to about 50°–60° C., or by employing a larger excess of formaldehyde (aqueous or anhydrous) or by increasing the proportion of the alkaline catalyst.

After chemical combination of the formaldehyde and the phenol had taken place to the desired extent, the reaction mixture was slightly acidified and thoroughly mixed. The watery layer separated, leaving the condensation product dissolved in the water-insoluble solvent. After evaporating the toluol, a fairly pale, solid resin was obtained which was easily soluble in hydrocarbons.

A large number of products of reaction of dipentene and a phenol with formaldehyde or other aldehydes, including acetaldehyde, paraldehyde, various anhydride polymers with aldehyde, etc., are known, and on oxyalkylation give useful products.

Example 222a 100 grams of phenol and 100 grams turpentine resin were heated for 6 hours with 30 grams trioxymethylene in a vessel with a reflux condenser to a temperature of 115° to 120° C. The temperature was then, while the mixture was being stirred, gradually raised to 200° C., with distillation of volatiles. The resulting resin had a slight yellow color and melted at a temperature of 160° to 185° C.

Example 223a 108 grams of crude cresol were condensed in a vessel with a reflux condenser with 29 grams of trioxymethylene for three hours at a temperature of 115° C. Then 60 grams of dipentene were added to the still soft resin melt, and the mass was condensed further for 4 hours. The reflux condenser was then removed, and the mass was heated, while stirring, for two hours to 210° C., until all volatiles and the water were removed as far as possible. A yellowish resin was obtained, melting at 155° to 195° C.

Example 224a 108 grams (1 mole) paracresol; 150 grams (2 moles) 40% formaldehyde solution; 10 c. c. 2 N hydrochloric acid; and 108 grams dipentene were condensed by refluxing at the boiling point for about four hours. The condenser was then removed and the material was dehydrated and the carried-over dipentene replenished. The heating was then carried on to a higher temperature to remove volatiles, including most of the dipentene, and the condensation and reaction continued at the elevated temperatures. At about 200° C., a resin was obtained which was solid and brittle at room temperature, containing about 15% combined dipentene.

Example 225a 164 grams (1 mole) amylphenol, 225 grams (3 moles) 40% formaldehyde solution, 164 grams dipentene, and 1 gram zinc acetate were condensed by refluxing for about 15 hours. The condenser was then removed and the material was dehydrated, the temperature was then brought up to about 130° C., and kept there for about 2 hours. It was then heated to about 250° C. until practically all volatile matter was removed. A pale, brittle resin having a hydroxyl number of about 35 was obtained.

Example 226a 1200 grams of butylphenol and 1200 grams of 40% formaldehyde were condensed in the presence of an aqueous solution containing about 128 grams of NaOH in the presence of 150 grams of dipentene. The condensation was conducted at about 80° C. for about 3 to 4 hours. The resin solution was then acidified with acetic acid, and upon being allowed to stand, a syrupy condensate separated out from the water. This syrup contained about 10% of dipentene, and after washing with water, was combined with a further quantity of dipentene, as follows: 1315 grams butylphenol condensate syrup (corresponding to about 1000 grams of final solid resin content) 550 grams dipentene, 550 grams high flash naphtha and 10 grams zinc acetate, were heated over a period of from 18 to 24 hours, first to about 130° C. to expel water with the temperature then being slowly raised to about 250–260° C., and maintained at such level until substantially all volatile matter was driven off. There was obtained a clear, hard resin.

Example 227a 675 grams of para-tertiaryamylphenol and 600 grams of 40% formaldehyde were reacted at about 60° C. for 4 hours in the presence of an aqueous solution of 65 grams of NaOH. A uniform solution was obtained which was then acidified with dilute sulfuric acid. A syrupy layer separated out and was washed two or three times with hot water with agitation, to remove salt and acid. The product was a highly reactive resin.

The resin syrup, which contained water, was then mixed with half its weight of dipentene and with a similar amount of hydrocarbon solvent, and further treated as described in Example 226a. A similar resin was obtained in which an amount of the terpene equal to about half the weight of the amylphenol-formaldehyde condensate was chemically combined in the resin.

Example 228a 100 parts of phenol and 250 parts of technical dipentene of which a small part was saturated separately with hydrogen chloride, were condensed at 50°–70° C., in the presence of 3 parts of zinc chloride.

If the reaction mixture is subjected after a few hours to steam distillation, about 250 to 255 grams of a soft or viscous residue are obtained. If heating is continued for a further 48 to 72 hours, preferably at somewhat higher temperatures, and after increasing the catalyst, about 320 grams of a residue remain after steam distillation, in the form of a solid resin. About 15 grams of inactive fractions of the technical dipentene and hardly any unused phenol pass over with the steam. The solid, resinous condensation product has far higher molecular weight than the soft or viscous one initially obtained. More than 1 mole of the terpene per mole of phenol has been combined. These are suitable resins.

This product which (considered to be a polyphenylol compound with a large polyterpene substituent) was condensed with about 200 parts of formaldehyde (40% volume), by first diluting the resinous, phenylol compound with a small proportion of an inert solvent (toluene) and adding caustic soda solution until a homogeneous reaction mixture was obtained. After several days the mixture was neutralized and the resin solution obtained thoroughly washed. After evaporating the solvent, a resin was obtained.

Example 229a

By reducing the dipentene to about 170 parts per 100 parts of phenol and operating in the same way as in Example 228a, a solid, resinous phenolic compound was obtained, in which approximately equimolecular quantities of phenol and dipentene were chemically combined. The formaldehyde condensation product was prepared in the same way and with the same proportion of formaldehyde as in Example 228a.

Example 230a

About 256 parts of naphthalene were added to a mixture of about 150 parts of Formalin and about 120 parts of 66° Baumé sulfuric acid. The mixture of Formalin and acid was cooled prior to the addition of the naphthalene. Heat was applied to the resulting mixture, with stirring, and when a temperature of about 103° C. was reached, it was maintained between 103° and 115° C. for about 3.5 hours, after which 54 parts of orthocresol were introduced. The heating and stirring were continued for an additional period of about 5.5 hours, after which the resin product was separated from the heated mass by adding about 200 parts of toluene and a solution of 75 parts of sodium hydroxide in about 150 parts of water. An aqueous layer formed and was removed and the toluene solution of the resin was filtered through diatomaceous earth to clarify and promote additional separation or breaking of an emulsion. The resin solution was then steam-distilled to remove the toluene. This resin was soluble in acetone and trichloroethylene, butyl acetate, and was slightly soluble in petroleum hydrocarbons, alcohol, butyl alcohol, and turpentine.

Example 231a

About 256 parts of naphthalene were added to a cooled solution of about 120 parts of 66° Baumé sulfuric acid in 150 parts of Formalin. Heat was applied, with stirring, and when the temperature reached 105° C., heating was continued for 3½ hours, while maintaining the temperature at 105° C. to about 110° C. Then a mixture of about 47 parts of phenol and about 15 parts of water (or just enough to dissolve the phenol), was slowly added and the heating continued for about 4 hours more. The product was worked up as in the preceding example. The yield was about 272 parts of resin, the properties of which were simi-

Example 232a

About 256 parts of napthalene (2 moles) were added to a cooled solution of about 150 parts of 66° Baumé sulfuric acid in about 187.5 parts of Formalin (2.5 moles formaldehyde). Heat was applied and the temperature maintained at about 105° to 113° C. for about 3½ hours. Then about 61 parts of re-distilled xylenols (0.5 mole) were added. The xylenols may be those present in a coal tar fraction having a boiling range of about 204° to about 225° C. The reaction which took place appeared to be quite vigorous and the resulting mass tended to stiffen relatively rapidly, so that after 15 minutes it was necessary to add about 50 parts of toluene. The mixture then became quite fluid and the heating was resumed for an additional two hours. The resin was separated from the reactants in the manner set forth in Example 230a. The resin was soluble in solvents mentioned in Example 230a.

Example 233a

A mixture of about 256 parts of naphthalene (2 moles), about 150 parts of Formalin (2 moles of formaldehyde), and about 120 parts of 66° Baumé sulfuric acid was stirred at about 105° to 110° C. for about 3.5 hours, after which about 198 parts of benzophenol (1 mole) were added and heating and stirring continued for about 14.5 hours. When the stirring and heating were discontinued, the mixture was permitted to separate into layers. The upper layer was dissolved in about 200 parts of toluene, washed to remove substantially all of the sulfuric acid, and steam-distilled to remove the toluene. The resin had a softening point of about 81.5° C. and was compatible with benzene, toluene, warm xylene, and warm butyl alcohol, and partially miscible with cold turpentine.

Example 234a

A resin was prepared as in Example 233a, but about 141 parts of phenol were used, and the total reaction time was about 7¾ hours. The resin was soluble in the solvents mentioned in Example 230a.

Example 235a

About 256 parts of naphthalene, about 150 parts of Formalin, and about 120 parts of sulfuric acid (66° Baumé) were reacted at 105° to about 110° C. for about 3.5 hours, with stirring, and under reflux. Then about 198 parts of benzophenol were added and the stirring and refluxing continued while heating at a temperature of about 110° C., for an additional period of about 14.5 hours. The resulting resin was washed repeatedly with hot water until the sulfuric acid was eliminated. The resin thus prepared had a softening point of about 81.5° C.

Example 236a 64 parts of naphthalene, 136 parts of salicylic acid, 200 parts of a 33% formaldehyde solution, and 200 parts of concentrated hydrochloric acid were heated to boiling while refluxing for three hours. The resin thus formed was separated from the aqueous layer and small traces of unchanged naphthalene were removed. The resin was then ground to facilitate removal of acid still adhering thereto, rinsed with water, and dried. The resin thus obtained was easily soluble in alcohol and acetone. It showed a softening point of 93° C.

Example 237a

Following the procedure of Example 236a but using 150 parts of formaldehyde, and 100 parts of concentrated hydrochloric acid, gave a resin of similar properties, the softening point of which was somewhat lower.

Example 238a 256 parts of naphthalene, 138 parts of salicylic acid, 300 parts of a 33% formaldehyde solution, and 200 parts of concentrated hydrochloric acid, were heated to boiling for 48 hours, while stirring and refluxing. On removing the unchanged naphthalene by evaporation, a resin was formed, which was ground, rinsed, and dried in vacuo. A hard, clear, yellowish resin of a high softening point was obtained. It was soluble in acetone and methyl glycol ether acetate.

Example 239a 192 parts of naphthalene, 69 parts of salicylic acid, 200 parts of a 33% formaldehyde solution, and 130 parts of concentrated hydrochloric acid were condensed for 72 hours at 100° C., while stirring. After working up as described in the Example 236a, 195 parts of a hard, brown clear resin of a high melting point were obtained, which was soluble in acetone.

Example 240a 90 parts of phenanthrene, 138 parts of salicylic acid, 200 parts of a 33% formaldehyde solution, and 200 parts of concentrated hydrochloric acid were condensed by heating to boiling for 3 hours while stirring. On working up as in Example 236a, a greenish-colored resin of high melting point soluble in alcohol was obtained.

Example 241a 64 parts of naphthalene, 85 parts of diphenyl ether, 138 parts of salicylic acid, 200 parts of a 30% formaldehyde solution, and 150 parts of concentrated hydrochloric acid were condensed for 6 hours at 100° C. On working up as in Example 236a, a hard, clear resin, soluble in alcohol acetone and esters, was obtained.

Example 242a 170 parts of isopropyl-naphthalene, 138 parts of salicylic acid, 200 parts of a 30% formaldehyde solution, and 200 parts of concentrated hydrochloric acid were condensed for 16 hours at 100° C. On working up as in Example 236a, a brownish resin, which yielded clear solutions in alcohol and acetone was obtained.

Example 243a 162 parts of alpha-chloronaphthalene, 138 parts of salicylic acid, 200 parts of a 30% formaldehyde solution, and 150 parts of concentrated hydrochloric acid were condensed for 14 hours at 100° C. When worked up as in Example 236a, a hard resin of high melting point was obtained.

Example 244a 156 parts of ethylnaphthalene, 138 parts of salicylic acid, 200 parts of a 30% formaldehyde solution, and 150 parts of concentrated hydrochloric acid were condensed for 6 hours at 100° C. On working up as in Example 236a, a hard brownish resin was obtained.

Example 245a 138 parts of methyl-p-isopropyl benzene, 138 parts of salicylic acid, 200 parts of a 30% formaldehyde solution, and 200 parts of concentrated hydrochloric acid were condensed as in Example 236a, giving a resin which was soluble in alcohol.

Example 246a

Dilute 200 parts of a crude solvent naphtha, containing at least 5% of phenol-cresol-xylenol mixture, said 5% being largely metacresol, and boiling between 160°–182° C., with 50 parts of xylene. Into the mixture, at about 18°–25° C., drop two parts of borofluoracetic acid gradually, with vigorous stirring. The temperature of the reaction soon rises to 60°–65° C. Stirring is continued for about 7 hours after which the reaction liquid is diluted with 50 parts of purified solvent naphtha and heated to 80°–100° C. for one-fourth to one-half hour, with 15 to 20 parts of quick-lime or barium oxide while stirring vigorously. It is then filtered from the precipitate and the unresinified portion is distilled off under reduced pressure. A nearly colorless resin is obtained which begins to sinter at 140° C. and melts at 175° C. It is readily soluble in aromatic hydrocarbons. When the polymerization of the crude solvent naphtha, above specified, is carried out in the usual manner with sulfuric acid, a yellowish-brown resin is obtained, which melts at 100° C. Both resins are suitable for the preparation of useful products by oxyalkylation.

Example 247a

Run 2 parts of borofluoroacetic acid slowly, in the course of 2 to 3 hours, with vigorous stirring, into 100 parts of crude solvent naphtha boiling between 155°–192° C., and containing 58% of coumarone and indene and 4% of phenolic substances (phenols and cresols), and initially heated to 35° C., while the temperature of the reaction liquid rises to 60° C. The temperature is prevented, by suitable cooling, from rising considerably above this level, the stirring is continued for 6 to 7 hours, and heating is then effected to 80°–90° C., for half an hour, with the addition of 25 parts of xylene or pure solvent naphtha, and 6 to 8 parts of barium oxide. The volatile constituents of the filtered, nearly colorless reaction liquid are distilled off in vacuo. There remains an almost colorless resin, which sinters at 140° C. and melts at 165° C. and is soluble in turpentine, tetrahydronaphthalene and aromatic hydrocarbons.

Example 248a

To 600 parts of a crude solvent naphtha, free from phenols and bases, containing 36% of indene and 20% of coumarone, and boiling between 164° to 185° C., are added 21 parts of phenol or crude cresol and the mixture is heated to 30°–40° C., when in the course of 3 hours 10 parts of borofluoroacetic acid are introduced, with vigorous stirring. The reaction proceeds with a marked rise of temperature. After stirring for 10 hours, the reaction mixture is heated for half an hour to 90°–100° C., with the addition of 25 parts of quick-lime and the but weakly colored reaction liquid is then worked up in the manner described in Example 247a.

Example 249a 300 parts of crude solvent naphtha of boiling point 160°–186° C. (free of bases and phenol, containing 44% of indene) are heated to about 50° C. with 11 parts of crude cresol, after which 10 parts of borofluorooleic acid are caused to run in while stirring. The mixture is heated to about 50°–60° C. for 10 hours, with stirring, diluted with 100 parts of benzene and worked up as described in Example 246a. A light, stand-oil-soluble resin, melting at 93° C., is thus obtained.

Example 250a

Mix 200 parts of a crude solvent naphtha of the boiling point 162°–189° C., after which it is stirred for about 6 hours, while slowly adding 5 to 7 parts of borofluoropropionic acid, whereby the temperature rises to about 55° C. The reaction mixture is then worked up, as described in Example 248a, a light colored resin of the melting point of 135° C. being obtained.

Example 251a

To 500 parts of the starting material of Example 249a, 10 to 18 parts of borofluorolactic acid are slowly added at a temperature of 50° C., while stirring, after which the reaction mixture is further stirred for 6 to 8 hours at a temperature between about 50° to 60° C. After working up as described in Example 246a, a light-colored resin melting at 105° C. is obtained, the resin being soluble in solvent naphtha, and turpentine.

Example 252a

Introduce 20 gallons of No. 2 crude solvent naphtha, containing 60% of reactives, together with 5 gallons of cresol into a vessel having closed circulating coils for both heating and cooling fluids. Activated clay of high particle porosity is then added in a quantity equal to 6% of the weight of the blend of naphtha and cresol, and the temperature of the blend is raised to between 90° C. and 100° C. with agitation. The mixture is agitated at about 100° C. for about 4 hours. The reacted mixture is then filtered to remove the activated clay, and is then subjected to an initial distillation, during which there is distilled off refined naphtha and any unreacted cresol. The residual product of the distillation is a soft, somewhat tacky, resin. By steam distillation this soft resin is separated into a hard resin and a fluid resin, or heavy resinous oil.

The hard resin thus obtained has a melting range of 85° C. to 95° C. It is light in color and soluble in isopropanol, ethanol and other solvent alcohols, as well as in the common hydrocarbon solvents.

Example 253a 89 volumes of crude solvent naphtha, containing 30% of reactives, was mixed with 11 volumes of cresol. Clay in a quantity equal to 3% of the combined weight of the crude naphtha and the cresol was added and the mixture was agitated for 4 hours, at a temperature between 90° C. and 100° C. Recovery was made in accordance with the procedure of Example 252a. The fluid resin showed qualities substantially identical with those of the fluid resin obtained in Example 252a, and was soluble in alcohols and the common hydrocarbon solvents. The hard resin was soluble in ethanol, isopropanol, methanol, butanol, and the like, as well as in the the common hydrocarbon solvents. The hard resin was found to have a melting range of approximately 85° C. to 95° C.

Example 254a

The same procedure was followed as in Example 252a, except that 5 gallons of phenol were used in place of the cresol in making up the reactive blend. The hard resin was soluble in ethanol, isopropanol, methanol and butanol, as well as in the common hydrocarbon solvents. It had a melting range of 85° C. to 95° C., and the soft fluid resin was soluble in the solvent alcohols and hydrocarbon solvents.

Example 255a

The reaction mixture was made up of 80 parts, by weight, of crude solvent naphtha, containing 60% of reactives, and 20 parts, by weight, of beta-naphthol. The reaction was effected under conditions closely similar to those of Example 252a, the blend of crude solvent naphtha and beta-naphthol being agitated with 6% its weight of activated clay for a period of approximately 4 hours at a temperature of between 90° C. and 115° C. Recovery was effected as in Example 252a. The residual products of the reaction were a hard resin and a soft fluid resin. The hard resin had a melting range of from 90° C. to 100° C., and was soluble in ethanol, isopropanol, methanol, butanol, and the like, as well as in the hydrocarbon solvents. The soft, fluid resin was soluble in the solvent alcohols.

Example 256a 4 parts, by weight, of No. 2 crude solvent naphtha, containing 60% of reactives, was introduced together with 1 part, by weight, of resorcinol into a vessel having closed circulating coils for both heating and cooling fluids. The temperature was now raised, by a circulation of steam to between 120° C. and 130° C. Activated clay equal to 6% of the weight of the blend of naphtha and resorcinol was added, while maintaining the temperature at 120°–130° C. by a slow, controlled rate of clay addition, instead of by circulation of a cooling fluid. The total period of reaction was 4 hours. The residual products of this reaction are a hard resin and a soft resin, removable from the hard resin by steam or vacuum distillation. The hard resin has a melting range of 95° C. to 105° C. and is soluble in ethanol, isopropanol, methanol, butanol, and the like, and in the hydrocarbon solvents. The soft resin obtained from the reaction is also soluble in solvent alcohols, and in hydrocarbon solvents. It has a melting range of from 40° C. to 50° C.

Examples 252a, 253a, 254a, 255a and 256a above, have involved the use of crude solvent naphtha, in which the polymerizable content consisted preponderantly of coumarone and indene, so that the resultant products may be considered coumarone-indene products modified in varying degree by the presence of a phenol in the reaction mixture, and the participation of the phenol in the reaction. One may utilize as the hydrocarbon liquid of the reaction mixture, a crude solvent naphtha, the polymerizables of which consisted preponderantly of dicyclopentadiene.

Example 257a

Taking a crude solvent naphtha, in which the reactives consisted preponderantly of dicyclopentadiene, and which contained approximately 80% of reactives, we mixed this crude solvent naphtha in equal volumes with cresol and added activated clay in the proportion of 6% of the weight of the blend. The reaction mixture was agitated for 4 hours at a temperature ranging between 80° C. to 138° C. The reaction procedure and the recovery procedure were in accordance with those of Example 252a.

Commercially available phenol-modified coumarone-indene resins, such as those sold under the trade names "Pale Hard Nevillac" resin, "Nevillac 1°" resin, and "Nevillac RA" are suitable resins.

The following discussion and examples illustrate suitable phenolic resins prepared from aldehydes and tri-functional phenols, including such phenols as cardanol and hydrogenated cardanol, and including resins of the types known as novolaks and resoles and related resins.

Example 258a

| | Grams |
|---|---|
| Cardanol | 403.2 |
| Formaldehyde (37%) | 113.4 |
| Xylene | 403.2 |
| Concentrated HCl | 3.3 |
| Monoalkyl ($C_{10}$–$C_{20}$, principally $C_{12}$–$C_{14}$) benzene monosulfonic acid sodium salt | 1.4 |

The resin was prepared in the same manner as described in Example 1a, except that the reflux period was 3½ hours instead of 1½ hours. The xylene-free resin was reddish-black, and soft to pliable.

Example 259a

| | Grams |
|---|---|
| Cardanol | 576 |
| Formaldehyde (37%) | 160 |
| Ammonia (26° Bé. or about 28%) | 18.3 |
| Xylene | 575 |

All these items were mixed together and refluxed for 6 hours, followed by removal of water by distillation and heating to 125° C. for approximately 4 hours, forming a pliable or semi-solid resin. The resin so obtained is thermoplastic and soluble in xylene.

Example 260a

| | Grams |
|---|---|
| Cardanol | 447.0 |
| Concentrated sulfuric acid | 5.0 |
| Acetaldehyde | 78.0 |
| Xylene | 200.0 |

The same procedure was followed as in Example 14a, except that 200 grams of xylene were employed instead of 100 and thus the residual xylene added was 150 grams instead of 50 grams. The solvent-free resin was comparatively soft and reddish-black in color.

Example 261a

| | Grams |
|---|---|
| Cardanol | 2,880 |
| n-Butyraldehyde | 720 |
| $H_2SO_4$ (concentrated) | 30 |
| Xylene | 2,000 |

The procedure employed is the same as that of Example 260a. The solvent-free resin is soft.

Example 262a

| | Grams |
|---|---|
| Cardanol (vacuum distilled) | 2,880 |
| Heptaldehyde | 1,140 |
| $H_2SO_4$ (concentrated) | 30 |
| Xylene | 2,000 |

The procedure employed is the same as that of Example 260a. The solvent-free resin is soft.

Example 263a

| | Grams |
|---|---|
| Hydrogenated cardanol | 2,880 |
| Formaldehyde (37%) | 800 |
| HCl (concentrated) | 10 |
| Monoalkyl ($C_{10}$–$C_{20}$, principally $C_{12}$–$C_{14}$) benzene monosulfonic acid sodium salt | 10 |
| Xylene | 2,000 |

All of the above ingredients except the xylene are mixed and, with strong agitation, is heated slowly to approximately 65° C. when a spontaneous or vigorous reaction takes place so as to raise the temperature rather rapidly to 95° C., accompanied by some foaming. At this point the 2000 grams of xylene are added to thin out the reaction mixture and permit satisfactory agitation. The mixture is allowed to distill under a reflux condenser with the temperature determined by boiling point of water, approximately 100° C. Operating temperature is usually within the range of 105° to 110° C. After the completion of a 2 hour reflux distillation at this temperature, or at least sufficient to eliminate any odor of formaldehyde, removal of the water is started, using the usual trap arrangement. Approximately 685 grams of water are distilled off. The product, minus the solvent, is a semi-solid, tacky resin of a heavy tar-like consistency. It is decidedly more viscous than similar resins made from cardanol which has not been subjected to hydrogenation. Hydrogenated cardanol is hydrogenated in the side chain only.

*Example 264a*

The same procedure is followed as in Example 260a, except that the cardanol is replaced, mole for mole, with hydrogenated cardanol. The resin obtained is somewhat softer and more fluid in character than the comparable resin obtained from formaldehyde.

*Example 265a*

The same procedure is followed as in Example 264a, except that the acetaldehyde is replaced, mole for mole, with n-butyraldehyde. The resin obtained is somewhat softer and more fluid in character than the comparable resin obtained from formaldehyde.

*Example 266a*

The same procedure is followed as in Example 264a, except that the acetaldehyde is replaced, mole for mole, with heptaldehyde. The resin obtained is somewhat softer and more fluid in character than the comparable resin obtained from formaldehyde.

*Example 267a*

| | Grams |
|---|---|
| Cardanol | 245 |
| Phenol | 14.1 |
| Formaldehyde (37%) | 80 |
| HCl (concentrated) | 1 |
| Xylene | 575 |
| Monoalkyl (C$_{10}$ – C$_{20}$, principally C$_{12}$ – C$_{14}$) benzene monosulfonic acid sodium salt | 1 |

The above materials are mixed and heated with agitation for about 2 hours at 100° C. or until there is no further odor of unreacted formaldehyde. After this, water is allowed to distill off until the product begins to thicken and then 200 grams of xylene are added so as to thin it. The mass is now allowed to reflux with the conventional trap which separates the water and returns the condensed xylene. During the final stage, the temperature remains at approximately 140–150° C. The xylene is then removed under vacuum, using a temperature of 160° C. The final product is a semi-solid, tarlike resin, which is xylene-soluble.

*Example 268a*

| | Grams |
|---|---|
| Cardanol | 550 |
| Phenol | 26 |
| Formaldehyde (37%) | 160 |
| Ammonia (26° Bé. or about 28%) | 18.3 |

All items were mixed together and refluxed for 6 hours, followed by removal of water by distillation, heated to 125° C. and held at this temperature for approximately 4 hours, forming a semi-solid or pliable resin. The resin so obtained is thermoplastic and soluble in xylene.

*Example 269a*

| | Grams |
|---|---|
| Cardanol | 202 |
| Phenol | 28.2 |
| Concentrated sulfuric acid | 3 |
| Acetaldehyde | 44 |
| Xylene | 350 |

The procedure followed was the same as that described in Example 14a, except that 350 grams of xylene were employed instead of 100, and the residual addition of xylene was 300 instead of 50 grams. The resulting resin was semi-pliable to rubbery, and reddish black in color.

*Example 270a*

The same procedure was followed as in the preceding example, except that the amounts of cardanol and phenol were 347 and 100 grams. The resin is soft.

*Example 271a*

The same procedure was followed as in Example 269a, except that the amounts of cardanol and phenol were 300 and 147 grams. The resin is soft.

*Example 272a*

| | Grams |
|---|---|
| Cardanol | 250 |
| Phenol | 38 |
| Butyraldehyde | 72 |
| Concentrated H$_2$SO$_4$ | 3 |
| Xylene | 200 |

The procedure employed is that of Example 269a. The resin is soft.

*Example 273a*

| | Grams |
|---|---|
| Cardanol | 200 |
| Phenol | 88 |
| n-Butyraldehyde | 72 |
| H$_2$SO$_4$ (concentrated) | 3 |
| Xylene | 200 |

The procedure employed is that of Example 269a. The resin is soft.

*Example 274a*

| | Grams |
|---|---|
| Cardanol | 250 |
| Phenol | 38 |
| Heptaldehyde | 114 |
| H$_2$SO$_4$ (concentrated) | 3 |
| Xylene | 200 |

The procedure employed is that of Example 269a. The resin is soft.

*Example 275a*

| | Grams |
|---|---|
| Cardanol (vacuum distilled) | 200 |
| Phenol | 88 |
| Heptaldehyde | 114 |
| H$_2$SO$_4$ (concentrated) | 3 |
| Xylene | 200 |

The procedure employed is that of Example 269a. The resin is soft.

*Example 276a*

| | Grams |
|---|---|
| Hydrogenated cardanol | 270 |
| Phenol | 18 |

|   | Grams |
|---|---|
| Formaldehyde (37%) | 80 |
| HCl (concentrated) | 1 |
| Monoalkyl ($C_{10}$–$C_{20}$, principally $C_{12}$–$C_{14}$) benzene monosulfonic acid sodium salt | 1 |
| Xylene | 200 |

The procedure followed is that of Example 263a. The product minus the solvent is a semi-solid, tacky resin of a heavy tar-like consistency. It is decidedly more viscous than similar resins made from cardanol, which has not been subjected to hydrogenation.

Example 277a

The same procedure is followed as in Examples 267a to 276a, except that phenol is replaced by the molar equivalent of metacresol. The products are similar to those obtained with the use of phenol.

Example 278a

The same procedure is followed as in Examples 267a to 276a, except that phenol is replaced by the molar equivalent of metaethylphenol or metapropylphenol. Similar products are obtained.

Example 279a

|   | Grams |
|---|---|
| Cardanol | 576 |
| Paracresol | 108 |
| Formaldehyde (37%) | 240 |
| HCl (concentrated) | 4.5 |
| Monoalkyl ($C_{10}$–$C_{20}$, principally $C_{12}$–$C_{14}$) benzene monosulfonic acid sodium salt | 3 |

The procedure followed is that of Example 267a, except that during the final stage, the temperature remains at approximately 130° C. The xylene is then removed under vacuum, using a temperature of 160° C. The final product is a soft, pliable resin which material is xylene-soluble.

Example 280a

|   | Grams |
|---|---|
| Cardanol | 576 |
| Paracresol | 108 |
| Formaldehyde (37%) | 240 |
| Ammonia (26° Bé.) | 27.5 |
| Xylene | 200 |

All the above materials are refluxed together for 6 hours, followed by removal of water by distillation, heated to 125° C. and held at this temperature for approximately 4 hours until a hard brittle resin is obtained. The resin so obtained is thermoplastic and soluble in xylene.

Example 281a

|   | Grams |
|---|---|
| Cardanol | 357.6 |
| Ortho or paracresol | 89.4 |
| Concentrated sulfuric acid | 5.0 |
| Acetaldehyde | 78 |
| Xylene | 200 |

The procedure followed was the same as that described in Example 14a, except that 200 grams of xylene were added instead of 100 grams, and the residual addition of xylene was 150 grams instead of 50. The solvent-free resin obtained was soft, almost fluid, and xylene-soluble.

Example 282a

The same procedure was followed as in Example 281a, except that the amount of cardanol employed was reduced to 268.2 grams and the amount of cresol was increased to 178.8 grams.

Example 283a

The same procedure is followed as in Example 281a, except that the amount of cardanol employed is reduced to 137.3 grams and the amount of cresol increased to 268 grams.

Example 284a

The same procedure is followed as in Examples 281a, 282a and 283a, except that para-ethylphenol, para-propylphenol, para-butylphenol, para-amylphenol, or para-octylphenol is substituted in molar equivalent amounts for the ortho or paracresol.

Example 285a

The same procedure is followed as in the preceding four examples, except that the 78 grams of acetaldehyde are replaced by a molar equivalent of normal butyraldehyde.

Example 286a

The same procedure is followed as in Examples 281a to 284a, except that the 78 grams of acetaldehyde are replaced by a molar equivalent of heptaldehyde.

Example 287a

|   | Grams |
|---|---|
| Cardanol | 115.2 |
| Para-ethylphenol | 12.2 |
| Formaldehyde (37%) | 40 |
| HCl (concentrated) | .8 |
| Monoalkyl ($C_{10}$–$C_{20}$, principally $C_{12}$–$C_{14}$) benzene monosulfonic acid sodium salt | .5 |
| Xylene | 75 |

The molar ratio is 4 of cardanol to 1 of para-ethylphenol. The procedure followed is the same as that in Example 1a.

Example 288a

The same procedure is followed as in the preceding example, except that the para-ethylphenol is replaced by the molar equivalent amount of orthocresol, para-butylphenol, para-octylpheno, para-amylphenol, para-phenylphenol, or other difunctional phenol.

Example 289a

The same procedure is followed as in Example 287a and Example 288a, except that the molar ratio of cardanol to difunctional phenol is changed from 4 to 1 to 3 to 2 with the molar proportion of total phenol the same. Otherwise, the same reactants and the same procedures are employed.

Example 290a

Examples 279a to 289a are repeated replacing cardanol by hydrogenated cardanol. Since the commercial products are not one hundred per cent pure, it is not necessary to make any change in the formulations because of the slight difference in molecular weight between hydrogenated cardanol and cardanol. However, allowance for this slight difference can be made.

Example 291a

|   | Grams |
|---|---|
| Cardanol | 576 |
| Paracresol | 54 |
| Phenol | 47 |
| Formaldehyde (37%) | 240 |
| Concentrated HCl | 4.5 |
| Monoalkyl ($C_{10}$–$C_{20}$, principally $C_{12}$–$C_{14}$) benzene monosulfonic acid sodium salt | .3 |
| Xylene | 200 |

The same procedure was followed as in Example 1a. The resin is soft and pliable in consistency, and xylene-soluble.

Example 292a

| | Grams |
|---|---|
| Cardanol | 550 |
| Phenol | 26 |
| Formaldehyde (37%) | 160 |
| Ammonia (26° Bé. or about 28%) | 18.3 |

All materials are refluxed together for 6 hours, followed by removal of water by distillation, heated to 125° C., and held at this temperature for approximately 4 hours, forming a pliable or semi-solid resin. The resin so obtained is thermoplastic and soluble in xylene.

Example 293a

| | Grams |
|---|---|
| Cardanol | 288 |
| Ortho or paracresol | 27 |
| Metacresol | 27 |
| Concentrated sulfuric acid | 3 |
| Acetaldehyde | 66 |
| Xylene | 100 |

The same procedure was followed as described in Example 14a. The final resin was soft, almost fluid, soluble in xylene and other conventional solvent.

Example 294a

The same procedure was followed as in Example 293a, except the amount of cardanol employed was reduced to 268.2 grams and the amount of cresol increased to 178.8 grams, of which one-third was metacresol and two-thirds ortho or paracresol, or a mixture thereof.

Example 295a

The same procedure was followed as in Example 293a, except that the amount of cardanol employed was reduced to 137.3 grams and the amount of cresol increased to 268.0 grams, of which one-third was metacresol and two-thirds ortho or para-cresol, or a mixture thereof.

Example 296a

The same procedure was followed as in Examples 293a, 294a and 295a, except that para-ethylphenol, para-propylphenol, para-butyl phenol, para-amylphenol, or para-octylphenol was substituted in molar equivalent amounts for the ortho or para-cresol.

Example 297a

| | Grams |
|---|---|
| Cardanol | 288 |
| Para-ethylphenol | 35.5 |
| Phenol | 23.5 |
| Acetaldehyde | 66 |
| Concentrated H₂SO₄ | 3 |
| Xylene | 100 |

The procedure followed was the same as that described in Example 14a. The final product was a soft, amber colored resin.

Example 298a

| | Grams |
|---|---|
| Cardanol | 288 |
| Para-tertiary-butylphenol | 37.5 |
| Phenol | 23.5 |
| Concentrated H₂SO₄ | 3 |
| Acetaldehyde | 66 |
| Xylene | 100 |

The procedure followed was the same as that described in Example 14a. The final product was a soft, amber colored resin.

The same procedure as in the two preceding examples, but with the use of normal butyraldehyde and normal heptaldehyde in molar quantities to replace the acetaldehyde, gives resulting resins of the same general appearance.

Example 299a

| | Grams |
|---|---|
| Cardanol | 86.4 |
| Phenol | 9.4 |
| Para-ethylphenol | 12.2 |
| Formaldehyde (37%) | 40.0 |
| HCl (concentrated) | .8 |
| Monoalkyl (C₁₀–C₂₀, principally C₁₂–C₁₄) benzene monosulfonic acid sodium salt | .5 |
| Xylene | 100 |

The procedure followed is the same as that in Example 1a.

Example 300a

The same procedure is followed as in the preceding example, execpt that the para-ethylphenol is replaced by the equivalent molar amount of para-propylphenol, para-butylphenol, para-octylphenol, para-amylphenol, para-phenylphenol, or other difunctional phenol. Further variants include the replacement of the phenol by a molar equivalent amount of metacresol or other low molal alkyl phenol, for instance, ethyl or propyl phenol, providing the alkyl group is in the meta position.

Example 301a

The same procedure is followed as in Examples 299a and 300a, except that the molal ratio of cardanol to the other phenols (difunctional and trifunctional phenols) is changed from 3 to 2 to 2½ to 2½, with the same molar proportion of total phenols. Otherwise, the same reactants and same procedures are employed.

Example 302a

The same procedure is followed as in Examples 299a and 300a, except that the molal ratio of cardanol to the other phenols (difunctional and trifunctional phenols) is changed from 3 to 2 to 2 to 3, with the same molar proportion of total phenols. Otherwise, the same reactants and same procedures are employed.

Example 303a

| | Grams |
|---|---|
| Hydrogenated cardanol | 270 |
| Metacresol | 20 |
| Phenol | 18 |
| Formaldehyde (37%) | 80 |
| HCl (concentrated) | 1.0 |
| Monoalkyl (C₁₀–C₂₀, principally C₁₂–C₁₄) benzene monosulfonic acid sodium salt | 1.0 |
| Xylene | 200 |

The procedure followed was the same as in Example 1a. The resulting resin was semi-solid, tacky, and of heavy tar-like consistency.

Example 304a

Examples 291a and 292a preceding, were repeated, replacing cardanol by hydrogenated cardanol. Since the commercial product is not 100% pure, it is not necessary to make any change in proportions because of the slight difference in molecular weight between hydrogenated cardanol and cardanol. However, allowance for this slight increase can be made.

In connection with resins derived from cardanol and cardanol mixtures, attention is directed to the fact that a somewhat similar phenol is available by reaction which involves resorcinol as the initial reactant. If resorcinol is converted into the monoalkylate and then reacted with one mole of ethylene chlorohydrin or if resorcinol is treated mole for mole with ethylene oxide, the resultant compound may be indicated thus:

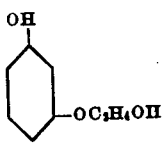

This is simply phenol (hydroxy benzene) with an oxyethanol radical in the meta position. We have esterified such compound with a variety of monocarboxy acids varying from lower fatty acids to the higher fatty acids and obtained phenols of the following compositions:

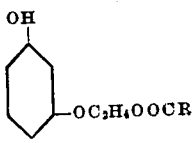

Such phenols have then been resinified in the same manner employed in connection with cardanol and hydrogenated cardanol as illustrated in the immediately preceding examples, and have been formed to give suitable resins.

Example 305a 108 parts of crude cresol were heated with 80 parts of 30% formaldehyde, 200 parts of water and 1 part of 37% hydrochloric acid for 3 hours while refluxing. The resin thus obtained was washed with water until neutral and freed from water by heating it to 130° C. to 140° C. under a reduced pressure.

Example 306a

A Novolak type resin was made by reacting 5000 parts of phenol containing 10 per cent orthocresol with 2,750 parts of 37 per cent aqueous formaldehyde and with 50 parts of 85 per cent phosphoric acid as a catalyst. The mixture of these ingredients was refluxed at atmospheric pressure with continuous mechanical agitation for about 6 hours, when upon testing it was found that practically all the formaldehyde had reacted and the pH value of the mass as determined by the separate aqueous layer was 1.6; the resin was then dehydrated by heating to a temperature of 160° C. under atmospheric pressure, resulting in a resin having a melting point of 74° C.

Example 307a

A base Novolak type resin, illustrating a higher formaldehyde content (0.81 mole per mole of phenol) than that described in Example 306a, was made by reacting 5000 parts of phenol containing 10 per cent of orthocresol with 3500 parts of 37% aqueous formaldehyde and with 50 parts of 85 per cent strength phosphoric acid as a catalyst; the mixture before reaction had a pH of 1.1–1.25. The mixture was refluxed in a steam vessel for six hours with continuous stirring until 96.3 per cent of formaldehyde had reacted and the pH value of the undehydrated resin was 1.6. The resin was dehydrated by heating under atmospheric pressure up to 160° C. and then discharged from the vessel; a resin having a melting point of 72° C. was obtained.

Example 308a

To 218 parts of phenol were added 95 parts of paraldehyde and 1.1 parts of concentrated hydrochloric acid and the mixture was stirred and brought to a gentle reflux. An exothermic reaction resulted. The mixture was next heated for one hour and the water removed. Maximum temperature 149° C. The resole obtained by this particular procedure or equivalent procedure gave an excellent product which was readily susceptible to oxyalkylation.

Example 309a

A xylene-soluble Novolak was produced as follows:

| | Grams |
|---|---|
| Metacresol | 3,450 |
| Heptaldehyde | 3,370 |
| Ammonium chloride | 100 |

The cresol and catalyst (NH₄Cl) were combined in a resin pot and heated to 150° C. before starting to add slowly the aldehyde. As water was formed, the temperature dropped to 110° C. After refluxing for 2½ hours, the mass was transferred to an evaporating dish and heated to 170° C., evaporating off the water and excess aldehyde. The resulting Novolak was clear, amber colored, soft and tacky, and was xylene-soluble.

Example 310a

The same procedure was followed as in Example 309a, except that the 3450 grams of metacresol were replaced by 4650 grams of carvacrol.

Example 311a

There are available in the open market various comparatively low-melting resins obtained from difunctional phenols and formaldehyde or from acetaldehyde. The substituent group usually has 4 to 8 carbon atoms and the commonest examples are resins produced from para-tertiarybutylphenol, para-tertiaryamylphenol, para-phenylphenol, etc. For instance, one company manufactures such resins from the amylphenol, the butylphenol, and the phenylphenol. All these resins are characterized by low-melting point of less than 100° C. We have found that any of these commercially available resins can be resinified further by the addition of phenol and formaldehyde using conventional procedure. As an example of this procedure, the following will serve as an illustration:

| | Pounds |
|---|---|
| Amylphenol resin BR–4036 (this resin is manufactured by the Bakelite Company, Bloomfield, New Jersey) | 169 |
| Phenol | 9.4 |
| Formaldehyde (37%) | 24.3 |
| Monoalkyl (C₁₀–C₂₀, principally C₁₂–C₁₄) benzene monosulfonic acid sodium salt | 1.6 |
| Concentrated hydrochloric acid | 1.5 |
| Xylene | 180 |

The resin, the phenol, and xylene were placed in a resin pot equipped with the usual devices, i. e. stirrer, reflux condenser, heating device, thermometer well, inlets, outlets, etc. The mixture was heated to 140° C. and stirred until completely homogeneous at this temperature. On cooling to approximately 70° C., the solution became somewhat opaque. The formaldehyde, acid catalyst, and emulsifying agent were added at this temperature (70° C.). Heat was then applied so as to raise the temperature to approximately 100°–105° C. There was no exothermic reaction.

The mass was allowed to reflux at this approximate temperature for one hour before any effort was made to remove the water by means of the conventional trap arrangement.

The finished resin, free from solvents, is a hard, brittle, xylene-soluble, dark red resin, and has a melting point of approximately 140° to 145° C., whereas the low-melting point resin employed in the manufacture has a melting point of 78°-83° C.

Example 312a 174 grams of the resin of Example 3a were dissolved in approximately an equal weight of xylene. To this mixture were added 10 grams of the xylene-soluble Novolak described in Example 309a. This xylene solution was held at 100° C. for one-half hour in order to permit secondary reactions to take place. The nature of these secondary reactions is obscure and unknown. There may have been some loss of xylene during this period, but in any event the final solution contained approximately 55% resin. The Novolak employed was soft and tacky. The melting point of the amylphenol resin was about 132° to 137° C. The final product, on a solvent-free basis, had a melting point of 120° to 125° C. It is to be noted that here again is a resin which, although obtained primarily from difunctional phenols, contains approximately 5% of a trifunctional phenol in combined form.

Example 313a

The same procedure was employed as in Example 312a, except that 174 grams of the amylphenol resin were replaced by an equal amount of the para-octylphenol resin of Example 8a. Otherwise the procedure was identical with that used in Example 312a.

Example 314a

The same procedure was employed as in Example 312a except that 174 grams of a menthylphenol-formaldehyde resin were employed instead of the amylphenol resin. This resin was obtained by use of hydrochloric acid as a catalyst in the manner described in Example 69a.

Example 315a

The same procedure was followed as in Example 312a, preceding, except that the resin employed was the para-tertiarybutylphenol-acetaldehyde resin of Example 14a. The amounts of resins employed were identical.

Example 316a

The same procedure was followed as in Example 312a, preceding, except that the resin employed was the para-nonylphenol-acetaldehyde of Example 77a. In all other respects the procedure was identical in regard to amounts, etc.

The following discussion and examples illustrate suitable resins prepared from bis-phenols.

Bisphenols have a number of characteristics, two of which are as follows: (1) The divalent radical which unites the phenolic nuclei is derived from a ketone instead of an aldehyde; and (2) although some bisphenols are difunctional, others have a functionality of 3 or 4. The resins are sometimes manufactured from a phenol and ketone, either entirely or in part, and sometimes, from a bisphenol itself. Various bisphenols, particularly bisphenol A, are sold commercially in substantial quantities.

In the manufacture of resins from bisphenols the usual reactants consist of such phenols along with ketones of various kinds, chlorinated compounds such as dichloro-ethylether, or glycerol dichlorohydrin, and acetylene. Other suitable resins are obtained by reacting phenols with ketones to yield bis-phenols and then without separation reacting further with an aldehyde. A more complicated structure is sometimes prepared in which an excess of the ketone is used over and above the amount required theoretically to yield the bis-phenol. In this latter case subsequent reaction with an aldehyde is also involved. As an alternate procedure the bis-phenol may be prepared, separated and purified and subjected to reaction with an aldehyde so as to yield a ketone-phenol-aldehyde resin. In any event, if desired a bis-phenol, essentially a monomer or a phenol-ketone resin which is polymeric in the sense that the structural units enter more than once, can be treated with an aldehyde so as to yield a ketone-phenol-aldehyde resin of a conventional type. Particularly suitable resins are obtained from commercially available bis-phenols and aldehydes without the addition of more ketone.

Example 317a 228 parts of diphenylol propane, 58 parts of acetone and 22.8 parts of hydrochloric acid were heated under reflux with stirring for from 16 to 24 hours. The dark red resin which formed was separated from the small amount of aqueous liquid present, washed with water and distilled under vacuum until a resin melting at 50 to 60° C. was obtained.

Example 318a 188 parts of phenol, 116 parts of acetone and 18.8 parts of hydrochloric acid were heated under reflux until a dark red resin, similar to that of the preceding example was obtained.

Example 319a 188 parts of phenol, 58 parts of acetone and 18.8 parts of hydrochloric acid were heated under reflux until the sample, on cooling, formed red crystals. 58 parts of acetone were then added to the mixture and the heating continued until a resin similar to that of Example 317a was formed.

Example 320a

The same procedure was followed as in Example 318a, except that the acetone was replaced with the molar equivalent of methyl ethyl ketone. The resin obtained was similar in appearance.

Example 321a 26.8 parts of the resin of Example 317a were heated with 7.5 parts of Formalin and 0.26 part of phosphoric acid until substantially all the formaldehyde combined to form the new resin. It was then washed with 10 parts of water and with 10 parts of 10% aqueous sodium carbonate, and vacuum distilled for about 3 hours, and then further distilled at atmospheric pressure until the sample, on cooling, solidified at about 100° C. A clear, solvent-soluble resin was obtained.

Example 322a

The procedure of Example 321a was followed, except that the resin used was that of Example 320a. A similar product was obtained.

Example 323a

One mole of acetone was heated with one mole of phenol in the presence of 5 to 6% of hydrochloric acid based on the phenol at a temperature of 70 to 80° C. for about 48 hours. The resulting product was steam distilled at 160 to 180° C. to remove excess phenol and hydrochloric acid, giving a reddish colored material with a melting point around 50° C., which was soluble in acetone and aromatic solvents.

Example 324a

The condensation product of the preceding example was heated with about 50% of its weight of Formalin for about 8 to 12 hours, under reflux, after which the excess formaldehyde and the water were removed by subjecting the reaction mixture to distillation, carrying the temperature to about 230° C. A resin having a melting point of about 110° C. was obtained.

Example 325a

One mole of diphenylol propane was heated with one mole of formaldehyde and a small amount of phosphoric acid, with stirring, in a jacketed vessel heated by a medium at 120 to 130° C. the heat being continued until only a small amount of the formaldehyde remains uncombined. The product is then allowed to stratify, the aqueous layer removed, the resin washed with hot water and vacuum distilled. It was then heated to 180 to 200° C. giving a clear resin with a melting point of about 140 to 150° C.

Example 326a

The procedure followed is the same as that of Example 325a, except that the bis-phenol from diethyl ketone is substituted for the diphenylol propane in equimolar proportions.

Example 327a

| | Pounds |
|---|---|
| Bis-phenol A (mainly di-p-hydroxyphenyl-dimethyl-methane) | 521 |
| Acetone | 133 |
| HCl (concentrated) | 22 |

The above materials were mixed and heated under reflux for two hours or until the temperature reached approximately the boiling point of water, with no noticeable reflux taking place. The acetone boils below 100° C. so that when 100° C. is reached without refluxing it is an indication that the acetone has been used up in the reaction. 250 pounds of xylene are added and the condenser connected to the usual trap arrangement whereby the water vapors and xylene vapors are condensed, with the water discarded by a trap arrangement and the xylene returned for further refluxing. Approximately 76 pounds of water were obtained in this manner over a 12-hour period. The final solution contained approximately 30% solvent and 70% resin. On evaporation of such solvent the resin is a hard resin of medium amber color.

250 pounds of the above xylene solution containing approximately 175 pounds of resin and 75 pounds of xylene were mixed with 3 pounds of sulfuric acid and the mixture heated to 150° C. 11.2 pounds of acetaldehyde were mixed with 25 pounds of xylene and this mixture slowly added to the acidified reactant mass. The temperature slowly decreased as water formed. The entire mixture was then heated at its reflux temperature, 100° to 110° C., for approximately 1½ hours or until substantially all the odor of acetaldehyde had disappeared. The trap arrangement was used to eliminate water with the removal of substantially 10 pounds of water. After the water was removed, the temperature gradually increased to 150° C. The mass was then heated for one hour longer at 150° C. to insure completeness of reaction. The final resin obtained in the manner above described contained approximately 37% of solvent and 63% of resin. The resin obtained on evaporation of the solvent was a soft viscous mass, having a dark reddish color.

Example 328a

The same procedure was followed as in Example 327a, except that 20.5 pounds of butyraldehyde was substituted for 11.2 pounds of acetaldehyde, no xylene was added with the aldehyde, with the result that in the final product the solvent content was approximately 30% solvent and 70% resin.

Example 329a

The same procedure was followed as in Example 327a, except that heptaldehyde was substituted for acetaldehyde in equivalent molar proportion and no xylene was added with the result that the final resin contained approximately 28% solvent and 72% resin. Both the present resin and that of Example 328a were somewhat softer products than that of Example 329a.

Example 330a

The same procedure was followed as in Example 327a preceding except that octaldehyde was substituted for acetaldehyde in equivalent molar proportion and no xylene was added with the aldehyde. Xylene was added later in the reaction due to the thickening of the reaction mass with the result that the final resin contained approximately 45% xylene and 55% resin. The resin minus solvents was somewhat softer than the similar compound made from acetaldehyde.

Example 331a

| | Pounds |
|---|---|
| Bis-phenol A | 228 |
| Acetaldehyde | 44 |
| Concentrated sulfuric acid | 3 |
| Xylene | 50 |

The acid was added to the bis-phenol A and the mixture heated to 150° C. The xylene was added to the acetaldehyde and the mixture added slowly to the acidified phenol, the temperature falling as water formed to the approximate reflux temperature of water, i. e., 100–110° C. Otherwise, the procedure was substantially the same as described in Example 327a, with the removal of approximately 14 pounds of water. On removal of the xylene, the resin obtained was soft. The product obtained following the above directions represents approximately 16% xylene and 84% resin.

Example 332a

| | Pounds |
|---|---|
| Bis-phenol A | 228 |
| Butyraldehyde | 72 |
| Sulfuric acid (concentrated) | 3 |
| Xylene | 50 |

The procedure followed was that of Example 331a, except that the xylene was added after the aldehyde had refluxed for approximately 1½ hours and not along with the aldehyde. The amount of water removed was approximately 14.5 pounds. The finished resin contained approximately 15% xylene and 85% resin. On evaporation of the xylene a soft resin was obtained.

Example 333a

| | Pounds |
|---|---|
| Bis-phenol A | 228 |
| Heptaldehyde | 114 |
| Sulfuric acid (concentrated) | 3 |
| Xylene | 50 |

The same procedure was followed as in Example 332a. The amount of water removed was 18 pounds. The final resin obtained was 13.3% xylene and 86.7% of resin. On removal of the xylene the resin was a soft product, somewhat more viscous than the comparable product obtained from butyraldehyde and about the same as the product obtained from acetaldehyde.

*Example 334a*

The intermediate resin was prepared as in Example 327a.

To 828 pounds of the intermediate resin solution containing 578 pounds of resin and 250 pounds of xylene, were added 91 pounds of formaldehyde, 2 pounds of HCl (concentrated) and 2 pounds of monoalkyl ($C_{10-20}$, principally $C_{12}-C_{14}$) benzene monosulfonic acid sodium salt, used as an emulsifying agent. These reactants were heated together under reflux with stirring at a temperature of 100–110° C. for two hours or until all the formaldehyde had combined. The water was then removed, using the trap arrangement, with the temperature being increased to 150° C.

The resin as finished contained 30% xylene. Solvent-free, it was hard, brittle, transparent and dark red in color with a melting point of 60° C.

*Example 335a*

| | Pounds |
|---|---|
| Bis-phenol B (mainly di-p-hydroxyphenyl-methyl-ethyl-methane) | 110.7 |
| Acetaldehyde | 20.1 |
| Conc. sulfuric acid | 1.0 |
| Xylene | 100.0 |

The bis-phenol B 50 pounds of the xylene and acid catalyst were admixed in a suitable reaction vessel equipped with a stirrer and reflux condenser. The mixture was heated to 150° C. before slowly adding the acetaldehyde and remaining xylene in admixture. The temperature slowly fell from the 150° C. as water formed, to the approximate reflux temperature of water, i. e., 100–110° C. The heating was continued under reflux for 1½ hours or until all the aldehyde had combined, after which the water of reaction was removed using the trap arrangement. The resin as finished, contained 44% xylene and 56% resin. The resin minus solvent was soft and viscous, similar to that obtained from bis-phenol A.

*Example 336a*

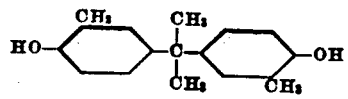

| | Pounds |
|---|---|
| Bis-phenol C [mainly di-(p-hydroxy-m-methyl-phenyl)-dimethyl-methane] | 128 |
| Formaldehyde (37%) | 42 |
| Hydrochloric acid concentrated | 1.5 |
| Monoalkyl ($C_{10}-C_{20}$, principally $C_{12}-C_{14}$) benzene monosulfonic acid sodium salt | .5 |
| Xylene | 50 |

The bis-phenol C and xylene were mixed and the mixture heated to 130° C. The catalyst was then added. The emulsifying agent was dissolved in the formaldehyde, and the mixture added in a very small stream over a period somewhat over ½ hour so that the reaction was controlled by the addition of the reactant. After all the aldehyde had been added the reaction mass was refluxed with constant stirring to give the typical creamy state. The refluxing temperature was lower than the temperature of initial reaction because it is determined by the water present. During this refluxing stage the creamy mass thickens and about 75 pounds more of xylene were added to keep the creamy mixture sufficiently thin. At the end of the refluxing stage, indicated by substantially complete disappearance of the formaldehyde the water is removed by the trap arrangement. Approximately 36 pounds of water were removed. After removal of water and as resinification nears completion, the resin may show a lessened solubility in xylene or else an undesirable increase in viscosity. For this reason, a solvent which will reduce the viscosity somewhat and give a better solution or more homogeneous mixture was added, specifically 50 pounds of Diethyl Carbitol (diethyleneglycol diethylether). The final diluted resin so obtained contained slightly less than 45% resin and slightly more than 55% solvent. The solvent-free resin was a hard, very dark resin, having a melting point of 100°–110° C.

*Example 337a*

| | Pounds |
|---|---|
| Bis-phenol C (½ pound mole) | 128 |
| Acetaldehyde (½ pound mole) | 22 |
| $H_2SO_4$ (concentrated) | 1 |
| Xylene | 50 |

The bis-phenol C and xylene were mixed and heated with stirring to 150° C. As soon as the mixture was uniform the sulfuric acid was added and stirring continued. The acetaldehyde was mixed with an additional 50 pounds of xylene and this mixture was added slowly. The reaction mass was then refluxed for one hour or until the aldehyde had reacted completely. When the reaction was completed, approximately seven to eight pounds of water were distilled off using the trap. The finished resin contained something less than one-half xylene and the solvent-free resin was similar in appearance to that described in the preceding example, but somewhat softer.

*Example 338a*

| | Pounds |
|---|---|
| Bis-phenol C (½ pound mole) | 128 |
| Heptaldehyde (½ pound mole) | 57 |
| $H_2SO_4$ (concentrated) | 1 |
| Xylene | 50 |

The same procedure was followed as in Example 337a, except that the xylene was not added to the heptaldehyde but was added before removing the water and before the reaction mass cooled.

*Example 339a*

| | Pounds |
|---|---|
| Bis-phenol C | 75 |
| Xylene | 50 |
| $H_2SO_4$ (concentrated) | 1 |
| Butyraldehyde | 21 |

The some procedure was followed as in Example 338a, including the addition of a second lot of 50 pounds of xylene. The final resin solution obtained represented about 50% resin and 50% xylene. The second batch of xylene need not be added or some fraction thereof may be used so as to obtain a resin solution containing approximately ⅓ solvent and ⅔ resin.

Other bisphenols, suitable for preparing resins of the type used for the preparation of the demulsifying agents used in accordance with the invention, by procedures similar to those of the Examples 311a–339a, include di-p-hydroxyphenol-phenyl - ethyl - methane, di - p - hydroxyphenyl-methyl - amyl - methane, di - p - hydroxyphenyl-propyl - methane, di - (p - hydroxy - m - methyl-phenyl)-dimethyl-methane, di-(p - hydroxy - m-ethyl - phenyl) - dimethyl - methane, di - (p - hydroxy-m-propyl-phenyl)-dimethyl-methane, di-(p - hydroxy - m - phenyl - phenyl) - dimethyl-methane, di-(p - hydroxy - m - chloro - phenyl)-dimethyl-methane, and di-p-hydroxyphenyl-cyclohexyl-methane. These are produced from the various ketones and phenols, and, in each case, will ordinarily be predominantly the named material, but in admixture with varying amounts of isomers, etc. Instead of starting with the bisphenol, equally satisfactory products are obtained by starting with the corresponding phenols and ketones, without isolation of any bisphenol.

The following discussion and examples illustrate suitable phenolic resins in which the bridging radicals, are, in part at least, of non-aldehydic origin (resins derived from bisphenols, heretofore illustrated, may also be regarded as in this category, in that in them phenolic nuclei are linked through ketone-derived radicals by reaction with nuclear phenolic hydrogen atoms, as may certain of the modified resins above illustrated) and in which the phenolic nucleus or nuclei in the resin are, in part at least, linked by replacement of one or more nuclear hydrogen atoms by non-aldehydic-derived bridging radicals, including sulfur, acetylene, dichlorodiethyl-ether, etc.

Example 340a

| | Pounds |
|---|---|
| NaOH (48.3% soln.) | 84.6 |
| H2O | 115.7 |
| Bis-phenol "A" | 131.4 |
| Diethylamine | 0.8 |

The above reactants were combined in a resin pot equipped with reflux condenser, stirrer, thermometer well, etc. and heated to 100° C. Then 82.5 pounds dichlorodiethyl-ester were slowly added and the mixture refluxed for eight hours during which period the mass assumed a heavy, creamy appearance with an accompanying increase in viscosity. After the eight-hour reflux period, 15 pounds (48.3% solution) of NaOH were added. The apparatus was then set for distillation. 100 pounds of xylene were added at this stage, to aid in removal of water and also to thin out the mass to a moderate degree. After distilling out 150 pounds of water, there was a second addition of 100 pounds of xylene introduced into the mass to offset the thickening effect which took place with the elimination of the water. After distilling out all the water from the reaction product, there was another addition of solvent made consisting of 500 pounds of xylene and 200 pounds of methyl alcohol. This dilution permitted the separation of the salt which had formed during the reaction. The entire solution with precipitated salt was filtered so as to eliminate the salt mechanically. The resin was then subjected to distillation so as to remove the solvent. When the solvent-free resin was obtained, it was heated further to 235° C. for two hours. The resulting resin was amber colored, hard, brittle, and xylene-dispersible. It had a melting point of 85–87° C. For convenience in the matter of subsequent oxyethylation the resin was dissolved in a solvent which consisted of 42% diethyleneglycol diethyl-ether and 58% of xylene. The finished solution was such that it contained 48% of resin and 52% of the above mixed solvent.

Example 341a

The procedure followed was the same as in Example 340a except that bis-phenol A derived from dimethyl ketone was replaced by bis-phenol B derived from methyl-ethyl ketone in stoichiometric equivalent.

Example 342a

| | Pounds |
|---|---|
| p-Tert. amyl phenol | 164 |
| Dichlorodiethylether | 142 |
| NaOH (in 166 pounds H2O) | 80 |
| H2O | 200 |
| Diethylamine | 1.4 |

The procedure was the same as that of Example 340a, except that no xylene was added until the end of the reflux period, and a twelve hour reflux period was employed. At the end of the twelve hour reflux period, 200 pounds of xylene were added and then 10 pounds of caustic soda in 15 pounds of water. A separation was then allowed to take place and the aqueous layer withdrawn. The reaction mass was washed once with water and filtered to remove any salt. The solvent was then evaporated by distillation at 150° C. The reaction mass was finally heated for two hours at 235° C. The product was a soft resin, dark amber in color, and xylene-soluble. The product appeared to be largely trimeric with small amounts of dimeric matter present.

Example 343a

A stoichiometric amount of para-tertiary butylphenol was substituted for amylphenol in the previous example. The resin was similar in appearance and properties.

Example 344a

| | Grams |
|---|---|
| Para-tertiaryamylphenol | 3,280 |
| Sulfur chloride (mono) | 2,700 |
| Benzene | 2,600 |

The amylphenol and benzene were mixed together and placed in a reaction vessel with provision for stirring, cooling, etc. The sulfur chloride was added slowly while the temperature was kept at 35° to 40° C. The time required was two to three hours. When all the sulfur chloride had been added, the temperature was raised slowly to 50°–60° C. and held at this temperature for 15 to 20 minutes. During this period there was considerable liberation of hydrochloric acid. The mass was diluted further by the addition of another 2000 grams of benzene which was added to reduce the viscosity of the mass and to permit further escape of hydrochloric acid as well as to permit greater ease of subsequent washing. The entire mass was washed with 3000 grams of 10% sodium carbonate solution, in order to remove HCl, etc. After completely washing by moderate agitation, the wash water was withdrawn and there was added to the mass an amount of xylene equivalent to 25% of its weight.

Example 345a

A diphenylol methane was prepared from two moles of p-tertiary-amylphenol and one mole of formaldehyde so as to yield a product of substantially the following composition:

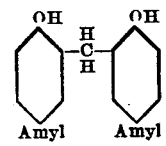

The diphenylol methane of the above composition was treated with sulfur monochloride as follows:

| | Grams |
|---|---|
| Diphenylol methane, as above | 1,700 |
| Benzene | 500 |
| Sulfur monochloride | 685 |

The diphenylol methane and benzene were mixed and then the sulfur chloride added over a two- to three-hour period, holding the temperature at 35° to 40° C. After this first period the temperature was increased to 60° to 90° C. for one-half hour. The reaction mass was then cooled and washed with 1000 grams of 10% sodium carbonate solution. The wash water was withdrawn and the mass heated to evaporate the benzene.

*Example 346a*

One need not manufacture alkyl phenol sulfide resins but can purchase the same in the open market. For example, they are sold in commerce under the name of "Vultac," being a trademark name of Sharples Chemical Company, Inc. Such resins are suitable.

*Example 347a*

100 parts of 4-hydroxydiphenyl and 6 parts of zinc acetate are introduced into a shaking autoclave which is freed from air and filled with nitrogen under a pressure of 5 atmospheres. Acetylene is then introduced until the pressure is 10 atmospheres and the autoclave heated to 190° C., more acetylene being introduced as the pressure drops until 17 parts of acetylene have been absorbed. A resin softening at about 135° C. and suitably solvent-soluble is obtained.

*Example 348a*

100 parts of tertiary p-butylphenol and 10 parts of zinc acetate are introduced into the autoclave, and treated with acetylene as in Example 347a until about 15 parts of acetylene have been absorbed. A benzene-soluble resin which softens at about 95 to 100° C. is obtained.

*Example 349a*

The butyl-phenol-acetylene resin sold by General Aniline and Film Corporation under the name "Koresin" is a suitable phenol acetylene resin.

The following examples illustrate suitable phenolic resins in which the bridging is in part the result of nuclear hydrogen replacement and in part the result of reaction at non-nuclear reactive positions.

*Example 350a*

Methylene disalicylic acid was obtained by condensing two moles of salicyclic acid with one mole of formaldehyde. The resultant product may be considered as the initial stage of a phenol-aldehyde resin. However, since it was also a dicarboxy acid, it could be converted into a resin by reaction with a polyhydric alcohol.

| | Grams |
|---|---|
| Methylene disalicylic acid | 2,880 |
| Ethyleneglycol | 620 |
| Diethyleneglycol diethylether | 2,880 |

The three ingredients were combined in a flask equipped with a reflux condenser. The mixture was refluxed for 2 hours at a temperature of 119° C. 35 grams of toluene sulfonic acid were then added, along with 1000 grams of xylene. The mixture was then refluxed for 4 hours longer, and then distilled with the usual trap arrangement. This eliminated all the water formed as a result of esterification, along with some of the diethyleneglycol diethylether. The excess of xylene was evaporated off and the solid that remained contained uncombined methylene disalicylic acid equivalent to about 150 grams. A sample, after evaporation of the xylene, weighed approximately 4800 grams. Assuming the loss of one mole of water in the reaction and that all the xylene was removed, the product described contained approximately 63% resin and 36% solvent (diethyleneglycol diethylether). The sulfonic acid present as a catalyst was neutralized with an alcoholic solution of potassium hydroxide. The amount employed was sufficient to neutralize all the toluene sulfonic acid and to give a slight excess which would serve as a catalyst for subsequent oxyalkylation.

*Example 351a*

| | Grams |
|---|---|
| Para-tertiary amylphenol | 2,790 |
| Aniline | 1,590 |
| Formaldehyde (35–37%) | 3,020 |
| Xylene | 3,000 |

The aniline, phenol, and xylene were combined in the resin pot and heated to 70° C. The formaldehyde was then slowly added with an exothermic reaction increasing the temperature to 95° C. After addition of the formaldehyde, heat was again applied to raise the temperature to 105°–110° C., the mixture being refluxed for three hours, after which 2550 grams of water were removed by the trap arrangement. As the water distilled out, the temperature was allowed to increase to 145°–150° C. (or the reflux temperature of the xylene) and the reaction product was heated one hour at this temperature to assure completion of the reaction. The resulting resin, on evaporation of solvent, was hard, brittle, xylene-soluble and had a melting point of 125° C. Similar resins prepared using other difunctional phenols, such as butylphenol and octylphenol, gave suitable resins.

*Example 352a*

| | Grams |
|---|---|
| Phenol | 10,000 |
| Glycerol | 7,000 |
| Concentrated sulfuric acid | 100 |

The above reactants were heated in the resin pot at 160° to 185° C. until 3380 grams of water had been distilled off. The acidity of the compound was then neutralized with barium carbonate and calcium oxide. A decided color change was noted from a reddish brown in the acid state to a deep purple in the alkaline state. The reaction product was then diluted with 10,000 grams of dioxane in order to filter out the insoluble salts. After filtration, the dioxane was removed by distillation from the salt-free resin, leaving a soft, pliable resin.

*Example 353a*

| | Grams |
|---|---|
| Para-tertiaryamylphenol | 10,000 |
| Glycerol | 4,020 |
| Concentrated sulfuric acid | 100 |

This resin was made following the procedure of Example 352a heating to 160° to 190° C. in the resin pot, but it was noted that an exothermic reaction took place after approximately two-thirds of the water had been removed, and the compound became so viscous that 2000 grams of xylene had to be added to thin it sufficiently to permit removal of the balance of the water. The temperature during the reflux of the xylene had to be held at 145° to 150° C. This resin was neutralized with calcium oxide and the salts removed by filtration. The xylene was then removed by distillation, leaving a hard, brittle, resin having a melting point of 80° C.

*Example 354a*

| | Grams |
|---|---|
| 2-ethyl-3-propyl acrolein | 1,195 |
| Para-tertiaryamylphenol | 1,640 |
| Xylene | 1,500 |
| Concentrated sulfuric acid | 30 |
| Maleic anhydride | 930 |

The amylphenol and acid catalyst were heated in the resin pot to 150° C. The acrolein and xylene in admixture were then slowly added with no pronounced reaction being noted. The temperature gradually fell to 100° to 105° C. as water was formed and started refluxing. The product was refluxed for an hour at the temperature of 105° C. The water was then removed by means of the trap arrangement. After removal of all the water, the product was cooled to 60° C. At this point, the maleic anhydride was added and the heat reapplied, slowly increasing the temperature to 250° C. This product was then saponified with alcoholic potassium hydroxide. After removal of the alcohol by distillation, the saponified product was acidified with HCl and dissolved in ethylether and washed with water to remove the excess hydrochloric acid, with the ether then being removed by evaporation.

*Example 355a*

| | Grams |
|---|---|
| Rosin | 1,300 |
| Phthalic anhydride | 600 |
| Glycerol | 500 |

(Phenol as specified below)

The above reactants were heated in the resin pot equipped with stirrer, reflux condenser, water trap, thermometer well, etc., to 260° C., removing 130 grams of water, and held at this temperature for one and one-half hours. The product was then cooled to 80° C., at which point 1000 grams of phenol and 340 grams of para-formaldehyde were added and the heat reapplied, increasing the temperature to 230° C. The product was heated for one hour at this temperature. The mass was then cooled sufficiently to add 2000 grams of xylene. The resulting resin, minus solvent, was semi-hard, pliable, xylene soluble and dark amber in color.

*Example 356a*

The procedure followed was that of Example 355a, except that 1740 grams of amylphenol were substituted for the 1000 grams of phenol and 2500 grams of xylene were used. The resultant solvent-free resin being soft, tacky and reddish amber in color.

*Example 357a*

| | Grams |
|---|---|
| Phenol | 940 |
| Urea | 1,940 |
| Formaldehyde (37%) | 25 |
| Sulfuric acid | 25 |
| Benzene | 1,000 |

Th materials were combined in a resin pot equipped with stirrer, thermometer well, reflux condenser, etc., and heated under reflux at 75° to 80° C. for 4½ hours. 170 grams of NaOH in 740 grams of water were then added. The heat was reapplied, increasing the temperature to 85° to 90° C., distilling off sufficient benzene to obtain this temperature. The product was heated under reflux for 4½ hours at the 85° to 90° C. temperature.

*Example 358a*

| | Grams |
|---|---|
| Koresin [1] | 201 |
| Formaldehyde, 37% | 24 |
| Concentrated HCl | 1.5 |
| Monoalkyl ($C_{10}$–$C_{20}$, principally $C_{12}$–$C_{14}$) benzene monosulfonic acid sodium salt | .8 |
| Xylene | 150 |

[1] Koresin is the trade-mark of the General Aniline & Film Corporation to designate a para-butylphenol-acetylene resin.

The procedure followed was that described in Example 1a, i. e., the Koresin was treated as if it were a phenol, with the amount of formaldehyde used reduced to a minimum. The original Koresin resin had a melting point of 120° to 125° C. During the re-resinification procedure a very small amount of a hard insoluble material separated out. This was filtered out of the xylene solution. The solvent-free resin obtained was hard, brittle, clear and amber colored. It was xylene-soluble. On standing, it took on an opaque appearance. The melting point was 178° to 182° C.

*Example 359a*

This resin was xylene-soluble phenol-styrene-oxide resin furnished by the Monsanto Chemical Company and stated to be made according to the directions of U. S. Patent No. 2,422,637 dated June 17, 1947, to Thomas, assigned to Monsanto Chemical Company.

*Example 360a*

A para-tertiaryamylphenol-formaldehyde resin prepared in the manner described in Example 1a was dissolved in an equal weight of xylene and heated with the addition of a small amount of sodium methylate so that the free alkalinity present was equivalent to about 0.5–0.7% of caustic soda. This solution was mixed with styrene oxide in the proportion of 200 grams of solution (equivalent to 100 grams of the resin) with 75 grams of styrene oxide. The mixture was then held at a temperature of 175° C., with constant stirring, for approximately one-half hour. During the next half hour 25 additional grams of the styrene oxide were added and the temperature allowed to rise to 190° C. At the end of this time the reaction was stopped. The produce was a viscous, amber colored liquid.

*Example 361a*

To 100 parts of phenol were added 80 parts of 40% formaldehyde and 1.5 parts of ammonium chloride and the mixture refluxed until the resin separated. The resulting liquid condensation product was separated from the water, washed three times with warm water, and dried under reduced pressure at 55° C. The product obtained was a light, amber-colored resin, soluble in alcohol.

| | Grams |
|---|---|
| Phenol-aldehyde resin, as above | 100 |
| Styrene oxide | 100 |
| Sodium methylate | .5 |

The resin and the sodium methylate were heated to 100° C. The mass was fluid at this temperature and was stirred constantly, and approximately one-third of the styrene oxide was added during the next half hour. When one-third the styrene oxide had been added, considerable foaming started, presumably due to water which had been trapped in the resin. A conventional glass trap was inserted in the reflux condenser and allowed to distill so the styrene oxide refluxed and the water was caught in the trap. The total amount of water that came out was about 4 c. c. At the time the 4 c. c. of water had been removed the temperature had risen to 140° C. Another third of the styrene oxide was added then, dropwise, maintaining this temperature for the next half-hour period. Then the temperature was raised to 150° C. and the last third of the styrene oxide was introduced, one additional gram of sodium methylate was added and there was a final stirring period of one-half hour with the temperature being maintained at 150° C. The temperature was then raised, using a reflux condenser, to 190° C., and held at this temperature for approximately two hours. The temperature was then raised to 210° C., and held for one-half hour. During this last final period there seemed to be no styrene oxide refluxed and it was assumed that all the styrene oxide had combined. The final product was a highly viscous, amber colored resin, which was insoluble in xylene, but soluble in diethyleneglycol diethylether.

Example 362a

Suitable resins can be obtained from phenols in which the linkage is due in part to etherization. Bisphenols derived, for example, from phenol or an orthosubstituted phenol, such as orthotertiary-amylphenol or ortho-tertiarybutylphenol and a ketone, may be described by the following formula in which R is a hydrogen atom or an alkyl radical of the kind indicated:

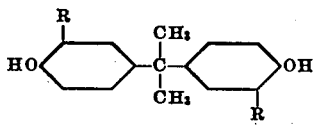

On treatment of such phenol with glycid or epichlorohydrin, with the elimination of the chlorine in the latter case, one can obtain a polyhydric alcohol of substantially the following formula:

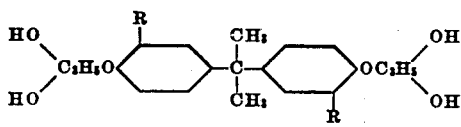

Heat polymerization, or any other suitable polymerization, of such polyhydric alcohols, if conducted so as to prevent cross-linking, produces suitable fusible resins; if such compounds are obtained by the use of epichlorohydrin then one can permit the chlorine to remain in the intermediate product and obtain a compound of the following composition:

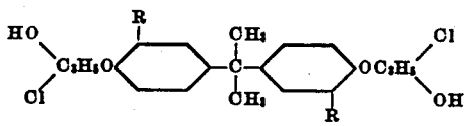

If a tetrahydric alcohol of the kind indicated by the second formula is treated with one mole of sodium or caustic soda, it is converted into the mono-alcoholate. One mole of the dichloro derivative described in the third formula can then be treated with two moles of the mono-dialcoholate under conditions which result in substantially linear combination only. A product of this type is manufactured by the Shell Chemical Company and is sold under the name of "Epon" resin. These are suitable resins.

The following examples illustrate non-phenolic resins suitable for the production of oxyalkylated products useful in the practice of the invention.

Example 363a

Previous reference has been made to the fact that suitable resins can be obtained from a sulfonamid and an aldehyde, usually formaldehyde. Suitable resins can be prepared in the manner described in literature or can be purchased in the open market. Such resins are sold by the Monsanto Chemical Co. under the trade name of Santolite. Thus, Santolite M S, a sulfonamid-aldehyde resin, is a suitable resin.

Example 364a

Another suitable type of resin is the aniline-aldehyde type, particularly those in which the aldehyde is formaldehyde. They are described in the literature and sold in the open market. An excellent resin of this type is sold under the trade name of Cibanite E by the Ciba Products Corp., Hoboken, N. J.

Example 365a

Another suitable type of resin is the diamine-dimerized fatty acid type. This type of compound was developed by the United States Department of Agriculture at Peoria, Illinois. These resins are sold under the trade name or description of "Norelac." As to a description of such resins, see Progress Report NM248A entitled "Norepol and its Derivatives." At the present time such products are available from the American Resinous Chemicals Company, of Peabody, Massachusetts, and General Mills, Incorporated of Minneapolis, Minnesota. Products furnished by the Department of Agriculture, Peoria, Illinois, and by General Mills, the latter under the name "Special Norelac" (95–27–630) have proven highly satisfactory on oxyalkylation.

Example 366a 80 parts of unsymmetrical dibutyl urea were mixed with 20 parts of urea, 100 parts of Formalin and 3 parts of 93% acetic acid. This mixture was dissolved in methyl alcohol and heated with stirring, until the temperature reached 150° C. The resin obtained was clear, viscous and semi-solid, and was soluble in aromatic hydrocarbons and alcohols.

Example 367a 150 grams of Formalin and 260 grams of butyl alcohol were placed in a flask having a stirrer and reflux condenser. 30 grams of urea were added and the mixture stirred until the urea dissolved. The mixture was then heated at 100 to 110° C. under reflux for one hour. It was then cooled, the pH adjusted to between 6.8 and 7 with aqueous sodium carbonate; and the butyl alcohol and water removed by distillation.

Example 368a

Another suitable type of resin is that having both polyester linkages and formaldehyde-amide linkages. One useful resin was prepared by heating a mixture of 82.2 grams of phthalic anhydride, 36.4 grams of glycerol, and 81.4 grams of castor oil for about 1.5 hours at 200° C. in a closed flask equipped with a stirring device and thermometer, a slow stream of carbon dioxide being passed through the reaction mixture to exclude air and to remove the water formed in the reaction. The acid number of the pale straw-colored reaction product was 44. A slow stream of ammonia gas was then passed into the mixture, the temperature being maintained at 175–180° C. At the end of two hours the acid number was 23 and after three hours it was 16. At this point excess ammonia was removed by passing nitrogen through the melt for about one-half hour. Five grams of paraformaldehyde were then added and the mixture heated at 120–130° C. for one-half hour with stirring. The cooled product was a soft clear resin, soluble in organic solvents, with an acid number of 16.

Example 369a

Another useful type of resin is the polyester type. One suitable product was obtained by heating 12 parts of pentaerythritol, 80 parts of cocoanut oil fatty acids, and 8 parts of phthalic anhydride in a kettle at 190 to 200° C. for one hour.

Example 370a 53.38 parts of stearic acid, 27.16 parts of phthalic anhydride, and 19.46 parts of glycerol were heated in an aluminum vessel and stirred by a current of carbon dioxide at a temperature of 225° C. for about 5 hours, when the acid number was about 55. The resulting waxy resin was soluble in ketones, aromatic hydrocarbons, and halogenated hydrocarbons.

Example 371a 219 parts of dodecyl alcohol, about 90% pure, 605 parts of glycerol and 220.5 parts of phthalic anhydride were heated to 200° C. for about one hour in a vessel equipped with a reflux condenser and stirrer. The temperature was then raised to 225° C. and held at this level, with stirring, for 6 hours.

Example 372a

|   | Grams |
|---|---|
| Sorbitan monostearate | 4,020 |
| Phthalic anhydride | 1,480 |
| p-Toluene sulfonic acid | 50 |
| Xylene | 2,000 |

The above reactants were heated for 8 hours in 160° to 170° C in a resin pot equipped with stirrer, reflux condenser, thermometer well, etc.; at the end of the 8 hour period the desired reaction had not taken place so the acid catalyst was increased by another 50 grams and the whole heated for an additional 12 hours. 170 grams of water were removed by the trap arrangement during the last 12 hour period. 150 grams of NaOH in 300 grams of water were then added to the reaction mixture to neutralize the sulfonic acid and give an excess of alkali to act as a catalyst of the subsequent oxyethylation. The water from NaOH solution was distilled out after which 5000 grams more xylene were added to thin the product sufficiently to permit removal of the salt by filtration.

Example 373a

Mix 296 pounds of phthalic anhydride with 92 pounds of glycerol, and heat for five to ten minutes at 125° C. to 150° C. until a thin, clear, water-white liquid resin intermediate, containing no unreacted phthalic anhydride, has been produced. This resin intermediate is then mixed with 312 pounds of castor oil and the mixture is heated to from 150° C. to 250° C. for ten to thirty minutes after which it is permitted to cool.

Example 374a

Adipic acid is substituted for phthalic anhydride in Example 373a in equivalent molar proportions.

Example 375a

Succinic acid or its anhydride is substituted for phthalic anhydride in Example 373a in equivalent molar proportions.

Example 376a

Diglycollic acid is substituted for phthalic anhydride in Example 373a in equivalent molar proportions.

Example 377a

The resin of Example 3a was subjected to vacuum distillation to remove the solvent employed during the manufacturing process. The resin, while hot, was mixed with an equal weight of ethyl alcohol under a suitable condenser arrangement. To a charge to a hydrogenation autoclave of 500 grams of the resin and 500 grams of alcohol was added approximately 50 grams of Raney nickel. The mixture was agitated during the hydrogenation process and the time of hydrogenation was five hours. The temperature of hydrogenation was approximately 183° C. and the pressure 1300 to 1500 pounds per square inch cold. The pressure during reactions of this type may vary due to vapor pressure of solvent employed, rate of hydrogen adsorption, etc., and so is somewhat difficult to predict, but invariably is moderately higher, for instance, under above conditions one may expect pressures of 1750 to 2500 pounds per square inch. The operation is complete when no more hydrogen is absorbed under these conditions. The completion of the operation was followed by separation of the catalyst by hot filtration. These operating procedures are conventional and hydrogenolysis does not take place—merely hydrogenation. The hydrogenated resin had much the same appearance as the product prior to hydrogenation.

Hydrogenation frequently shows a tendency to yield a lighter colored and more brittle product and in some instances yields a product which is almost water-white and extremely brittle. After hydrogenation, the alcohol must be removed before subjecting the resin to oxyalkylation, for the reason that the alcohol is reactive. Our preference is to remove the alcohol by vacuum distillation and then add a suitable solvent to the hot resin, for instance, xylene or other inert solvent. Hydrogenation does not particularly change the viscosity of products which are thick, resinous or somewhat rubbery oils, instead of having a hard, resinous character.

Example 378a

The same procedure is followed as in Example 377a except that the resin employed is that of Example 1a.

Example 379a

The same procedure is followed as in Example 377a, except that the resin employed is that of Example 8a.

Example 380a

The same procedure is followed as in Example 377a, except that the resin employed is that of Example 69a.

Example 381a

The same procedure is followed as in Example 377a, except that the resin employed is that of Example 70a.

In a number of the foregoing examples, phenols have been identified simply as "nonyl phenol," or "octadecyl phenol," or the like, without specific designation of the position of substitution or the structure of the substituent radical. In such cases, the phenols meant are either the commercial products distributed under these names, or, if the products are not commercially available, the products obtained by customary syntheses from phenol, meta-cresol or 3,5-xylenol, and consist mainly of the para-substituted product, usually associated with some of the ortho-substituted product, perhaps a very small proportion of meta-substituted material, some impurities, etc. Also, it is to be understood that all of the products of the foregoing examples, unless it is otherwise stated in the example, are soluble in xylene, at least to an extent sufficient to permit the use of xylene as the solvent in oxyalkylation.

The resins herein described, and illustrated by the foregoing examples, as materials from which to produce oxyalkylated products for use in the practice of the invention, are all water-insoluble, solvent-soluble, fusible resins having reactive or labile hydrogen atoms capable of reaction with alkylene oxides to give oxyalkylated products having hydrophile properties. A wide variety of resins has been illustrated and it is to be understood that each of the resins of the foregoing examples, on oxyalkylation, gives products useful for demulsification, providing the oxyalkylation be carried to an extent such that there is introduced at least two oxyalkylene groups for each structural unit and that the extent of oxyalkylation is such as to introduce hydrophile property sufficient so that the product has emulsifying properties or is self-dispersible, that is, is sub-surface-active or surface-active. We have found that as a general rule, the resin should have a reactive hydrogen content at least equal to a minimum hydroxyl value of 20 to 30 and advantageously much in excess of this, for example, from 60 to 120 up to 300 to 400 or more. With resins in which the only reactive hydrogen atoms are those of phenolic hydroxyl groups, capacity to react with alkylene oxides can be directly expressed in terms of hydroxyl value. Where the resin is reactive with the alkylene oxide by virtue of hydrogen atoms other than those of phenolic hydroxyl groups, as, for example, where the reactive hydrogen is amino or amido hydrogen, or carboxy hydrogen, or the hydrogen of alcoholiform hydroxyls, the capacity of the resin to react with alkylene oxides can readily be expressed in terms of hydroxyl value, or if desired, the resin may be reacted with a single molar equivalent of the alkylene oxide, and the reactivity then be determined on the basis of hydroxyl value. In any event, we have found that the resin should have a hydroxyl value or equivalent reactivity with alkylene oxide, not lower than that specified above.

Having obtained a suitable resin of the kind described, such resin is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. The olefin oxides employed are characterized by the fact that they contain not over 4 carbon atoms and are selected from the class consisting of ethylene oxide, propylene oxide, butylene oxide, glycide, and methyl-glycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3, and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive hydrogen atoms.

It may be necessary to allow for the acidity of a resin in determining the amount of alkaline catalyst to be added in oxyalkylation. For instance, if a non-volatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per structural unit. Such minimum hydrophile property or subsurface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per structural unit or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable) such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principles involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersability are useful. The fact that a reagent is capable of producing a dispersion in water is proof that it is distinctly hydrophile. In doubtful cases, comparison can be made with the butylphenol-formaldehyde resin wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersability or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per structural unit, for producing products useful for the practice of this invention. Another variation is the molecular size of the resin chain. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

One procedure which can be employed in the use of a new resin to prepare products for use in the process of the invention is to determine the hydroxyl value or its equivalent, i. e., the number of reactive hydrogen atoms or positions per molecule. The resin as such, or in the form of a solution as described, is then treated with ethylene oxide in presence of 0.5% to 2% of sodium methylate as a catalyst in step-wise fashion. The conditions of reaction, as far as time or per cent are concerned, are within the range previously indicated. With suitable agitation the ethylene oxide, if added in molecular proportion, combines within a comparatively short time, for instance a few minutes to 2 to 6 hours, but in some instance requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin to as much as five or six times the weight of the original resin. In the case of a resin derived from paratertiary butylphenol, as little as 50% by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the stepwise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

Many suitable resins are comparatively soft or pitch-like at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active and subsurface-active range without testing them for demulsification. A few simple laboratory tests which can be conducted in a routine manner will usually give all the information that is required.

For instance, a simple rule to follow is to prepare an organic solvent-soluble resin. Oxyethylate such resin, using the following four ratios of moles of ethylene oxide per structural unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per structural unit will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 5% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plan autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of structural units; (b) the nature of the resin; and (c) the nature of the linkages of the reactive hydrogens. With such information one is in substantially the same position as if one had personally made the resin prior to oxyethylation.

For instance, the molecular weight of the internal structural units of the phenol-aldehyde resin of the following over-simplified formula:

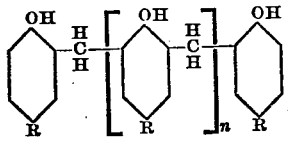

(n=1 to 13, or even more)

is given approximately by the formula: (Mol. weight of phenol −2) plus mol. weight of methylene or substituted methylene radical. The molecular weight of the resin would be n times the value for the internal unit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking (n plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enchanced hydrophile character.

Although we have prepared and tested a large number of oxyethylated products of the type described herein, we have found no instance where the use of less than 2 moles of ethylene oxide per structural unit gave desirable products.

The following Examples 1b through 98b are included to exemplify the production of suitable oxyalkylation products from resins, specifically, resins described in a number of the foregoing Examples 1a–381a, giving exact and complete details for the carrying out of the procedure. In the table which appears further on in the specification are given data with respect to the oxyethylation of a number of the resins previously described, it being understood that in preparing the products referred to in the table the manipulative steps used are those of Examples 1b–98b.

*Example 1b*

The resin employed is the acid-catalyzed paratertiary butylphenolformaldehyde resin of Example 1a. (Such resin can be purchased in the open market.) The resin is powdered and mixed with an equal weight of xylene so as to obtain solution by means of a stirring device employing a reflux condenser. 170 grams of the resin are dissolved in or mixed with 170 grams of xylene. To the mixture there is added 1.7 grams of sodium methylate powder. The solution or suspension is placed in an autoclave and approximately 400 grams of ethylene oxide by weight are added in 6 portions of approximately 65 to 75 grams each. After each portion is added, the reaction is permitted to take place for approximately 4 hours. The temperature employed is approximately 150° to 165° C. and a maximum gauge pressure of approximately 150 pounds per square inch. The minimum gauge pressure is approximately 20 pounds per square inch. At the end of each 4-hour period there is no further drop in pressure, thus indicating that all the ethylene oxide present has reacted and the pressure registered on the gauge represents the vapor pressure of xylene at the indicated temperature. After the sixth and final portion of ethylene oxide has been added, a test is made on the resultant.

In one such operation, the resultant, when cold, was a viscous opaque liquid, emulsifiable in water even in presence of the added xylene. This indicated that incipient emulsification in absence of xylene probably appeared at the completion of the fourth addition of ethylene oxide. In other words, 150 grams or 175 grams of ethylene oxide are sufficient to give incipient hydrophile properties in absence of xylene. The initial point approximates ethylene oxide equal to slightly less than 100% of the weight of the initial resin. In this instance in order to obtain greater solubility, the amount of ethylene oxide used for reaction was increased by a second series of additions using substantially the same conditions of reaction as noted previously. Such series was continued until, as an upper limit, 500 grams of ethylene oxide had been introduced on the basis of the original 170 grams of resin. See the attached table for data as to the compound in which the ratio of ethylene oxide to resin is about 2:1. A compound of this constitution, containing a small amount of xylene, was light amber in color, miscible with water and had a viscosity resembling that of castor oil.

*Example 2b*

The same reactants, and procedure were employed as in Example 1b preceding, except that propylene oxide was employed instead of ethylene oxide. The resultant, even on the addition of the alkylene oxide in the weight proportions of the previous example, has diminished hydrophile properties in comparison with the resultants of Example 1b. This illustrates the point that propylene oxide and butylene oxide give products of lower levels of hydrophile properties than does ethylene oxide.

Example 3b

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide for the reason that disastrous results may be obtained even in experimentation with laboratory quantities.

Example 4b

The same procedure is followed as in Example 1b except that instead of employing the resin employed in Example 1b, there was substituted instead an equal weight of resin of Example 2a. The products obtained were similar in appearance, color and viscosity to those of Example 1b.

Example 5b

The same reactants and procedure are employed as in Example 1b, except that the acid catalyzed amylphenol formaldehyde resin of Example 3a is used. (Such resin can be purchased in the open market.) Suitable amylphenol resins include those of Examples 4a, 5a and 6a. The oxyethylated products in color, appearance, viscosity, etc., are like the products of Example 1b.

Example 6b

The same reactants and procedure are employed as in Example 1b, except that the acid-catalyzed octylphenol-formaldehyde resin of Example 8a is used instead of the butylphenol resin. As far as we are aware such resins are not offered for sale in the open market but may be. The products obtained are very desirable, and in color, appearance, viscosity, etc., resemble the products of Example 1b.

Example 7b

The same reactants and procedure are employed as in Example 1b, except that the acid-catalyzed hydroxydiphenyl (phenylphenol) resin of Example 9a is used in place of the butylphenol resin. (Such resin can be purchased in the open market.) The appearance of the oxyethylated products is similar to that of the products of Example 1b except that the color is distinctly darker. The solubility of the products is less than that of the products of Example 1b and the products do not seem to give quite as good dispersions or solutions.

Example 8b

The same reactants and procedure are employed as in Example 1b, except that the acid-catalyzed cyclohexylphenol resin of Example 10a is substituted for the butylphenol resin. Methylcyclohexylphenol resin, used instead of the butylphenol resin, also gives excellent products. One can manufacture a methylcyclohexylphenol resin following the procedure of Example 10a. The oxyethylated products of this example are similar in appearance and solubility to the products of Example 1b, but are somewhat more viscous.

Example 9b

The same reactants and procedure were employed as in Example 1b, except that the acid-catalyzed styrylphenol-formaldehyde resin of Example 1a was used instead of the butylphenol resin. The oxyethylated products are similar in appearance, color, solubility, etc., to the products of Example 1b.

Example 10b

The same reactants and procedure are employed as in Example 1b, except that the acid catalyzed para-dodecylphenol resin of Example 74a is used, in the form of the xylene solution produced following the directions of that example, this solution containing about 55% resin and 45% xylene, and the amount of sodium methylate used is increased to about 3.5 parts. The product resulting from the sixth addition of ethylene oxide (400 parts ethylene oxide to 170 parts of resin) was a viscous, opaque suspension emulsifiable in water even in the presence of the xylene, indicating hydrophile properties were imparted to the resin on the addition of about 150 to 175 parts by weight of ethylene oxide. To obtain greater solubility, the amount of ethylene oxide used was increased by a second series of additions under substantially the same conditions to give products having about 1000 parts by weight of ethylene oxide added to the original 170 parts by weight of resin.

Example 11b

The same procedure was followed as in Example 10b except that propylene oxide is employed instead of ethylene oxide. The resultant product even though containing added alkylene oxide in the weight proportions indicated in Example 10b, has diminished hydrophile property as compared with the product of Example 10b.

Example 12b

The same procedure is followed as in Example 10b, except that one mole of glycide was employed per hydroxyl radical of resin. The addition of the glycide was carried out with extreme care, the glycide being added in small amounts representing fractions of a mole. Ethylene oxide was then added, following the procedure of Example 1b, to produce products of increased hydrophile properties. We again repeat the warning previously made as to the use of glycide and methyl glycide.

Example 13b

The same procedure was followed as in Example 1b, except that the resin solution of Example 70a (from nonyl phenol), containing about 70% of resin was used in amount corresponding to 145 parts of resin on a solvent free basis; and the amount of sodium methylate used was 3 grams. The products obtained were similar in color, appearance and viscosity to the products of Example 10b.

Example 14b

The same procedure was followed as in Example 1b, except the resin was the octa-decyl-phenol resin of Example 71a in the form of the resin solution obtained following the directions of that example containing about 65% by weight of resin, the amount used being equivalent to 225 grams of resin on a solvent free basis; and the amount of sodium methylate used was 7½ grams. The products in color, viscosity and appearance are similar to the products of Example 10b.

*Example 15b*

The same procedure was followed as in Example 1b except the resin employed was the paracumyl-phenol resin of Example 72a, the resin being used in the form of the solution as prepared containing 55% resin and 45% solvent in amount equivalent to 170 grams of resin; and the amount of sodium methylate used being 8 grams. The oxyalkylated products were like the products of Example 10b in color, viscosity and appearance.

*Example 16b*

The resin employed was that of Example 162a. It was an acid-catalyst resin, obtained from a mixture of menthylphenol and para-tertiary butyl phenol. A xylene solution of the resin, containing 313 grams of resin and 156 grams of xylene, was mixed with 6 grams of sodium methylate and subjected to oxyalkylation by treatment with 450 grams of ethylene oxide in 9 portions of 50 grams each. The method employed was the same as described under Example 1b, preceding. The following table gives the data in regard to the oxyethylation:

| Batch | EtO Added | Time Required | Max. Temp. | Max. Pressure | Remarks as to solubility and appearance |
|---|---|---|---|---|---|
| | Grams | Hours | °C. | #/sq. in. g. p. | |
| 1 | 50 | 7 | 150 | 115 | Water-insoluble. Liquid of medium viscosity. |
| 2 | 50 | 3½ | 155 | 122 | Water-insoluble. Stringy. Curds out when shaken. |
| 3 | 50 | 3½ | 155 | 130 | Water-insoluble. Somewhat viscous. |
| 4 | 50 | 5 | 150 | 116 | Water-insoluble. Amber colored liquid. |
| 5 | 50 | 2 | 150 | 122 | Water-insoluble. |
| 6 | 50 | 6½ | 155 | 128 | Almost water-soluble. |
| 7 | 50 | 7 | 150 | 139 | Do. |
| 8 | 50 | 3 | 150 | 130 | Only slightly more soluble than before. |
| 9 | 50 | 6 | 147 | 126 | Almost water-soluble. |

*Example 17b*

The resin used was the cardanol-formaldehyde resin of Example 258a. 8200 grams of the resin solution, containing 49% solvent (xylene) was oxyalkylated, after the addition of 106 grams of sodium methylate with a total of 5850 grams of ethylene oxide added in six batches, the first five being 900 and the last 1350 grams, the procedure followed being the same as that of Example 1b. The first addition was carried out at 113° C. and 80 pounds in one-quarter hour; the second at 115° C. and 65 pounds in one-quarter hour; the third at 150° C. and 70 pounds in one-quarter hour; the fourth at 115° C. and 50 pounds in one-quarter hour; the fifth at 117° C. and 250 pounds in one-quarter hour; and the sixth at 155° C. and 50 pounds in one-half hour. At the end of the third addition, the product was emulsifiable, at the end of the fourth, it was becoming soluble, at the end of the fifth it was almost soluble, and at the end of the sixth was soluble.

*Example 18b*

The resin used was the cardanol acetaldehyde resin of Example 260a. 400 grams of resin solution containing 50% solvent (xylene) after the addition of 5 grams of sodium methylate were oxyethylated with 700 grams of ethylene oxide in six batches, the first five batches containing 100 grams of ethylene oxide and the sixth batch 200 grams of ethylene oxide. The first addition was carried out at 158° C. and 165 pounds, the second at 166° C. and 135 pounds, the third at 166° C. and 160 pounds, the fourth at 168° C. and 165 pounds, the fifth at 166° C. and 100 pounds, and the sixth at 166° C. and 125 pounds, the time required being 33 hours for the first addition, 22 hours for each of the second, third, and fourth additions, 18 hours for the fifth, and 12 hours for the sixth. The product was emulsifiable at the end of the first addition, at the end of the fourth addition was almost soluble and at the end of the sixth addition was soluble.

*Example 19b*

The resin used was the cardanol cresol resin of Example 282a. 310 parts of the resin solution containing 35% solvent, after the addition of five parts of sodium methylate were oxyethylated with 400 parts of ethylene oxide in four batches of 100 grams each. The first addition was at 160° C. and 140 pounds in 10 hours, the second at 160° C. and 185 pounds in 6 hours, the third at 162° C. and 100 pounds in 3 hours, and the fourth at 166° C. and 162 pounds in 2 hours. At the end of the first addition, the product was insoluble but it was emulsifiable at the end of the second addition, and soluble at the end of the fourth addition.

*Example 20b*

The acid catalyzed resin derived from para-hydroxy menthylbenzoate in the manner of Example 195a was oxyethylated. 100 grams of this resin were dissolved in a mixture of 50 grams of xylene and 50 grams of diethyleneglycol diethylether. To this mixture was added three grams of sodium methylate. The mixture was placed in an autoclave and treated with seven successive batches of ethylene oxide. The following table tabulates the data in connection with such treatment:

| Batch | EtO Added | Time Required | Max. Temp. | Max. Pressure | Remarks as to solubility and appearance |
|---|---|---|---|---|---|
| | Grams | Hours | °C. | #/sq. in. g. p. | |
| 1 | 50 | 4 | 162 | 88 | A viscous opaque liquid; some tendency to emulsify. |
| 2 | 50 | 3 | 150 | 132 | Same as before; more tendency to emulsify. |
| 3 | 50 | 3 | 150 | 130 | Viscosity of liquid reduced; tends to produce a milky emulsion. |
| 4 | 50 | 3½ | 158 | 135 | Some tendency to stratify but when mixed together was definitely water emulsifiable. |
| 5 | 50 | 5 | 157 | 130 | Non-viscous amber oil clearly homogeneous; gives a milky emulsion. |
| 6 | 50 | 5 | 160 | 135 | Light colored amber oil; produces an emulsion of reduced milkiness. |
| 7 | 50 | 5½ | 145 | 135 | Light colored amber oil with even less milkiness and reasonably satisfactory solution. |

Example 21b

The same procedure was followed as in Example 20b except that the resin employed was that of Example 189a.

Example 22b

The same procedure was followed as in Example 20b except that the resin employed was that of Example 190a.

Example 23b

The same procedure was followed as in Example 20b except that the resin employed was that of Example 191a.

Example 24b

The resin used was the para-cresol resin of Example 118a. 400 grams of resin solution, containing 200 parts of resin, with the addition of 2 grams of sodium methylate were used. 900 grams of ethylene oxide were added in 9 portions of 100 grams each. The temperature used was 160° C. and the pressure 145 pounds for each portion. The time required varied from 2 to 5 hours with the different portions. The product became emulsifiable at the end of the fifth addition and almost completely water soluble after the seventh addition and there was no further change in solubility on the two subsequent additions.

Example 25b

The resin used was the tetracosanyl phenol of Example 130a. 310 grams of resin solution containing 45% xylene were used with the addition of 3.5 grams of sodium methylate. The procedure followed was that of Example 1b. The data in tabular form are as follows:

| Batch No. | EtO Added | Time Required | Max. Temp. | Max. Pressure | Remarks as to solubility and appearance |
|---|---|---|---|---|---|
| | Grams | Hours | °C. | #/sq. in. | |
| 1 | 60 | 4 | 155 | 150 | Insoluble. |
| 2 | 70 | 4 | 163 | 155 | Do. |
| 3 | 55 | 4 | 155 | 150 | Emulsifiable. |
| 4 | 75 | 4 | 165 | 155 | Do. |
| 5 | 65 | 4 | 158 | 155 | Do. |
| 6 | 75 | 4 | 155 | 150 | Do. |

Example 26b 1000 grams of the Cook Paint and Varnish Co., resin R3339 were mixed with 1000 grams of xylene and 20 grams sodium methylate. The mixture was placed in the usual autoclave with stirrer, means for heating, outlets, draw-off outlets, etc. 1000 grams of ethylene oxide were introduced with constant stirring. The time required was 6½ hours. The temperature was 126° C. The pressure was 130 pounds per square inch gauge pressure. The resultant solution was a non-viscous liquid which gave a milky emulsion when shaken with water, the oxyethylated resin having at least emulsifying properties. A second batch of 1000 grams of ethylene oxide was added. The time required to add the ethylene oxide in the second batch was only slightly longer than in the first batch, that is, 6¾ hours. The temperature employed was 104° C. The pressure was 125 pounds per square inch gauge pressure. The appearance of the product was substantially the same as before. However, instead of giving a milky solution, the product mixed with water gave a cloudy solution, showing greater solubility. A third batch of 1000 grams of ethylene oxide was used. The time of reaction was 8 hours, the temperature employed 150° C., and the pressure 140 pounds gauge pressure. The final product was a non-viscous, amber colored oil, which, when mixed with water, gave a clear solution, notwithstanding the fact that there was present a substantial amount of xylene in the neighborhood of 20% or more.

Example 27b

The resin in Example 225a was employed as the reactant. It was mixed with an equal weight of xylene, i. e., 100 pounds of resin and 100 pounds of xylene. The two components were placed in an autoclave equipped with a reflux condenser and stirrer. The mixture was heated and the xylene was allowed to reflux until complete solution was obtained. Two pounds of sodium methylate were then added and the mixture refluxed and stirred until uniform. The reflux condenser was then closed and the apparatus used as an autoclave. Ethylene oxide was added slowly in a continuous stream with continual stirring. During oxyethylation, the reaction mass was kept at a temperature between 150–175° C. The pressure during the oxyethylation varied from approximately 50 pounds to 150 pounds, but at the completion of reaction, was equivalent to vapor pressure of xylene only. We added 100 pounds in one case to 200 pounds in another of ethylene oxide to the 100 pounds of resin, at a minimum rate of 10 pounds per hour up to 25 pounds per hour. In other words, if 100 pounds of ethylene oxide were added, the addition takes place in 4 to 10 hours, and if 200 pounds are added, it required 8 to 20 hours. (The addition of ethylene oxide varies somewhat with the speed of the stirrer, and we ordinarily prefer to agitate at approximately 300 revolutions per minute. The only precaution necessary, in addition to usual precautions, is that the oxyethylation be conducted so that the ethylene oxide is reacted approximately as rapidly as it enters the autoclave. In other words, if the ethylene oxide is added in a slow stream, and if there is any sudden increase in pressure, fresh addition should be temporarily stopped, if such rise in pressure indicates the presence of unreacted ethylene oxide.) The final products so obtained, including xylene, were viscous liquids, having excellent emulsifying properties when 100 pounds of ethylene oxide were added to 100 pounds of resin, and being very soluble when 200 pounds of ethylene oxide were added.

Example 28b

The same procedure was employed as in Example 27b, except that the amount of ethylene oxide added was larger, i. e., 300 pounds of ethylene oxide were employed per 100 pounds of resin. The amount of catalyst used initially was increased slightly, 2½ pounds of alkaline catalyst being employed instead of 2 pounds.

Example 29b

The same procedure was followed as in Example 27b except that the amount of ethylene oxide employed was increased to 400 pounds per 100 pounds of resin. The amount of alkaline catalyst added initially was increased to 3 pounds.

Example 30b

The same procedure was employed as in Example 26b, except that propylene oxide was employed instead of ethylene oxide. The resultant on the addition of the alkylene oxide in the proportion of weight indicated in that example, at each level showed diminished hydrophile property in comparison with the ethylene oxide product.

Example 31b

The same procedure was followed as in Example 26b, except that one mole of glycide was employed initially per hydroxyl radical. This particular reaction was conducted with extreme care and the glycide was added in small amounts representing fractions of a mole. Thus, the addition of four or five portions were required to introduce one mole of glycide per mole of the hydroxyl radical. Similar treatment of the resin of Example 226a, that is, initial treatment with one mole of glycide per hydroxyl followed by treatment with ethylene oxide, also gave useful products. We repeat the warning against the use of glycide and methylglycide.

Example 32b

The resin obtained of Example 216a was mixed with an equal weight of xylene. Such resin was then oxyethylated following the exact procedure described under the heading of Example 27b.

Example 33b

The same procedure was followed as in Example 27b except that the resin employed was that of Example 217a.

Example 34b

The resin of Example 246a and the procedure is the same as in Example 27b. The final product so obtained, including xylene, is a viscous liquid having excellent emulsifying properties when 100 pounds of ethylene oxide were added to 100 pounds of resin, and being very soluble when 200 pounds of ethylene oxide were added per 100 pounds of resin.

Example 35b

The same procedure is employed as in Example 34b preceding, except that the amount of ethylene oxide added is larger, 300 pounds of ethylene oxide being employed per 100 pounds of resin. The amount of catalyst used initially was increased to 2½ pounds.

Example 36b

The same procedure is followed as in Example 34b, except that the amount of ethylene oxide employed is increased to 400 pounds per 100 pounds of resin. The amount of alkaline catalyst added initially is increased to 3 pounds.

Example 37b

The same procedure is followed as in Examples 34b to 36b, except that propylene oxide is employed instead of ethylene oxide. The resultants, on the addition of the alkylene oxide in the proportion of weight indicated in these examples, show diminished hydrophile property in comparison with the ethylene oxide products.

Example 38b

The same procedure is followed as in Examples 34b to 36b, except that one mole of glycide is employed initially per hydroxyl radical. This particular reaction is conducted with extreme care and the glycide is added in small amounts representing fractions of a mole. Thus, the additions of four or five portions are required to introduce one mole of glycide per mole of hydroxyl radical equivalent.

Example 39b

"Pale hard" grade Nevillac resin, a commercial phenol-modified coumarone-indene resin sold by the Neville Company, Pittsburgh, Pennsylvania, 280 grams, was mixed with 200 grams xylene and 1 gram of sodium methylate. The mixture was then treated with 209.5 grams of ethylene oxide, added in three portions of 50.5, 53.4 and 95.6 grams, respectively. A further addition of 0.5 gram sodium methylate was made before the third addition of ethylene oxide. The time of heating was 4.5 hours for the first portion, 12 hours for the second, and 16 hours for the third. The temperature was 150° C., and the pressure maxima during the three additions were 95, 125, and 135 pounds per square inch, respectively. The material became water-miscible, producing a cloudy dispersion in water. A fourth portion of ethylene oxide, 97.0 grams, was introduced into the mass, with heating 2 hours at 150° C., and 160 pounds per square inch pressure, and 2 hours at 160° C. and 175 pounds per square inch pressure. The pressure developed could not be reduced by continued heating for 24 hours. Therefore, the unreacted ethylene oxide was blown off and the reaction mass removed from the autoclave. It was water-miscible as before, producing an emulsion with water.

Example 40b

Nevillac resin "1°" grade, sold by the Neville Company, Pittsburgh, Pennsylvania, a phenol-modified coumarone-indene resin 500 grams, was mixed with 1 gram sodium methylate. Ethylene oxide, 284 grams, was introduced into the resin-catalyst mixture in five substantially equal portions. The time of heating was 3 hours for the first portion, and from 6 to 7 hours for each subsequent portion of ethylene oxide. Maximum temperature was 160° C. Maximum pressure developed was 127 pounds per square inch. The material at that point was water-miscible, producing a cloudy dispersion. After addition of a further portion of ethylene oxide, 60.2 grams the volume of material was too large for the autoclave. Therefore, it was withdrawn (772.6 grams) and divided into two parts. Half (386.5 grams) was returned to the autoclave and treated further with 111.6 grams of ethylene oxide, added in two portions of 51.6 and 60.0 grams, respectively. The time of heating was 9 hours, and the temperature was 150° C. Maximum pressure was 130 pounds per square inch. The material was tested for water-solubility and was found still insoluble. It was treated further with 182.5 grams of ethylene oxide in three portions of 57.1, 59.1 and 66.3 grams, respectively. The time of heating was from 9 to 12 hours for each portion. Maximum temperature was 155° C. and maximum pressure was 125 pounds. Water-solubility was not yet achieved. Further addition of ethylene oxide was therefore made, portions of 61.5 and 63.8 grams being added. Time of heating was 12 hours for each portion, maximum temperature being 155° C., and maximum pressure being 126 pounds per square inch. The material at this point gave a clear solution in water. The weight ration of resin to ethylene oxide was about 1 to 1.9.

Example 41b

Nevillac "RA" grade resin, a phenol-modified coumarone-indene resin sold by the Neville Company, Pittsburgh, Pennsylvania, 248 grams, was mixed with 186 grams of xylene and one gram of sodium methylate, and 57.4 grams of ethylene oxide were added. Time of heating was 8 hours. Maximum temperature was 155° C., and maximum pressure 118 pounds. The product was somewhat water-emulsifiable. An additional 100 grams of ethylene oxide were added in two portions of about 50 grams each, after an additional 1 gram of sodium methylate was added. Absorption was slow. After 12 hours of heating, with maximum pressure of 128 pounds per square inch, and temperature 155° C., the material was still not clearly soluble. An additional 55 grams of ethylene oxide were added but there was no drop in pressure from 130 pounds per square inch after 8 hours of heating at 140°–150° C. The excess ethylene oxide was blown off and the reaction mass found to produce a cloudy solution.

*Example 42b*

To 469 pounds of the final resin-xylene solution of Example 334a was added 3 pounds of sodium methylate. This charge was placed in an autoclave and reacted with 100 pounds of ethylene oxide at approximately 136° C. and at a pressure of 135 pounds. The reaction was completed in approximately two hours. Further oxyethylation was conducted by adding six additional charges of 100 pounds each of ethylene oxide. The final product gave a clear solution in water with the ratio of ethylene oxide to resin approximately two to one. The weight of the final product was approximately 1114 pounds, containing about 12.7% xylene.

The following table illustrates products from resins of various examples and the conditions of their preparation.

of Diethyl Carbitol (diethyleneglycol diethylether) and three pounds of sodium methylate. This charge is placed in an autoclave and stirred until homogeneous, warming to approximately 100° C. and reacted with 100 pounds of ethylene oxide at approximately 130° C., and a pressure of approximately 115 pounds. The reaction was complete in approximately an hour and a half. Further oxyethylation was conducted by adding four additional charges of 100 pounds each of ethylene oxide. The final product gave a milky emulsion in water which was almost clear when diluted. The ratio of ethylene oxide added was approximately 3½ to 1. The weight of the final product was approximately 712 pounds. The final product represented slightly less than 40% oxyethylated resin containing 15.75 per cent of xylene and 6.3% of Diethyl Carbitol.

The following table illustrates products from resins of various examples and the conditions of their preparation.

|  | Weight of C₂H₄O to give incipient emulsification | Weight of C₂H₄O to give fair or good emulsification | Weight of C₂H₄O to give complete solubility | Appearance of final product | Max. Temp. and pressure and time to reach final stage | Solvent |
|---|---|---|---|---|---|---|
| Resin, Ex. 336a | 1.6 parts EtO for 1 part resin. | 2.45 parts EtO for 1 part resin. | Stopped at 3.52 parts EtO to 1 part resin. | Non-viscous amber colored oil-containing 22.1% solvents. | 145° C., 190 p.s.i., 6 hrs. | for 123 parts resin 112 parts xylene and 45 parts Diethyl Carbitol solvent. |
| Resin, Ex. 337a | 0.7 part EtO for 1 part resin. | 1.36 parts EtO for 1 part resin. | 1.81 parts EtO for 1 part resin. | Viscous deep amber colored oil-contg. 15% xylene. | 148° C., 150 p.s.i., 9 hrs. | for 147.3 parts resin 76 parts xylene. |
| Resin, Ex. 338a | 0.57 part EtO for 1 part resin. | 2.28 parts EtO for 1 part resin. | Stopped at 3.91 parts EtO for 1 part resin. | Non-viscous water emulsifiable oil-contg. 18% xylene. | 155° C., 145 p.s.i., 10 to 15 hrs. per portion. | for 87.7 parts of resin 95 parts xylene. |
| Resin, Ex. 339a | 0.78 part EtO for 1 part resin. | 1.54 parts EtO for 1 part resin. | 2.39 parts EtO for 1 part resin. | Non-viscous oily liquid contg. 14% xylene. | 146° C., 140 p.s.i., 13 to 17 hrs. | for 129.8 parts resin 732 parts xylene. |

*Example 43b*

123 pounds of the resin of Example 336a were mixed with 112 pounds of xylene and 45 pounds

*Example 44b*

The resin described in Example 340a oxyethylated in the following manner:

A solution of the resin was prepared as follows:

| | Grams |
|---|---|
| Resin | 921 |
| Xylene | 585 |
| Diethylene glycol diethylether | 425 |

To this solution there was added 20 grams sodium methylate. The solution was placed in the autoclave and a total of approximately 3000 grams of ethylene oxide were added in six batches of 500 grams each. The first addition was completed in 14 hours using a maximum temperature of 160° C. and a gauge pressure of 135 pounds per square inch. In the second batch, the same operating conditions were employed but

|  | Weight of C₂H₄O to give incipient emulsification | Weight of C₂H₄O to give fair or good emulsification | Weight of C₂H₄O to give complete solubility | Appearance of final product | Max. Temp. and pressure and time to reach final stage | Per cent xylene in 1st product |
|---|---|---|---|---|---|---|
| Resin, Example 327a | 0.6 part EtO to 1 part resin. | 1.5 parts EtO to 1 part resin. | 1.9 parts EtO to 1 part resin. | Non-viscous amber colored liquid. | 8 hrs., 160° C., 150 p.s.i. | 16.9 |
| Resin, Example 329a | 0.55 part EtO to 1 part resin. | 1.1 parts EtO to 1 part resin. | 2.2 parts EtO to 1 part resin. | Non-viscous amber colored oil. | 4 hrs., 160° C., 125 p.s.i. | 10.9 |
| Resin, Example 330a | 0.68 part EtO to 1 part resin. | 1.38 parts EtO to 1 part resin. | 1.9 parts EtO to 1 part resin. | Non-viscous deep amber colored oil. | 6 hrs., 155° C., 148 p.s.i. | 22.8 |
| Resin, Example 331a | 1.0 part EtO to 1.0 part resin. | 1.2 parts EtO to 1 part resin. | 1.48 parts EtO to 1 part resin. | Non-viscous oil. | 13½ hrs. to 6 hrs., 152° C., 150 p.s.i. | 7.2 |
| Resin, Example 334a | 0.61 part EtO to 1.0 part resin. | 1.15 parts EtO to 1.0 part resin. | 1.96 parts EtO to 1.0 part resin. | Deep amber colored liquid. | 160° C., 135 p.s.i., 5 hrs. | 12.7 |
| Resin, Example 335a | 0.87 part EtO to 1.0 part resin. | 1.20 parts EtO to 1 part resin. | 1.74 parts EtO to 1 part resin. | Non-viscous oil. | 12 hrs., 146° C., 175 p.s.i. | 22.8 | the ethylene oxide was completely absorbed in 5½ hours. The third batch was added in approximately 6 hours at a temperature of 155° C. and a pressure of 121 pounds. In the fourth batch the time required was 6 hours, the temperature 153° C. and the pressure 119 pounds. The fifth batch was added in 6½ hours at a temperature of 150° and a pressure of 125 pounds. The last batch required 10 hours for addition, at a temperature of 158° C., and a pressure of 145 pounds. During the oxyethylation, constant stirring was employed. The final product was a viscous liquid of an amber color and dissolved or mixed with water to give a somewhat opaque solution showing a very small amount of a precipitate. The product contained approximately 9.36% of diethylene glycol diethylether and approximately 12.9% of xylene.

*Example 45b*

The procedure is the same as in Example 44b, except that the resin employed was that of Example 341a.

*Example 46b*

The same procedure was employed as in Example 44b, except that the resin employed was that of Example 342a. The final product, however, differed in the following respects: The color was somewhat darker, the product was definitely thinner, and gave a substantially clear solution in water showing just slight turbidity without any precipitate.

*Example 47b*

The same procedure was employed as in Example 44b, except that the resin employed was that of Example 343a.

*Example 48b*

To the molten resinous mass of Example 305a, at a temperature of about 150–170° C., ethylene oxide was added until about 50 parts had been absorbed. The fused mass was then poured on a metal sheet, forming a bright, hard and odorless resinous mass.

*Example 49b*

120 parts of a resinous condensation product of technical xylenol and formaldehyde were reacted in an autoclave with 44 parts of ethylene oxide, with stirring, at a temperature of 120–130° C. until the gauge pressure dropped to zero. The resulting product was freed from volatile materials by heating under reduced pressure at 140–150° C.

*Example 50b*

Two parts of 40° C. Bé. caustic soda solution were added to 200 parts of a melt of a Novolak from cresol and formaldehyde and ethylene oxide introduced at 140° C. to 200° C. until about 40 parts of ethylene oxide had been absorbed. Upon cooling a resin-like, slightly colored mass was obtained.

*Example 51b*

200 parts of a resol obtained from phenol and formaldehyde with the use of an alkali catalyst were mixed with 100 parts of ethylene oxide and the mixture heated with refluxing, until the ethylene oxide was absorbed. The product had properties similar to those of the product of Example 48b.

*Example 52b*

58 parts of propylene oxide were added to 112 parts of a resinous condensation product of phenol and acetaldehyde in a molten state in an autoclave. The mixture was maintained at about 100–110° C. with stirring, until the gauge pressure dropped to zero.

*Example 54b*

177 grams of the hard, brittle resin of Example 306a were ground to a powder and mixed with 4 grams of sodium methylate. The dry mixture was placed in an autoclave and 100 grams of ethylene oxide added without any added solvent. Heat was turned on and the temperature was raised to 150° for one hour. No attempt was made to stir the autoclave until the maximum temperature had been reached. At this time the pressure was approximately 95 pounds. At the end of the hour's heating, with stirring, at 150° C., the autoclave was cooled off and a second 100 grams of ethylene oxide added. During the second treatment a pressure of 190 pounds was reached and the temperature maintained was the same, 150° C., and the time of reaction was 2 hours. The autoclave was again cooled and a third batch of 100 grams of ethylene oxide was added. A temperature of 160° C. was employed, with a pressure of 80 pounds. The time required was 3 hours. A fourth batch of ethylene oxide was added, after cooling. A temperature of 156° C. was employed with a pressure of 100 pounds. At the end of this fourth treatment 400 grams of ethylene oxide had been added to 177 grams of resin, without any solvent present. The final product was water-soluble with a slight turbidity, and the solution foamed vigorously on shaking. The product was a non-viscous, amber colored liquid.

*Example 55b*

210 grams of resin of Example 308a were ground to a powder and mixed to a slurry with an equal weight of xylene. The resin was xylene-insoluble. 3 grams of sodium methylate were added as a catalyst. Ethylene oxide was added in 8 successive batches of 50 grams each. The time of heating varied from 5 to 10 hours for each batch, at a temperature of approximately 155° C. The material changed from a water-insoluble, xylene-insoluble, resin to a xylene-soluble and water-emulsifiable oil. The material was then removed from the autoclave and one-half of it, or 403 grams, was returned to the autoclave and treated with a further 150 grams of ethylene oxide in three portions of 50 grams each, under similar conditions of time and temperature. It was removed from the autoclave as a non-viscous, amber colored oil, which was water-emulsifiable. It had a net weight of 542 grams, ratio 1 to 3.85, and per cent xylene, 19.4.

*Example 56b*

2750 grams of the resin of Example 309a were mixed with 1600 grams of xylene and 15 grams of sodium methylate. The xylene did not dissolve the resin but was used as a dispersing medium. All ingredients were placed in an appropriate reaction vessel so that they could be mixed thoroughly and subjected to both heat and oxyalkylation at the same time. After the viscous suspension was placed in the autoclave, heat was applied gradually, with constant stirring, to bring the temperature to approximately 150° C. At this point 1120 grams of ethylene oxide were added in approximately 3 portions of about 400 grams each. The temperature was held in the range of 145° C. to 160° C. Approximately 3½ hours were required for each portion of ethylene oxide to react. Maximum pressure during the reaction was 105 pounds gauge. At this point the resin was still insoluble in xylene and showed but slight incipient hydrophile property. A second addition of ethylene oxide was made in an amount of approximately 3385 grams in seven portions of approximately 500 grams each. In this second step, the time required to add each portion varied from 2 to 5 hours. The temperature and pressure employed were the same as before. At the end of this addition, the resin had become liquid. It was not quite xylene-soluble, but probably contained some dissolved xylene. The mixture in the reaction vessel when shaken with water, showed water-dispersibility and when a sample was separated from xylene it showed even more marked solubility.

A third stage of oxyethylation was conducted in the following manner: Approximately 1400 grams more of ethylene oxide was added in three portions of about 450 grams each. During this third stage period, the pressure was somewhat less, being approximately 80 pounds per square inch. The time required varied from 1½ hour to 3 hours for each portion. The temperature employed was the same as before. The mass in the reactor became almost homogeneous and showed very pronounced foaming and water solubility or dispersibility, even in the presence of the xylene.

A fourth or final stage was conducted in the following manner: 4500 grams of ethylene oxide were added in 8 portions of approximately 550 grams each. The maximum pressure during this final stage was 120 pounds per square inch. Each portion required about 3 hours for completion of reaction. The temperature employed was the same as before. The product at the end of the reaction was homogeneous and was water-soluble without removal of xylene. The total yield was slightly less than 15,000 grams.

*Example 57b*

The resin of Example 311a was subjected to oxyethylation in the same manner as described in Example 1b, except that when 340 grams of the xylene solution were taken, they represented possibly 7 or 8 grams more of resin and 7 or 8 grams less of xylene than the exact fifty-fifty mixture described under the heading of Example 1b.

*Example 58b*

135 grams of the resin solution of Example 312a, representing 73.5 grams of resin and 61.5 grams of xylene were mixed with 1.14 grams of sodium methylate. The mixture was placed in a laboratory autoclave and 100 grams of ethylene oxide added. The mixture was then raised to 130° C. and held at this temperature about 6 hours. The maximum pressure was 100 pounds per square inch, gauge pressure. At the end of this time the reaction mass was somewhat emulsifiable and was a non-viscous liquid. Another 100 grams of ethylene oxide were added and heated again for seven hours, using a temperature of 120° C., and a maximum pressure of 140° C. At the end of this period of time the mixture was even more liquid and was almost clearly water-soluble. A third 100 grams of ethylene oxide were added, the temperature employed being 130° C. and the maximum pressure about 170 pounds per square inch. The time required to react the ethylene oxide was 5¾ hours. The final product showed a tendency toward stringiness and was more viscous than previously, and the solubility, if anything, was not enhanced. This indicated that the long period of reaction (total time being approximately 18 hours) was probably causing either curing or etherization to take place. We believe that the use of a high speed stirrer (300 R. P. M. instead of 200 R. P. M.) would have reduced the time of reaction in all instances to two hours or less in each of the three periods, with the result that there would have been no stringiness in the final product.

*Example 59b*

The same procedure was followed as in Example 58b, except that the resin employed was that of Example 313a, and high speed stirring was employed. The actual time of addition in each instance was 2½ hours or less. Temperature conditions were approximately the same, and pressure conditions were the same or a little less.

*Example 60b*

The resin employed was that of Example 314a, and the procedure that of Example 59b.

*Example 61b*

The resin employed was that of Example 315a and the procedure that of Example 59b.

*Example 62b*

The resin of Example 344a was subjected to oxyalkylation in the following manner:

4720 grams, including the 25% xylene added, were mixed with 20 grams of sodium methylate and subjected to oxyethylation by treating with four portions of ethylene oxide weighing 800 grams each, or a total of 3200 grams. In the addition of all four batches, the temperature employed was 150° C. and the pressure 130 pounds per square inch gauge pressure. It required four hours to add the first two batches and 12 hours to add the second two. The material was water-miscible but not absolutely soluble since there was a very minor portion which seemed to settle out slowly. The appearance of the material was amber, with a moderate viscosity. It had a very repugnant odor, probably due to the sulfur chloride used in preparing it.

*Example 63b*

2000 grams of the resin of Example 345a (practically solvent-free) were mixed with 1000 grams of xylene and 40 grams of sodium methylate. The total amount of ethylene oxide employed was 3000 grams, added in six batches of 500 grams each. In the first batch, the time required to add the ethylene oxide was three hours. The temperature was 140° C. and the pressure was 102 pounds per square inch gauge pressure. At the end of this period, the product was still water-insoluble and not particularly viscous. The second batch required seven hours to add, the temperature employed was 140° C. and the pressure 128 pounds per square inch. At the end of this period, the product began to show definite emulsifiability in water. The third batch required ten hours for addition, the temperature was 160° C., and the pressure 130 pounds per square inch. After the addition of the third batch of ethylene oxide, 10 grams more of sodium methylate were added as a catalyst. During the last three batches, the addition was more rapid, 2½ hours being required to add the ethylene oxide. The temperature varied from about 143° to 160° C. The pressure varied from as little as 87 to 130 pounds. The final product was readily water emulsifiable, did not give an entirely clear solution, and had a somewhat offensive odor.

*Example 64b*

2000 grams of an amylphenol sulfide resin were dissolved into 2000 grams of xylene and 40 grams of sodium methylate were added. The total amount of ethylene oxide added was 4000 grams in four batches of 1000 grams each. The time required to add the first batch was 14 hours. The temperature was 160° C. and the pressure was 150 pounds gauge pressure. The product was a deep amber-colored oil which was water-emulsifiable. The second batch was added under practically the same conditions as the first batch. The emulsifiability of the product was increased just slightly over that resulting from the addition of the first batch of ethylene oxide. It required five hours to add the third batch of ethylene oxide and four hours to add the last batch. The temperature during the addition of the third batch was 162° C. and, during the last batch, 150° C. The pressure during the addition of the third batch was 140 pounds and during the last batch 110 pounds. The final product was a non-viscous, deep amber-colored liquid which was water-emulsifiable. The solubility had not increased largely over the addition of the second batch.

*Example 65b*

2000 grams of a butylphenol-acetylene resin (Koresin) were dissolved in 2000 grams of xylene. 40 grams of sodium methylate were added. The oxyalkylation procedure was the same as described previously. The total amount of ethylene oxide added was approximately 5000 grams in five additions of 1000 grams each. In each case, the time required to add the ethylene oxide was about 4½ hours, the temperature of addition was approximately 150° C., and the gauge pressure was 130 pounds per square inch. After the addition of the second batch of ethylene oxide, the product was water-emulsifiable. After the addition of the fifth batch, the product was a completely water-soluble amber-colored oil.

*Example 66b*

290.9 grams of the resin of Example 208a were dissolved in 163.6 grams of diethyleneglycol diethylether. 6 grams of sodium methylate were added. The mixture was placed in the laboratory autoclave along with 100 grams of ethylene oxide and subjected to stirring for 5 hours at a temperature of 130° C. The maximum pressure during this period was 65 pounds. At the end of this period the product showed a distinct tendency to become water-emulsifiable. 100 more grams of ethylene oxide were added and the mixture heated for 2 hours at 142° C. with constant stirring. The maximum pressure during this period was 75 pounds per square inch, gauge pressure. At the end of this period the product was becoming soluble. Another 100 grams of ethylene oxide were added and reacted in a third period of two hours' time, at a maximum temperature of 150° C., and a maximum pressure of 110 pounds gauge. The final product obtained was a water-soluble, non-viscous, amber colored resin.

*Example 67b*

4085 grams of the xylene solution of the resin obtained in Example 351a were mixed with an additional 2500 grams of xylene and with 40 grams of sodium methylate. The amount of ethylene oxide added was 9000 grams of which 5000 grams were added in five portions of 1000 grams each. During these additions the operating conditions were as follows: The time required for addition was 4 to 6 hours; the maximum temperature was 166° C.; the maximum pressure was 130 pounds per square inch. At the end of this addition of 5000 grams the material was a nonviscous, light amber colored oil, giving a milky solution with water. This material was then treated with another 4000 grams of ethylene oxide under substantially the same conditions. The resultant product was rather peculiar in that it was almost semi-rubbery or sub-rubbery in consistency, giving a substantially clear solution in water which foamed moderately on shaking.

*Example 68b*

The resin employed was the Acrolite of Example 352a. The resin was employed without dilution with a solvent. Incidentally, this resin was xylene-soluble. 4000 grams of the resin were mixed with 40 grams of sodium methylate and treated with 5000 grams of ethylene oxide in five portions of 1000 grams each. The operating conditions were as follows: The time required to add each batch was 6½ hours; the maximum temperature was 180° C.; the maximum gauge pressure was 160 pounds per square inch. At the end of this time the material was water-soluble in dilute solution but slightly cloudy in concentrated solution. It was rather a nonviscous oil, notwithstanding the fact that no solvent was present.

*Example 69b*

1500 grams of the resin of Example 353a, containing some xylene as indicated in the description of the manufacture of the resin itself, were mixed with an additional 1500 grams of xylene. Then to this mixture there were added 30 grams of sodium methylate. The total amount of ethylene oxide added was 3000 grams. Initially there were used four batches of 500 grams each. During these additions, the operating conditions were as follows: The time required to add each batch was 6 hours; the maximum temperature was 162° C.; the maximum gauge pressure was 148 pounds per square inch. At this point, that is after the addition of 2000 grams of ethylene oxide, the material had changed from a water-insoluble liquid to a water-miscible oil. Subsequently there were added two more batches of 500 grams each. The operating conditions were substantially the same as in the previous batches. At this point the material was a rather thin, oily substituent, giving a perfectly clear solution in water notwithstanding the fact that it contained 25% of xylene.

*Example 70b*

The resin employed was the adduct resin of Example 354a. This resin as prepared contained some xylene in solution. For convenience, 2500 grams of the resin were mixed with 2500 grams of additional xylene and 30 grams of sodium methylate. This mixture was treated with 5000 grams of ethylene oxide in five batches of 1000 grams each. The first batch of ethylene oxide required 2½ hours for addition with a temperature of 134° C., and a gauge pressure of 132 pounds per square inch. The product at the end of this period was water-insoluble. The second batch of ethylene oxide required 5¾ hours for addition, with a temperature of 168° C., and a pressure of 160 pounds per square inch. At this point the product gave a sort of milky solution. The third batch required 6½ hours, with a temperature of 166° C., and a pressure of 150 pounds per square inch. At the end of this addition the product was water-emulsifiable. The fourth batch required 6½ hours with a temperature of 166° C., and the pressure of 150 pounds per square inch. At the end of this time the product was almost clearly water-soluble. The last batch required 9 hours for addition, with a temperature of 160° C., and a pressure of 160 pounds per square inch. The final product was a deep amber liquid and was very water-soluble. It contained approximately 25% xylene.

*Example 71b*

To 2365 grams of the resin of Example 355a, including the xylene, there were added 1360 grams more of xylene and 46 grams of sodium methylate. The amount of ethylene oxide added was 5000 grams in five batches of 1000 grams each. The time required to add the first batch was 10 hours, with a maximum temperature of 150° C., and a gauge pressure of 120 pounds per square inch. At the end of this period of time, the product was not water-emulsifiable. The second batch required two hours at 150° C. and a pressure of 120 pounds per square inch. At the end of this period of time the product was barely water-emulsifiable. The third batch required 6 hours at a temperature of 150° C. and a pressure of 140 pounds per square inch. At the end of this period the product was water-emulsifiable. The fourth batch required seven hours at a temperature of 140° C. and 135 pounds per square inch gauge pressure. The product was a non-viscous oil which was readily water-soluble and close to complete water-solubility. The final batch of ethylene oxide required 5¾ hours at 156° C. and 95 pounds per square inch gauge pressure. The resulting product was a nonviscous, amber colored oil, completely soluble in water, notwithstanding the fact that it contained about 16% xylene.

*Example 72b*

The procedure employed was the same as that of Example 71b except that the resin used was that of Example 356a, in which amylphenol was used as a reactant instead of phenol. The ratio of added solvent, ethylene oxide added, sodium methylate added, etc., were substantially the same and the resultant product was similar as far as physical properties, solubility, etc., were concerned.

*Example 73b*

The resin employed was the phenol-urea-formaldehyde resin, described in Example 357a. The resin was heated so as to remove all the solvent. 2150 grams of this resin were mixed with 40 grams of sodium methylate and subjected to oxyalkylation with six batches of ethylene oxide, employing 1000 grams in each batch. The first batch of 1000 grams of ethylene oxide required six hours for addition, at 158° C., and 95 pounds per square inch gauge pressure. The resultant product was a light yellow and mush-like mass which was water-insoluble. The second batch of ethylene oxide required 5¼ hours with a temperature of 140° C. and 55 pounds per square inch gauge pressure. The resultant product was water-emulsifiable although it still contained some of the mush-like mass suspended in a viscous liquid. The third batch required one hour for addition at 146° C. and a pressure of 45 pounds per square inch. At the end of this time the product was water-soluble and the mush-like mass had apparently disappeared. The fourth addition required only ¾ hour at a temperature of 158° C. and 95 pounds per square inch. The mixture at this point was water-miscible and seemed to show some tendency to separate very slowly into two layers. The next batch of ethylene oxide was also added in ¾ of an hour at a temperature of 140° C., and a pressure of 55 pounds per square inch. The product still showed some tendency to separate but a sample taken during mixing showed that the total reaction mass was almost completely water-soluble in dilute solution and somewhat cloudy in a more concentrated solution. The final addition of ethylene oxide was made in fifteen minutes at a temperature of 150° C. with 65 pounds per square inch gauge pressure. The resultant product was a viscous amber colored oil, almost completely water soluble, even in a fairly concentrated solution.

*Example 74b*

The resin employed was the beta-naphthol resin of Example 211a. This resin, even though having a slight tendency toward rubberiness and not clearly soluble in xylene, was still sufficiently xylene dispersible for the purpose. 42 grams of the resin were mixed with 42 grams of xylene and 1½ grams of sodium methylate added. The mixture, together with 50 grams of ethylene oxide, were placed in an autoclave and heated to 150° C. for 12 hours. The maximum pressure during this period was 145 pounds per square inch pressure. At the end of this time the product was water-emulsifiable and was a homogeneous, deep amber colored, non-viscous liquid. 100 grams of ethylene oxide were added and the oxyethylation procedure repeated. The time and temperature were the same as in the previous treatment but the maximum pressure was never above 70 pounds. At the end of this treatment the product was more emulsifiable and had the same appearance as before. A final addition of 100 grams of ethylene oxide was made. The maximum pressure during this final addition was 190 pounds, the temperature the same as before, the time, 5 hours. The final product was water-emulsifiable to almost the stage of being clearly soluble. It was a deep amber colored liquid.

*Example 75b*

160 grams of the resin of Example 358a were dissolved in 120 grams of xylene. 3 grams of sodium methylate were added along with 50 grams of ethylene oxide. The mixture was heated in a laboratory autoclave with constant stirring. There were seven additions of ethylene oxide of 50 grams each. The following table shows the temperature, the maximum pressure during each period, and the time required to cause each 50- gram portion of ethylene oxide to react, together with the nature of the finished product:

| Batch No. | Time | Temperature | Max. pressure | Physical Appearance | Solubility |
|---|---|---|---|---|---|
| | Hours | °C. | Lbs. per sq. in. | | |
| 1 | 3½ | 145 | 120 | | Water emulsifiable. |
| 2 | 2½ | 163 | 105 | Somewhat viscous liquid | Do. |
| 3 | 2 | 147 | 115 | ___do___ | Curds out of water. |
| 4 | 2½ | 147 | 100 | Viscous amber colored liquid | Do. |
| 5 | 5 | 150 | 109 | Viscous amber colored oil | Curds out in water somewhat. |
| 6 | 6¾ | 150 | 123 | Viscous amber colored liquid | Almost water soluble. |

*Example 76b*

The resin employed was the commercial phenol styrene oxide resin described in Example 359a. 100 grams of this resin were dissolved in 100 grams of xylene and 4 grams of sodium methylate added, along with 100 grams of ethylene oxide. The mixture was reacted in an autoclave for 8 hours at a maximum pressure of approximately 140 pounds with a temperature of 150° C. The time required to complete the reaction was about 8 hours. At the end of this time the product only showed slight tendency towards being water-emulsifiable. A second addition of 100 grams of ethylene oxide was made. This required 6 hours with a temperature of 148° C. and a maximum pressure of 135 pounds. The product at this stage was a nonviscous, amber colored liquid, showing some water emulsifiability. The third addition of 100 grams of ethylene oxide was then made under substantially the same conditions as in the second. At the end of this third period the product was a light colored, nonviscous amber liquid, and clearly water emulsifiable. The fourth addition of 100 grams of ethylene oxide was made. During this period the time required was slightly less, 5 hours. The temperature and pressure conditions were substantially the same as in the two previous treatments. The product was water-emulsifiable but began to show an increase in viscosity. It was a light amber colored fluid. In fact, it even showed a slight tendency toward stringiness. For this reason, oxyethylation was stopped and the product employed as such.

*Example 77b*

The resin employed was Santolite MS, a commercially available sulfonamid-aldehyde resin described in Example 363a. The procedure employed was as follows:

An initial reaction mixture was made up of Santolite MS—500 grams; propylene oxide—66 grams; sodium methylate—1 gram, and was heated for 2¼ hours at a temperature of 150° C. (The resin is soluble in propylene oxide.) Maximum pressure was 95 pounds. After allowing it to stand for some time, the pressure dropped to 70 pounds, and on allowing to stand overnight, dropped to 40 pounds. From this point on ethylene oxide was employed as the oxyalkylation agent. The first batch of ethylene oxide added was 44½ grams, the time required to add this amount of ethylene oxide was 4 hours at 150° C. and 110 pounds. The second batch of ethylene oxide added was 57 grams under substantially the same conditions. At the end of this period, the product was water-insoluble. The third batch of ethylene oxide was 62 grams and required 3 hours at 150° C. and 92 pounds. The next batch was of the same size and required 3 hours at 150° C. and 120 pounds. A sample taken at this point showed that the product was water insoluble. The next batch of ethylene oxide added was 81½ grams. It required 3 hours at 150° C. and 125 pounds. At this point the product began to show some water miscibility. The next batch of ethylene oxide employed was 71 grams. This was added along with another gram of sodium methylate as added catalyst. This batch required 3½ hours at 150° C. and 165 pounds. The product at this point gave a cloudy solution which foamed vigorously. Subsequently six more batches of ethylene oxide totalling approximately 385 grams were added. The conditions were substantially as in the preceding examples; that is, temperature was around 145° to 150°; time of addition about 3 hours; and pressure from 95 to 137 pounds in each batch. The amount added in each batch was about 65 grams. The final product gave a semi-cloudy soluble solution or permanent sol.

*Example 78b*

The resin employed was Cibanite E, a commercially available aniline-aldehyde resin described in Example 364a. The procedure was as follows: 150 grams of Cibanite E were mixed with 250 grams of xylene. The powdered Cibanite did not dissolve in the xylene but stayed suspended due to the stirring action employed as part of the conventional oxyalkylation procedure. One gram of sodium methylate was added as a catalyst. To this mixture there was added 67 grams of ethylene oxide. The time required to add this first batch was 5 hours, the temperature 160° C. and the maximum pressure 120 pounds. A second batch of 99 grams of ethylene oxide was added in 5 hours at 160° C. and 50 pounds. At the end of this time the product was a crumbly orange colored solid which was slightly miscible with water. The third batch of ethylene oxide added was 130 grams. The time required for the addition was 5 hours, at 160° C. and 90 pounds. The appearance of the product at this point was the same as before but it was somewhat more water soluble and the solution showed considerable foam. The next batch consisted of 141 grams of ethylene oxide which was added in 8 hours at 160° C. and 125 pounds. The next batch consisted of 106 grams of ethylene oxide and required 16 hours at 160° C. and 125 pounds. When this addition was completed, the apparatus was cooled and 200 grams of xylene were added along with one gram of sodium methylate. The next batch of ethylene oxide added was 71 grams. This required 14 hours at 155° C. and 125 pounds. At this point the product was somewhat mush-like, gave a turbid solution in water which foamed on shaking. Another batch of 88 grams of ethylene oxide was added under substantially the same conditions. The crumbly mass obtained was water miscible and showed active foaming properties.

*Example 79b*

The resin used was a polymeric fatty acid-ethylene diamine resin obtained from the Department of Agriculture, Peoria, Illinois, described in Example 365a. 200 grams of this resin were mixed with 400 grams of xylene and one gram of sodium methylate. The resin did not dissolve but swelled up to a jelly-like crumbly mass. It was subjected to treatment with approximately 260 grams of ethylene oxide added in 6 portions of approximately 44 grams each. In the 6 additions approximately 2½ to 3 hours were required for each addition. The temperature employed varied from 145° to 155° C. The pressure was uniformly around 85 pounds. After the first three batches, when 132 grams of ethylene oxide had been added, the product was an amber colored liquid which was water insoluble. With the fourth batch of ethylene oxide, the product began to show water miscibility. When the fifth batch of ethylene oxide had been added, the product was readily emulsifiable. When the sixth and last batch of ethylene oxide had been added the product along with the dissolved xylene was nearly water soluble, and when a sample was subjected to evaporation to eliminate the xylene, the solvent-free product was completely water soluble.

Example 80b.

Another polymerized fatty acid-diamine resin, General Mills "Special Norelac (95–27–630)," was subjected to the same treatment. 200 grams of the Norelac was mixed with 393 grams of xylene and one gram of sodium methylate and treated with about 545 grams of ethylene oxide in 6 batches; the first 4 being approximately 65 grams each and the last two being about 120 grams each, and then with a second series of 6 batches totalling 1400 grams, approximately 200 grams per batch. In the case of the first 4 batches, the temperature varied from 150° C. to 160° C. and the pressure from 85 to 125 pounds. The first batch required 14 hours, the second 14 hours, the third 12 hours and the fourth batch 20 hours. After the fourth batch had been added, the amount of catalyst was increased by adding two more grams of sodium methylate. The fifth batch required four hours and the sixth batch required eight hours. The temperatures in these last two batches were somewhat lower, being 100° to 120° C. and the pressure varied from 80 to 100 pounds. After the addition of the second batch of ethylene oxide the product was water insoluble. After the addition of the third batch of ethylene oxide, it was water miscible but gave a cloudy emulsion. After the addition of the fourth batch solubility had increased somewhat. At the end of the sixth batch, the product showed some increased miscibility. The last series of six batches were added along with the addition of one more gram of sodium methylate as a catalyst. The last six batches of ethylene oxide were added under substantially the same operating conditions, the time for each batch of ethylene oxide being 5–8 hours with 6 hours as an average, the temperature 162°–164° C. and the pressure from 85–125 pounds. The final product was substantially water-soluble with only the merest suggestion of turbidity. The product itself was a light amber colored non-viscous oil.

Example 81b 720 grams of the resin of Example 367a, which was a thick liquid when heated on a steam bath, was mixed with 5 grams of sodium methylate and subjected to oxyethylation without further dilution. The procedure was the same as in Example 1a. The total amount of ethylene oxide added was 1550 grams added in 4 batches. The first batch added was 400 grams, the time required was 7 hours, the temperature 115° C., and the pressure 135 pounds. The second batch added was 335 grams. The operating conditions were substantially the same as in the first batch. After the addition of the second batch there was a distinct tendency towards miscibility with water to give a very cloudy solution with some foaming. The third batch was 460 grams. This was added under the same conditions as before. The product gave a clear solution in water with some tendency to stratify when cooled. There was a tendency to separate into two layers, one a non-viscous deep amber colored layer which was somewhat less soluble than the non-viscous layer. It was found that the addition of 5% of diethylene glycol diethyl ether made the mass uniform. This was added and the product returned to the autoclave for one more treatment with 345 grams of ethylene oxide. The conditions under which the fourth batch of ethylene oxide was added were the same as before. The product did not show any tendency to separate and gave a very water-soluble product which was a deep amber colored liquid of uniform viscosity and showed no separation on standing.

Example 82b

The resin of Example 366a was treated with ethylene oxide in substantially the manner described in Example 81b.

Example 83b 500 grams of the resin of Example 368a were mixed with 500 grams of ethylene oxide. 7½ grams of sodium methylate were added and the mixture was subjected to oxyethylation with six successive batches of ethylene oxide approximating 500 grams per batch. The total amount of ethylene oxide added was 3000 grams and the operating conditions in each batch were about the same. The temperature was 140°–160° C., the pressure from 85–135 pounds, and the time required from four to eight hours. The product showed a tendency to emulsify after addition of the second batch and gave a solution which was very soluble after the addition of the sixth batch. The final product had a very light amber color with a light orange tint. It was a non-viscous oil.

Example 84b

Substantially the same procedure was followed as in Example 84b except that the total amount of ethylene oxide added was 2,500 grams in five batches of 500 grams each.

Example 85b

Substantially the same procedure was followed as in Example 84b except that the resin subjected to oxyethylation was that of Example 372a and the amount of ethylene oxide was increased to six parts per weight of resin and the resin was mixed with half its weight of xylene.

Example 86b 550 pounds of the product of Example 373a was mixed with ½ pound of sodium methylate and then reacted with approximately 175 pounds of ethylene oxide in three batches of 55 pounds each. The maximum pressure during the reaction was 135 pounds per square inch gauge pressure, along with a temperature of 140° C. The time of reaction required for each batch varied from 3 to 9 hours. The resinous material prior to oxyethylation had an acid number of 80 and a hydroxyl number of approximately 45. After this initial oxyethylation the product began to show some hydrophile property but did not give a permanent solution. It was then treated with approximately 200 pounds of additional ethylene oxide using about 50 pounds per batch. Each one of the four treatments required approximately 10 hours for reaction, the maximum pressure being 130 pounds and the temperature 140° to 150° C. The material at the end of the second treatment was more water miscible giving a cloudy solution which tended to separate. A third series of oxyethylations involved the addition of 220 pounds of ethylene oxide in 4 batches of 55 pounds each. The conditions of reaction were the same. The water solubility of the derivative was markedly enhanced. In a last series of oxyethylations there was added 200 pounds of ethylene oxide in 4 portions of 50 pounds each. In this series, less time was required, the ethylene oxide being absorbed in approximately 5 hours, in the same pressure range and at 155° C. The product obtained was clearly water soluble and gave an excellent and permanent solution. The appearance of the product was that of a deep amber colored non-viscous oil.

Example 87b

The same procedure was followed as in the preceding example except that the amount of ethylene oxide employed was increased by approximately ⅛. The last additions, in three batches of 45 pounds each, were made with comparative ease, requiring only about 4 hours for each addition at 155° C. and 130 pounds. The product gave a clear solution in water and its general appearance was the same as that of the product of the preceding example.

Example 88b

The same procedure was employed as in the two previous examples except that one more lot of ethylene oxide of 135 pounds, in three batches of 45 pounds each, was added under the same conditions as described in Example 87b.

Example 89b

The same procedure is applied to the resins of Examples 374a to 376a instead of the resin of Example 373a which was employed as a raw material in Examples 86b, 87b and 88b.

Example 90b

The resin of Example 377a is subjected to oxyethylation in the same manner as described in Example 1b.

Example 91b

The same procedure is followed as in Example 90b, except that the resin employed is that of Example 378a.

Example 92b

The same procedure is followed as in Example 90b, except that the resin employed is that of Example 379a.

Example 93b

The same procedure is followed as in Example 90b, except that the resin employed is that of Example 380a.

Example 94b

The same procedure is followed as in Example 90b, except that the resin employed is that of Example 381a.

Example 95b

An oxyalkylated resin is prepared following the procedure of Example 1b. Such oxyalkylated derivative is subjected to vacuum distillation to remove the aromatic solvent. The resin, while hot, is mixed with about ⅕ its weight of ethyl alcohol under a suitable condenser arrangement. To a charge to a hydrogenation autoclave of 500 grams of oxyalkylated product and 100 grams of alcohol was added 50 grams of Raney nickel. The mixture was agitated during the hydrogenation process and the time of hydrogenation was 10 hours. The temperature of hydrogenation was approximately 185° C. and the pressure 1500 pounds per square inch cold. The pressure during reaction of this type may vary with the solvent employed, rate of hydrogenation, etc., and so is somewhat difficult to predict, but invariably is moderately higher, for instance, operating at a temperature from 180 to 200° C., one may expect pressures of 1750 to 2500 pounds per square inch. The operation is complete when no more hydrogen is absorbed under these conditions. The completion of operation was followed by separation of the catalyst by hot filtration. These operating conditions are conventional and have no effect on an alcoholic product, and hydrogenolysis does not take place—merery hydrogenation. The completed product had much the same appearance as the product prior to hydrogenation.

Hydrogenation usually shows a tendency to yield a lighter colored product, and in some instances yields products which are almost water-white. After hydrogenation and removal of the catalyst, the alcohol employed as a solvent may remain in the finished product, if there is no objection, or it may be removed by distillation and the alcohol re-used. Depending on the viscosity and color of the original products, which in turn are dependent upon the resins employed as raw materials, duration of oxyalkylation, etc., the finished products vary from comparatively thick liquids to thin fluids, many having a viscosity comparable to castor oil, or blown castor oil. The actual color may vary from almost water-white to a dark amber or reddish. Many products are amber or lighter in color.

Example 96b

The same procedure is followed as in Example 95b, except that the oxyalkylated derivative subjected to hydrogenation is that of Example 5b.

Example 97b

The same procedure is followed as in Example 95b, preceding, except that the oxyalkylated derivative subjected to hydrogenation is that of Example 6b.

Example 98b

The same procedure is followed as in Example 95b, except that the oxyalkylated derivative employed is that of Example 13b.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber.

The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

The same procedure as described above has been applied to a large variety of resins of the kind described previously, and we have found that these oxyalkylated products having the required minimum hydrophile properties, are all effective for use in the process of the invention. In the series of examples represented by Examples 1b through 98b, the amount of alkylene oxide added covers the range up to about three times the weight of the initial resin. The data given in the table which follows show that many of the most effective compounds for demulsification purposes require but about one-half this amount of alkylene oxide, in particular, ethylene oxide, for example, from 150% to possibly 200% by weight. Larger amounts of ethylene oxide, for example, amounts up to six times the weight of the initial resin may be used, even though the solubility of such products may in some cases be less than the solubility of derivatives obtained with lesser amounts of alkylene oxide.

The table which follows gives data with respect to the preparation and properties of a series of oxyethylated resins which have been tested for demulsifying properties against crude oil emulsions. Each product was obtained by the oxyethylation of a product of one of Examples 1a through 381a. The tabulated data include the example number, in which the preparation of the resin is described and the resin is identified, the amount of ethylene oxide added per weight of resin, the amount and nature of the catalyst used for the oxyethylation operations, the number of steps in which the oxyethylation was carried out, the hydrophile properties not only of the final product but of intermediate products, the temperatures used in the oxyethylation steps, the maximum pressures (gauge) of the oxyethylation steps and the length of time required for each step. The technique used was that described in Example 1b.

In the table, the first column on each page gives the example number, thus identifying the resin used. Column A gives the weight of the resin solution used in grams, column B the percentage of solvent in the resin solution used, column C the per cent of alkaline catalyst (sodium methylate) based on amount of resin used in the oxyethylation. Columns $D_1$ through $H_6$ give the data with respect to the oxyethylation operations, column $D_1$ giving the maximum temperatures in degrees C., column $E_1$ the gauge pressure in pounds per square inch, column $F_1$ the number of grams of ethylene oxide added in the first addition, column $G_1$ the time required for the first addition in hours, and column $H_1$ the hydrophile properties of the product resulting from the first addition. Columns $D_2$ through $H_2$ give similar data for the second addition of ethylene oxide, columns $D_3$ through $H_3$ similar data for the third addition, etc.

| Example | Resin | | | Additions of Ethylene Oxide | | | | | | | | | |
|---|---|---|---|---|---|---|---|---|---|---|---|---|---|
| | A | B | C | First Addition | | | | | Second Addition | | | | |
| | | | | $D_1$ | $E_1$ | $F_1$ | $G_1$ | $H_1$ | $D_2$ | $E_2$ | $F_2$ | $G_2$ | $H_2$ |
| 5a | 521.6 | 50.0 | 1.92 | 166 | 95 | 129.0 | 1 | Insoluble | 160 | 100 | 54.3 | 1½ | Emulsifiable. |
| 11a | 449.4 | 36.4 | 1.75 | 146 | 110 | 100.0 | 16 | ___do___ | 160 | 155 | 100.0 | 5⅚ | Do. |
| 38a | 328.5 | 43.6 | 1.90 | 150 | 125 | 100.0 | 2½ | Emulsifiable | 152 | 125 | 100.0 | ⅚ | Do. |
| 6ba | 200.0 | 50.0 | 3.50 | 150 | 109 | 50.0 | 5 | ___do___ | 152 | 140 | 50.0 | 3¼ | Do. |
| 16a | 400.0 | 50.0 | 1.00 | 152 | 125 | 100.0 | 8 | ___do___ | 154 | 140 | 100.0 | 8 | Do. |
| 26a | 290.0 | 27.4 | 1.70 | 135 | 145 | 110.0 | 2 | Dispersible | 135 | 145 | 100.0 | 1½ | Do. |
| 28a | 297.5 | 37.8 | 2.00 | 150 | 140 | 100.0 | 1½ | ___do___ | 140 | 100 | 110.0 | ⅚ | Do. |
| 35a | 249.0 | 34.2 | 2.42 | 144 | 150 | 100.0 | 3⅔ | Emulsifiable | 146 | 170 | 100.0 | 2 | Do. |
| 50a | 291.0 | 50.0 | 2.07 | 156 | 175 | 100.0 | 5 | ___do___ | 160 | 110 | 100.0 | 5 | Do. |
| 8a | 221.8 | 48.0 | 1.73 | 138 | 110 | 50.0 | 5¾ | ___do___ | 145 | 135 | 65.0 | 7 | Do. |
| 15a | 158.0 | 36.0 | 1.98 | 150 | 140 | 50.0 | 10 | ___do___ | 110 | 125 | 50.0 | 4 | Do. |
| 4a | 217.8 | 37.6 | 1.13 | 130 | 135 | 100.0 | 6 | ___do___ | 136 | 140 | 100.0 | 9 | Becoming Soluble. |
| 20a | 149.0 | 30.0 | 3.00 | 137 | 135 | 50.0 | 3½ | ___do___ | 137 | 140 | 50.0 | 1½ | Emulsifiable. |
| 22a | 297.0 | 42.4 | 2.90 | 135 | 140 | 110.0 | 1⅚ | ___do___ | 135 | 140 | 110.0 | 1 | Almost Soluble. |
| 36a | 254.0 | 34.2 | 1.80 | 140 | 125 | 100.0 | 3 | ___do___ | 146 | 175 | 100.0 | 3¹¹⁄₁₂ | Emulsifiable. |
| 39a | 299.4 | 26.4 | 2.96 | 150 | 130 | 100.0 | 7 | Insoluble | 152 | 130 | 100.0 | 1¼ | Do. |
| 40a | 279.0 | 27.4 | 1.98 | 145 | 150 | 100.0 | 2 | Dispersible | 150 | 150 | 100.0 | 1½ | Do. |
| 41a | 310.5 | 23.8 | 1.90 | 148 | 140 | 100.0 | 4½ | ___do___ | 150 | 150 | 100.0 | 1¾ | Do. |
| 1a | 400.0 | 50.0 | 1.00 | 140 | 170 | 100.0 | 7 | Emulsifiable | 160 | 180 | 100.0 | 7 | Do. |
| 17a | 216.5 | 34.0 | 2.10 | 140 | 80 | 100.0 | 1 | ___do___ | 152 | 135 | 100.0 | 9 | Do. |
| 24a | 291.0 | 26.5 | 1.87 | 150 | 120 | 100.0 | 5 | ___do___ | 160 | 120 | 100.0 | 7 | Do. |
| 29a | 175.0 | 28.3 | 1.43 | 140 | 85 | 100.0 | 3 | Insoluble | 150 | 135 | 100.0 | 6 | Becoming Soluble. |
| 34a | 298.5 | 41.4 | 2.00 | 140 | 95 | 100.0 | 7 | Emulsifiable | 144 | 115 | 100.0 | 4 | Emulsifiable. |
| 10a | 40.0 | 42.5 | 2.00 | 150 | 100 | 50.0 | 6 | Soluble | | | | | |
| 12a | 267.0 | 37.7 | 1.81 | 150 | 140 | 100.0 | 4 | Emulsifiable | 154 | 140 | 100.0 | 5 | Do. |
| 6a | 258.5 | 46.0 | 2.14 | 150 | 80 | 100.0 | 3 | ___do___ | 150 | 100 | 100.0 | 6 | Do. |
| 27a | 338.0 | 27.2 | 1.60 | 144 | 135 | 110.0 | ⅚ | ___do___ | 148 | 100 | 100.0 | ⅚ | Do. |
| 42a | 200.0 | 50.0 | 2.00 | 115 | 104 | 50.0 | 2 | Insoluble | 130 | 95 | 50.0 | 2 | Do. |
| 44a | 200.0 | 50.0 | 2.00 | 128 | 100 | 100.0 | 3 | Emulsifiable | 146 | 90 | 100.0 | 2 | Do. |
| 9a | 377.0 | 61.0 | 2.04 | 150 | 150 | 100.0 | 2½ | Insoluble | 150 | 150 | 100.0 | 12 | Do. |
| 19a | 219.0 | 33.8 | 2.76 | 130 | 140 | 100.0 | 2½ | Emulsifiable | 132 | 150 | 100.0 | 1½ | Soluble. |
| 21a | 402.0 | 54.5 | 2.70 | 154 | 120 | 100.0 | 5 | ___do___ | 158 | 170 | 110.0 | 4⅔ | Emulsifiable. |
| 23a | 484.0 | 24.6 | 1.50 | 130 | 150 | 100.0 | 6 | ___do___ | 140 | 140 | 100.0 | 3 | Do. |
| 32a | 353.0 | 39.2 | 1.86 | 141 | 90 | 100.0 | 1 | Insoluble | 142 | 70 | 100.0 | ½ | Do. |
| 2a | 481.0 | 47.6 | 1.59 | 154 | 125 | 100.0 | 2½ | ___do___ | 160 | 90 | 100.0 | 5 | Do. |
| 13a | 283.8 | 44.0 | 1.89 | 148 | 145 | 100.0 | 6 | Emulsifiable | 146 | 105 | 100.0 | 6 | Do. |
| 14a | 400.0 | 50.0 | 2.50 | 140 | 125 | 100.0 | 24 | ___do___ | 160 | 140 | 100.0 | 24 | Do. |
| 30a | 255.0 | 29.5 | 2.20 | 144 | 160 | 100.0 | 6½ | Dispersible | 150 | 130 | 100.0 | 2½ | Do. |
| 31a | 414.0 | 35.5 | 1.87 | 150 | 130 | 100.0 | 1⅚ | ___do___ | 164 | 154 | 100.0 | ⅔ | Dispersible. |
| 33a | 277.0 | 38.6 | 1.80 | 140 | 160 | 100.0 | 9 | ___do___ | 140 | 130 | 100.0 | 3 | Emulsifiable. |
| 37a | 544.0 | 44.0 | 2.20 | 142 | 130 | 110.0 | ⅚ | Emulsifiable | 140 | 125 | 110.0 | ⅔ | Do. |

| Example | Additions of Ethylene Oxide ||||||||||
|---|---|---|---|---|---|---|---|---|---|---|
| | Third Addition ||||| Fourth Addition |||||
| | $D_3$ | $E_3$ | $F_3$ | $G_3$ | $H_3$ | $D_4$ | $E_4$ | $F_4$ | $G_4$ | $H_4$ |
| 5a | 162 | 100 | 45.0 | 3½ | Emulsifiable | 152 | 90 | 36.6 | 2¼ | Emulsifiable. |
| 11a | 160 | 155 | 100.0 | 4⅚ | ....do.... | 158 | 100 | 100.0 | 4 | Do. |
| 38a | 154 | 140 | 120.0 | ⅔ | Soluble | | | | | |
| 6a | 115 | 124 | 50.0 | 3 | Becoming Soluble | 141 | 100 | 50.0 | 2 | Soluble. |
| 16a | 166 | 110 | 100.0 | 5 | Emulsifiable | 170 | 90 | 100.0 | 4 | Do. |
| 26a | 130 | 140 | 100.0 | 1⅙ | Almost Soluble | 135 | 95 | 50.0 | 1 | Do. |
| 28a | 155 | 100 | 110.0 | ⅓ | ....do.... | 140 | 30 | 70.0 | ½ | Do. |
| 35a | 145 | 135 | 100.0 | 1⅙ | Soluble | | | | | |
| 50a | 150 | 120 | 100.0 | 5 | ....do.... | | | | | |
| 8a | 140 | 130 | 50.0 | 7 | Becoming Soluble | 134 | 127 | 50.0 | 6 | Becoming Soluble. |
| 15a | 145 | 128 | 50.0 | 3 | ....do.... | 140 | 90 | 50.0 | 2 | Soluble. |
| 4a | 140 | 150 | 100.0 | 8 | Soluble | | | | | |
| 20a | 140 | 120 | 50.0 | 17/12 | ....do.... | | | | | |
| 22a | 135 | 110 | 50.0 | 1½ | ....do.... | | | | | |
| 36a | 140 | 150 | 100.0 | 2½ | ....do.... | | | | | |
| 39a | 164 | 100 | 100.0 | ⅔ | Emulsifiable | 160 | 100 | 75.0 | ½ | Almost Soluble. |
| 40a | 150 | 150 | 100.0 | 1⅙ | Becoming Soluble | 145 | 90 | 50.0 | 1¼ | Becoming Soluble. |
| 41a | 150 | 125 | 100.0 | 1 | Emulsifiable | 154 | 125 | 100.0 | 1 | Almost Soluble. |
| 1a | 160 | 165 | 100.0 | 7 | Soluble | | | | | |
| 17a | 146 | 100 | 100.0 | 5 | Emulsifiable | 152 | 120 | 100.0 | 6 | Soluble. |
| 24a | 160 | 120 | 100.0 | 6¾ | Almost Soluble | 160 | 125 | 100.0 | 5 | Do. |
| 29a | 150 | 125 | 100.0 | 6 | Soluble | | | | | |
| 34a | 160 | 85 | 100.0 | 4 | ....do.... | | | | | |
| 12a | 150 | 165 | 100.0 | 8¾ | Almost Soluble | 150 | 85 | 100.0 | 3 | Soluble. |
| 6a | 140 | 110 | 100.0 | 5 | Soluble | | | | | |
| 27a | 150 | 100 | 100.0 | ⅔ | Becoming Soluble | 141 | 60 | 60.0 | ¾ | Almost Soluble. |
| 42a | 120 | 96 | 50.0 | 1 | Soluble | | | | | |
| 44a | 148 | 120 | 100.0 | 4¼ | ....do.... | | | | | |
| 9a | 120 | 75 | 100.0 | 1 | Emulsifiable | 148 | 80 | 100.0 | 1½ | Emulsifiable. |
| 21a | 158 | 160 | 110.0 | 4 | Soluble | | | | | |
| 23a | 135 | 152 | 100.0 | 2¾ | Emulsifiable | 135 | 140 | 110.0 | 1½ | Soluble. |
| 32a | 138 | 135 | 100.0 | 2 | Becoming Soluble | 146 | 150 | 100.0 | 1½ | Do. |
| 2a | 160 | 130 | 100.0 | 6 | Emulsifiable | 160 | 140 | 100.0 | 6 | Becoming Soluble. |
| 13a | 154 | 140 | 100.0 | 8 | ....do.... | 156 | 160 | 100.0 | 8 | Emulsifiable. |
| 14a | 160 | 100 | 100.0 | 20 | Almost Soluble | 154 | 154 | 100.0 | 20 | Soluble. |
| 30a | 148 | 180 | 100.0 | 3 | Becoming Soluble | 146 | 170 | 100.0 | 1½ | Do. |
| 31a | 158 | 120 | 100.0 | ½ | Emulsifiable | 150 | 125 | 110.0 | ½ | Almost Soluble. |
| 33a | 140 | 170 | 50.0 | 1½ | Soluble | | | | | |
| 37a | 150 | 145 | 110.0 | ⅔ | Emulsifiable | 136 | 50 | 75.0 | ½ | Soluble. |

| Example | Fifth Addition ||||| Sixth Addition |||||
|---|---|---|---|---|---|---|---|---|---|---|
| | $D_5$ | $E_5$ | $F_5$ | $G_5$ | $H_5$ | $D_6$ | $E_6$ | $F_6$ | $G_6$ | $H_6$ |
| 5a | 156 | 100 | 27 | 7 | Almost Soluble | 140 | 75 | 17 | 4 | Soluble. |
| 11a | 158 | 115 | 100 | 5 | Soluble | | | | | |
| 8a | 136 | 108 | 50 | 6 | Almost Soluble | 143 | 130 | 50 | 7 | Soluble. |
| 40a | 140 | 80 | 50.0 | 1¹¹/₁₂ | Soluble | | | | | |
| 27a | 142 | 60 | 60.0 | 7/12 | Almost Soluble | | | | | |
| 9a | 150 | 85 | 100 | 1¾ | Emulsifiable | | | | | |
| 2a | 160 | 105 | 60 | 6 | Soluble | | | | | |
| 31a | 160 | 100 | 110.0 | ½ | ....do.... | | | | | |

| Example No. | Resin ||| First Addition of Ethylene Oxide ||||| Example No. | Second Addition of Ethylene Oxide |||||
|---|---|---|---|---|---|---|---|---|---|---|---|---|---|---|
| | A | B | C | $D_1$ | $E_1$ | $F_1$ | $G_1$ | $H_1$ | | $D_2$ | $E_2$ | $F_2$ | $G_2$ | $H_2$ |
| 69a | 306.9 | 37.6 | 2.1 | 140 | 125 | 100 | 6½ | Insoluble. | 69a | 145 | 145 | 100 | 6 | Insoluble. |
| 87a | 363.0 | 46.4 | 2.1 | 150 | 130 | 100 | 6 | Do. | 87a | 150 | 155 | 100 | 4 | Do. |
| 76s | 353.6 | 27.5 | 1.2 | 146 | 90 | 100 | 6 | Do. | 76a | 150 | 130 | 100 | 13½ | Emulsifiable. |
| 79a | 375.3 | 30.0 | 1.5 | 150 | 140 | 100 | 16 | Emulsifiable. | 79a | 146 | 160 | 100 | 11¼ | Do. |
| 91a | 518.0 | 50.0 | 2.1 | 172 | 180 | 150 | 1¼ | Insoluble. | 91a | 165 | 200 | 150 | ¾ | Do. |
| 72a | 482.0 | 45.3 | 2.3 | 130 | 170 | 125 | ⅙ | Do. | 72a | 115 | 180 | 150 | ¼ | Do. |
| 70a | 468.4 | 30.4 | 1.8 | 146 | 95 | 100 | 1½ | Do. | 70a | 140 | 108 | 100 | 1½ | Insoluble. |
| 88a | 334.5 | 0.0 | 1.8 | 154 | 80 | 100 | 1¾ | Do. | 88a | 130 | 90 | 100 | 1½ | Emulsifiable. |
| 89a | 200.0 | 50.0 | 2.0 | 127 | 130 | 50 | 6 | Emulsifiable. | 89a | 127 | 119 | 50 | 2 | Do. |
| 92a | 200.0 | 50.0 | 2.0 | 156 | 130 | 100 | 6 | Do. | 92a | 156 | 120 | 100 | 7 | Do. |
| 93a | 200.0 | 50.0 | 2.0 | 150 | 122 | 50 | 3 | Do. | 93a | 135 | 105 | 50 | 2½ | Soluble. |
| 85a | 543.0 | 46.0 | 2.0 | 155 | 120 | 150 | 3¼ | Do. | 85a | 150 | 225 | 150 | 1¼ | Emulsifiable. |
| 75a | 294.9 | 39.4 | 2.2 | 140 | 80 | 150 | 1¼ | Insoluble. | 75a | 160 | 90 | 150 | ¾ | Do. |
| 74a | 426.0 | 50.0 | 2.1 | 155 | 210 | 150 | 2 | Do. | 74a | 155 | 230 | 150 | 2 | Do. |
| 73a | 304.0 | 48.5 | 1.9 | 160 | 205 | 150 | 4 | Do. | 73a | 165 | 210 | 150 | 7½ | Do. |
| 105a | 289.5 | 46.5 | 3.2 | 154 | 130 | 110 | 1½ | Emulsifiable. | 105a | 148 | 150 | 110 | 1 | Do. |
| 103a | 249.0 | 50.0 | 2.5 | 134 | 130 | 100 | 1 | Do. | 103a | 150 | 200 | 100 | 2½ | Soluble. |
| 104a | 211.2 | 50.0 | 2.9 | 140 | 150 | 100 | 2½ | Do. | 104a | 152 | 200 | 100 | ⅔ | Emulsifiable. |
| 117a | 605.0 | 19.8 | 2.5 | 160 | 105 | 100 | 1 | Insoluble. | 117a | 165 | 130 | 100 | ¾ | Insoluble. |
| 109a | 226.0 | 50.0 | 2.2 | 140 | 150 | 100 | 3¼ | Emulsifiable. | 109a | 150 | 220 | 100 | 6½ | Soluble. |
| 101a | 496.0 | 41.0 | 2.1 | 160 | 160 | 150 | 3⅙ | Do. | 101a | 160 | 230 | 150 | 3 | Emulsifiable. |
| 102a | 202.8 | 33.0 | 2.2 | 150 | 125 | 100 | 3 | Insoluble. | 102a | 156 | 190 | 100 | 5 | Do. |
| 106a | 515.0 | 50.0 | 2.1 | 156 | 180 | 160 | 4¾ | Emulsifiable. | 106a | 155 | 190 | 160 | 4 | Do. |
| 107a | 621.2 | 50.0 | 2.0 | 163 | 170 | 150 | 6 | Do. | 107a | 165 | 200 | 150 | 4½ | Do. |
| 111a | 616.0 | 50.0 | 2.0 | 160 | 170 | 150 | 2 | Do. | 111a | 155 | 150 | 150 | 1⅙ | Do. |

| Example No. | Third Addition of Ethylene Oxide | | | | |
|---|---|---|---|---|---|
| | $D_3$ | $E_3$ | $F_3$ | $G_3$ | $H_3$ |
| 69a | 146 | 125 | 100 | 6½ | Emulsifiable. |
| 87a | 152 | 125 | 100 | 2 | Do. |
| 76a | 150 | 130 | 100 | 9 | Do. |
| 79a | 160 | 170 | 100 | 10 | Do. |
| 91a | 170 | 200 | 150 | 1½ | Soluble. |
| 72a | 145 | 190 | 150 | 1½ | Do. |
| 70a | 150 | 80 | 100 | 1 | Emulsifiable. |
| 88a | 158 | 80 | 100 | 4 | Do. |
| 89a | 127 | 80 | 50 | 1 | Becoming Soluble. |
| 92a | 150 | 135 | 100 | 6 | Almost Soluble. |
| 85a | 100 | 170 | 150 | ¾ | Emulsifiable. |
| 75a | 150 | 110 | 100 | 3 | Soluble. |
| 74a | 157 | 200 | 150 | 2½ | Do. |
| 73a | 145 | 190 | 100 | ½ | Do. |
| 105a | 148 | 100 | 110 | 1 | Emulsifiable. |
| 104a | 150 | 180 | 100 | 4¾ | Almost Soluble. |
| 117a | 200 | 125 | 100 | ½ | Insoluble. |
| 101a | 163 | 180 | 150 | 1¾ | Soluble. |
| 106a | 155 | 215 | 160 | 1⅝ | Do. |
| 107a | 150 | 200 | 150 | 2¼ | Emulsifiable. |
| 111a | 150 | 115 | 150 | 1 | Do. |

| Example No. | Fourth Addition of Ethylene Oxide | | | | |
|---|---|---|---|---|---|
| | $D_4$ | $E_4$ | $F_4$ | $G_4$ | $H_4$ |
| 69a | 156 | 130 | 100 | 6 | Emulsifiable. |
| 87a | 160 | 130 | 100 | 5¼ | Almost Soluble. |
| 76a | 154 | 130 | 100 | 5 | Do. |
| 79a | 150 | 170 | 100 | 10 | Emulsifiable. |
| 70a | 150 | 100 | 100 | 1 | Becoming Soluble. |
| 88a | 160 | 80 | 100 | 4 | Almost Soluble. |
| 89a | 133 | 102 | 50 | 1½ | Becoming Soluble. |
| 92a | 150 | 140 | 100 | 3 | Soluble. |
| 85a | 155 | 190 | 150 | ¾ | Do. |
| 105a | 142 | 50 | 750 | ¾ | Almost Soluble. |
| 117a | 184 | 75 | 100 | ½ | |
| 107a | 160 | 210 | 150 | 4¼ | Soluble. |
| 111a | 150 | 90 | 150 | ½ | Do. |

| Example No. | Fifth Addition of Ethylene Oxide | | | | |
|---|---|---|---|---|---|
| | $D_5$ | $E_5$ | $F_5$ | $G_5$ | $H_5$ |
| 69a | 150 | 130 | 100 | 6½ | Soluble. |
| 87a | 164 | 95 | 100 | 5⅓ | Do. |
| 76a | 152 | 130 | 100 | 3½ | Do. |
| 79a | 156 | 130 | 100 | 9 | Almost Soluble. |
| 88a | 160 | 80 | 100 | 4 | Do. |
| 89a | 132 | 97 | 50 | 3 | Do. |
| 105a | 148 | 75 | 75 | ¾ | Sl. Less Soluble. |

| Example No. | Sixth Addition of Ethylene Oxide | | | | |
|---|---|---|---|---|---|
| | $D_6$ | $E_6$ | $F_6$ | $G_6$ | $H_6$ |
| 79a | 156 | 130 | 100 | 9 | Soluble. |
| 88a | 160 | 85 | 100 | 2 | Do. |
| 89a | 145 | 100 | 50 | 5 | Do. |
| 105a | 148 | 100 | 200 | 1½ | No change. |

| Example No. | Resin | | | First Addition of Ethylene Oxide | | | | |
|---|---|---|---|---|---|---|---|---|
| | A | B | C | $D_1$ | $E_1$ | $F_1$ | $G_1$ | $H_1$ |
| 108a | 444.0 | 50.0 | 2.0 | 155 | 160 | 150 | 3¼ | Emulsifiable. |
| 112a | 524.0 | 50.0 | 2.0 | 160 | 115 | 150 | 2 | Do. |
| 128a | 310 | 45 | 2.0 | 163 | 150 | 75 | 4 | Insoluble. |
| 129a | 310 | 45 | 2.0 | 160 | 155 | 70 | 4 | Do. |
| 130a | 310 | 45 | 2.0 | 155 | 150 | 60 | 4 | Do. |
| 150a | 426.0 | 40.8 | 2.0 | 164 | 100 | 100 | 2¼ | Do. |
| 135a | 163.8 | 70.0 | 3.0 | 140 | 150 | 100 | 4¾ | Emulsifiable. |
| 136a | 366 | 50.0 | 2.5 | 150 | 135 | 100 | 1¼ | Insoluble. |
| 137a | 822 | 72.2 | 2.5 | 160 | 160 | 150 | 1¾ | Do. |
| 138a | 661 | 64.5 | 2.6 | 162 | 150 | 150 | 1¼ | Do. |
| 133a | 584 | 50.0 | 2.5 | 170 | 150 | 100 | ½ | Do. |
| 134a | 448 | 50.0 | 2.5 | 185 | 190 | 165 | ¼ | Emulsifiable. |
| 139a | 184 | 50.0 | 2.7 | 120 | 150 | 100 | 3½ | Do. |
| 132a | 516 | 58.2 | 2.6 | 155 | 170 | 150 | 2 | Insoluble. |
| 151a | 386.2 | 24.5 | 2.0 | 154 | 95 | 100 | 1½ | Emulsifiable. |
| 144a | 562.0 | 50.0 | 1.8 | 155 | 160 | 150 | 2½ | Do. |
| 145a | 710.0 | 50.0 | 2.0 | 150 | 162 | 150 | 5⅙ | Do. |
| 142a | 542 | 50.0 | 2.0 | 155 | 150 | 150 | 1½ | Do. |
| 143a | 550 | 50.0 | 2.0 | 156 | 170 | 160 | ¾ | Do. |
| 146a | 552 | 50.0 | 2.0 | 150 | 170 | 150 | 4 | Do. |
| 147a | 544 | 50.0 | 2.0 | 170 | 175 | 100 | 1½ | Do. |
| 141a | 550 | 50.0 | 2.5 | 152 | 190 | 150 | 1¾ | Do. |
| 140a | 502 | 50.0 | 2.0 | 150 | 180 | 150 | 3¾ | Insoluble. |

| Example No. | Second Addition of Ethylene Oxide | | | | |
|---|---|---|---|---|---|
| | $D_2$ | $E_2$ | $F_2$ | $G_2$ | $H_2$ |
| 108a | 156 | 180 | 150 | 4¼ | Emulsifiable. |
| 112a | 150 | 180 | 150 | 2¼ | Almost Soluble. |
| 128a | 160 | 150 | 65 | 4 | Insoluble. |
| 129a | 155 | 150 | 60 | 4 | Do. |
| 130a | 163 | 155 | 70 | 4 | Do. |
| 150a | 160 | 135 | 100 | 3 | Emulsifiable. |
| 135a | 145 | 275 | 100 | 4¾ | Soluble. |
| 136a | 160 | 190 | 100 | 1 | Emulsifiable. |
| 137a | 145 | 170 | 150 | 1 | Do. |
| 138a | 150 | 190 | 150 | 1 | Do. |
| 133a | 196 | 150 | 100 | ½ | Do. |
| 134a | 150 | 180 | 165 | ¼ | Soluble. |
| 139a | 162 | 235 | 150 | 5¾ | Do. |
| 132a | 145 | 200 | 150 | ½ | Emulsifiable. |
| 151a | 150 | 150 | 100 | 2 | Do. |
| 144a | 155 | 225 | 150 | ⅝ | Soluble. |
| 145a | 150 | 190 | 160 | 4⅝ | Emulsifiable. |
| 142a | 152 | 180 | 150 | 2⅝ | Do. |
| 143a | 150 | 220 | 160 | 3½ | Do. |
| 146a | 150 | 200 | 150 | ½ | Do. |
| 147a | 210 | 165 | 100 | ¼ | Do. |
| 141a | 150 | 210 | 150 | 1¾ | Do. |
| 140a | 155 | 205 | 150 | 1¾ | Do. |

| Example No. | Third Addition of Ethylene Oxide | | | | |
|---|---|---|---|---|---|
| | $D_3$ | $E_3$ | $F_3$ | $G_3$ | $H_3$ |
| 108a | 158 | 185 | 150 | 1 | Soluble. |
| 112a | 155 | 90 | 100 | ½ | Do. |
| 128a | 158 | 150 | 55 | 4 | Emulsifiable. |
| 129a | 160 | 155 | 55 | 4 | Do. |
| 130a | 155 | 150 | 55 | 4 | Do. |
| 136a | 160 | 115 | 100 | 2½ | Soluble. |
| 137a | 160 | 210 | 160 | 1¼ | Emulsifiable. |
| 138a | 155 | 190 | 160 | ½ | Do. |
| 133a | 185 | 165 | 110 | ½ | Do. |
| 132a | 158 | 200 | 150 | 3½ | Almost Soluble. |
| 151a | 160 | 170 | 100 | 4¾ | Emulsifiable. |
| 145a | 155 | 180 | 150 | 3½ | Becoming Soluble. |
| 142a | 155 | 185 | 150 | 1½ | Soluble. |
| 143a | 150 | 170 | 160 | 3½ | Do. |
| 146a | 165 | 255 | 150 | 3⅝ | Do. |
| 147a | 194 | 120 | 100 | ¼ | Do. |
| 141a | 150 | 200 | 150 | 2 | Do. |
| 140a | 148 | 190 | 150 | 1 | Emulsifiable. |

| Example No. | Fourth Addition of Ethylene Oxide | | | | |
|---|---|---|---|---|---|
| | $D_4$ | $E_4$ | $F_4$ | $G_4$ | $H_4$ |
| 128a | 155 | 150 | 75 | 4 | Emulsifiable. |
| 129a | 160 | 155 | 75 | 4 | Do. |
| 130a | 165 | 155 | 75 | 4 | Do. |
| 137a | 155 | 165 | 160 | 2¾ | Do. |
| 138a | 155 | 180 | 160 | ⅝ | Do. |
| 133a | 182 | 150 | 110 | ¼ | Do. |
| 151a | 158 | 150 | 100 | 6 | Soluble. |
| 145a | 150 | 150 | 150 | 2½ | Do. |
| 140a | 150 | 200 | 100 | 1¾ | Do. |

| Example No. | Fifth Addition of Ethylene Oxide | | | | |
|---|---|---|---|---|---|
| | $D_5$ | $E_5$ | $F_5$ | $G_5$ | $H_5$ |
| 128a | 155 | 150 | 65 | 4 | Emulsifiable. |
| 129a | 160 | 155 | 65 | 4 | Do. |
| 130a | 158 | 155 | 65 | 4 | Do. |
| 137a | 155 | 150 | 150 | 1 | Do. |
| 133a | 180 | 150 | 110 | ½ | Do. |

| Example No. | Sixth Addition of Ethylene Oxide | | | | |
|---|---|---|---|---|---|
| | $D_6$ | $E_6$ | $F_6$ | $G_6$ | $H_6$ |
| 128a | 163 | 150 | 75 | 4 | Emulsifiable. |
| 129a | 160 | 155 | 75 | 4 | Do. |
| 130a | 155 | 150 | 75 | 4 | Do. |
| 137a | 150 | 150 | 150 | 1½ | Soluble. |
| 133a | 180 | 130 | 110 | ½ | Do. |

| Example No. | Resin | | | First Addition of Ethylene Oxide | | | | |
|---|---|---|---|---|---|---|---|---|
| | A | B | C | $D_1$ | $E_1$ | $F_1$ | $G_1$ | $H_1$ |
| 148a | 387.4 | 17.9 | 2.0 | 160 | 170 | 100 | 3½ | Emulsifiable. |
| 149a | 755.0 | 39.8 | 2.0 | 150 | 160 | 150 | 1½ | Insoluble. |
| 161a | 354.0 | 32.0 | 2.1 | 150 | 130 | 100 | 6 | Do. |
| 169a | 576.0 | 50.0 | 2.4 | 158 | 190 | 150 | ¼ | Do. |
| 168a | 532.0 | 50.0 | 2.0 | 155 | 170 | 150 | 2 | Do. |
| 162a | 468.7 | 33.2 | 2.0 | 150 | 115 | 50 | 7 | Do. |
| 164a | 231.0 | 30.3 | 2.0 | 140 | 93 | 50 | 2½ | Do. |
| 167a | 504.0 | 37.4 | 2.0 | 146 | 120 | 100 | 2¼ | Do. |
| 160a | 506.0 | 55.0 | 2.6 | 180 | 180 | 170 | ⅓ | Emulsifiable. |
| 170a | 654.0 | 50.0 | 3.1 | 155 | 170 | 150 | 1 | Do. |
| 174a | 369.4 | 22.6 | 2.1 | 150 | 125 | 100 | 2½ | Do. |
| 175a | 353.0 | 20.5 | 2.1 | 160 | 150 | 100 | 5 | Do. |
| 176a | 430.9 | 19.6 | 1.8 | 140 | 120 | 100 | 3½ | Do. |
| 173a | 680.0 | 44.0 | 2.1 | 150 | 160 | 150 | 2 | Do. |
| 178a | 332.3 | 17.0 | 2.0 | 150 | 100 | 50 | 2 | Insoluble. |
| 179a | 349.0 | 28.0 | 2.0 | 160 | 135 | 50 | 7 | Emulsifiable. |
| 180a | 334.5 | 16.3 | 2.0 | 160 | 145 | 100 | 2½ | Do. |
| 177a | 337.9 | 15.7 | 1.8 | 110 | 190 | 100 | ½ | Insoluble. |
| 181a | 717.0 | 42.0 | 2.2 | 150 | 180 | 160 | 1 | Do. |
| 182a | 726.0 | 50.0 | 2.0 | 155 | 180 | 150 | 2 | Do. |
| 183a | 755.0 | 39.8 | 2.2 | 145 | 170 | 150 | ¼ | Do. |
| 184a | 865.0 | 34.8 | 2.1 | 150 | 150 | 150 | ½ | Do. |
| 200a | 445.0 | 44.2 | 0.8 | 150 | 137 | 50 | 4 | Do. |
| 201a | 342.0 | 41.6 | 2.0 | 160 | 103 | 50 | 2 | Do. |
| 202a | 512.0 | 47.5 | 2.0 | 76 | 75 | 100 | 1½ | Do. |

| Example No. | Second Addition of Ethylene Oxide | | | | |
|---|---|---|---|---|---|
| | $D_2$ | $E_2$ | $F_2$ | $G_2$ | $H_2$ |
| 148a | 156 | 180 | 100 | 3 | Emulsifiable. |
| 149a | 150 | 150 | 150 | 1¾ | Do. |
| 161a | 150 | 130 | 100 | 6 | Insoluble. |
| 169a | 150 | 220 | 150 | 2 | Emulsifiable. |
| 168a | 140 | 180 | 150 | 2¾ | Insoluble. |
| 162a | 155 | 122 | 50 | 3½ | Do. |
| 164a | 142 | 83 | 50 | 2 | Emulsifiable. |
| 167a | 158 | 110 | 100 | 2½ | Insoluble. |
| 160a | 175 | 220 | 170 | ⅓ | Soluble. |
| 170a | 155 | 180 | 125 | 1 | Emulsifiable. |
| 174a | 160 | 165 | 100 | 5 | Do. |
| 175a | 156 | 155 | 100 | 7 | Do. |
| 176a | 152 | 140 | 100 | 5 | Do. |
| 173a | 162 | 200 | 150 | 1½ | Do. |
| 178a | 150 | 85 | 50 | 1 | Do. |
| 179a | 162 | 137 | 50 | 5 | Do. |
| 180a | 162 | 175 | 100 | 6 | Do. |
| 177a | 120 | 60 | 100 | ½ | Insoluble. |
| 181a | 155 | 210 | 160 | 1 | Do. |
| 182a | 155 | 170 | 150 | 1¾ | Emulsifiable. |
| 183a | 145 | 150 | 150 | ⅙ | Insoluble. |
| 184a | 140 | 150 | 150 | ½ | Do. |
| 200a | 150 | 131 | 70 | 2½ | Do. |
| 201a | 150 | 111 | 50 | 2 | Emulsifiable. |
| 202a | 164 | 90 | 100 | 1½ | Do. |

| Example No. | Third Addition of Ethylene Oxide | | | | |
|---|---|---|---|---|---|
| | $D_3$ | $E_3$ | $F_3$ | $G_3$ | $H_3$ |
| 148a | 160 | 155 | 100 | 3½ | Emulsifiable. |
| 149a | 145 | 170 | 150 | ¼ | Do. |
| 161a | 152 | 105 | 100 | 5 | Do. |
| 169a | 160 | 200 | 150 | 1¼ | Soluble. |
| 168a | 150 | 200 | 150 | 3 | Emulsifiable. |
| 162a | 155 | 130 | 50 | 3½ | Insoluble. |
| 164a | 135 | 96 | 50 | 2 | Emulsifiable. |
| 167a | 160 | 170 | 100 | 2½ | Do. |
| 170a | 155 | 200 | 150 | 1½ | Soluble. |
| 174a | 160 | 165 | 100 | 1¼ | Becoming Soluble. |
| 175a | 150 | 170 | 100 | 9 | Do. |
| 176a | 155 | 105 | 100 | 4 | Emulsifiable. |
| 173a | 162 | 190 | 150 | 1 | Do. |
| 178a | 150 | 80 | 50 | ¾ | Do. |
| 179a | 150 | 140 | 50 | 11¼ | Do. |
| 180a | 162 | 180 | 100 | 6 | Do. |
| 177a | 150 | 75 | 100 | 1 | Insoluble. |
| 181a | 155 | 170 | 160 | ⅚ | Emulsifiable. |
| 182a | 150 | 175 | 150 | 1 | Do. |
| 183a | 150 | 150 | 160 | ¼ | Do. |
| 184a | 160 | 150 | 150 | ⅓ | Do. |
| 200a | 150 | 129 | 50 | 2 | Do. |
| 201a | 148 | 140 | 50 | 1¾ | Do. |
| 202a | 140 | 150 | 100 | 1½ | Do. |

| Example No. | Fourth Addition of Ethylene Oxide | | | | |
|---|---|---|---|---|---|
| | $D_4$ | $E_4$ | $F_4$ | $G_4$ | $H_4$ |
| 148a | 154 | 125 | 100 | 3 | Emulsifiable. |
| 149a | 130 | 100 | 150 | ½ | Do. |
| 168a | 156 | 170 | 100 | 1⅙ | Soluble. |
| 162a | 150 | 116 | 50 | 5 | Insoluble. |
| 164a | 130 | 114 | 50 | 2½ | Soluble. |
| 167a | 154 | 100 | 100 | 7 | Almost Soluble. |
| 174a | 150 | 150 | 100 | 4¾ | Do. |
| 175a | 158 | 115 | 100 | 6 | Soluble. |
| 176a | 154 | 100 | 100 | 4½ | Emulsifiable. |
| 173a | 165 | 160 | 150 | 1¼ | Soluble. |
| 178a | 155 | 110 | 50 | 5 | Emulsifiable. |
| 179a | 160 | 135 | 50 | 8 | Do. |
| 180a | 160 | 160 | 100 | 6 | Soluble. |
| 177a | 150 | 95 | 100 | 1¾ | Insoluble. |
| 181a | 155 | 145 | 160 | 1⅙ | Soluble. |
| 182a | 150 | 135 | 150 | ⅓ | Almost Soluble. |
| 183a | 145 | 100 | 150 | ⅙ | Emulsifiable. |
| 184a | 155 | 130 | 150 | ⅙ | Insoluble. |
| 200a | 150 | 139 | 50 | 1¼ | Emulsifiable. |
| 201a | 160 | 140 | 50 | 4 | Do. |
| 202a | 164 | 105 | 100 | 4 | Do. |

| Example No. | Fifth Addition of Ethylene Oxide | | | | |
|---|---|---|---|---|---|
| | $D_5$ | $E_5$ | $F_5$ | $G_5$ | $H_5$ |
| 148a | 165 | 100 | 100 | 3 | Emulsifiable. |
| 149a | 145 | 110 | 150 | ⅙ | Soluble. |
| 162a | 150 | 122 | 50 | 2 | Insoluble. |
| 167a | 140 | 90 | 100 | 6 | Soluble. |
| 174a | 150 | 100 | 100 | 6 | Do. |
| 176a | 164 | 95 | 100 | 4 | Do. |
| 178a | 154 | 131 | 50 | 3½ | Emulsifiable. |
| 179a | 155 | 150 | 50 | 14 | Do. |
| 177a | 160 | 90 | 100 | 2 | Do. |
| 183a | 140 | 100 | 150 | ⅙ | Soluble. |
| 184a | 155 | 115 | 150 | ⅙ | Insoluble. |
| 200a | 150 | 140 | 50 | 1¼ | Emulsifiable. |
| 201a | 160 | 138 | 50 | 5 | Do. |
| 202a | 168 | 105 | 100 | 6 | Becoming Soluble. |

| Example No. | Sixth Addition of Ethylene Oxide | | | | |
|---|---|---|---|---|---|
| | $D_6$ | $E_6$ | $F_6$ | $G_6$ | $H_6$ |
| 148a | 166 | 120 | 200 | 6 | Soluble. |
| 162a | 150 | 139 | 200 | 5 | Almost Soluble. |
| 178a | 155 | 140 | 450 | 6 | Soluble. |
| 179a | 150 | 140 | 474 | 12 | Do. |
| 184a | 165 | 115 | 150 | ¼ | Do. |
| 200a | 158 | 108 | 50 | 1½ | Do. |
| 201a | 160 | 128 | 250 | 21 | Do. |
| 202a | 160 | 90 | 100 | 4¾ | Do. |
| 177a | 160 | 100 | 300 | 6¼ | Emulsifiable. |

| Example No. | Resin | | | First Addition of Ethylene Oxide | | | | |
|---|---|---|---|---|---|---|---|---|
| | A | B | C | $D_1$ | $E_1$ | $F_1$ | $G_1$ | $H_1$ |
| 205a | 606 | 50.0 | 2.0 | 158 | 160 | 150 | 4 | Insoluble. |
| 206a | 278 | 50.0 | 2.9 | 150 | 180 | 100 | 1¾ | Emulsifiable. |
| 204a | 424 | 50.0 | 2.5 | 150 | 170 | 150 | ⅔ | Do. |
| 195a | 200 | 50.0 | 3.0 | 162 | 88 | 50 | 4 | Do. |
| 196a | 200 | 50.0 | 2.0 | 124 | 175 | 100 | 2 | Insoluble. |
| 197a | 200 | 50.0 | 2.0 | 120 | 95 | 100 | 4 | Emulsifiable. |
| 203a | 308 | 48.0 | 0.5 | 160 | 75 | 50 | 4 | Insoluble. |
| 358a | 281 | 42.5 | 1.9 | 145 | 120 | 50 | 3½ | Emulsifiable. |
| 349a | 400 | 50.0 | 2.0 | 140 | 130 | 100 | 3¾ | Do. |
| 298a | 352 | 19.9 | 1.4 | 160 | 150 | 100 | 3 | Do. |
| 297a | 375 | 20.0 | 2.0 | 154 | 75 | 100 | 6½ | Insoluble. |
| 258a | 8,232 | 49.0 | 2.6 | 113 | 80 | 900 | ¼ | Do. |
| 259a | 400 | 50.0 | 2.5 | 156 | 120 | 100 | 20 | Do. |
| 260a | 400 | 50.0 | 2.0 | 158 | 165 | 100 | 33 | Emulsifiable. |
| 261a | 455 | 37.0 | 1.4 | 160 | 165 | 100 | 24 | Do. |
| 262a | 496 | 35.0 | 2.2 | 156 | 160 | 100 | 20 | Do. |
| 267a | 408 | 41.8 | 1.7 | 150 | 140 | 50 | 9 | Insoluble. |
| 282a | 310 | 35.0 | 2.5 | 160 | 140 | 100 | 10 | Do. |
| 288a | 264 | 36.4 | 2.4 | 158 | 110 | 50 | 7 | Emulsifiable. |
| 293a | 512 | 39.0 | 2.0 | 140 | 170 | 160 | 1 | Do. |
| 340a | 193 | 52.5 | 2.0 | 160 | 135 | 50 | 14 | Do. |
| 305a | 391 | 42.0 | 1.8 | 150 | 133 | 50 | 1¼ | Insoluble. |
| 306a | 177 | 0 | 2.3 | 150 | 95 | 100 | 1 | Do. |
| 308a | 420 | 50.0 | 1.4 | 155 | 122 | 50 | 10 | Do. |
| 289a | 313 | 39.6 | 2.0 | 160 | 150 | 100 | 7½ | Emulsifiable. |
| 327a | 266 | 36.8 | 2.1 | 155 | 139 | 50 | 12 | Insoluble. |
| 328a | 245 | 29.4 | 2.0 | 154 | 115 | 100 | 4 | Emulsifiable. |
| 329a | 254 | 28.3 | 2.0 | 154 | 105 | 100 | 4 | Do. |
| 330a | 271 | 46.0 | 2.0 | 155 | 117 | 50 | 6 | Do. |
| 331a | 239 | 16.0 | 2.0 | 144 | 145 | 100 | 13½ | Insoluble. |

| Example No. | Second Addition of Ethylene Oxide | | | | |
|---|---|---|---|---|---|
| | $D_2$ | $E_2$ | $F_2$ | $G_2$ | $H_2$ |
| 205a | 150 | 200 | 150 | 1½ | Emulsifiable. |
| 206a | 154 | 205 | 100 | 1⅚ | Almost Soluble. |
| 204a | 150 | 160 | 150 | 1¾ | Do. |
| 195a | 150 | 132 | 50 | 3 | Emulsifiable. |
| 196a | 110 | 125 | 100 | 3 | Do. |
| 197a | 94 | 120 | 100 | ¾ | Do. |
| 203a | 150 | 150 | 80 | 12 | Do. |
| 358a | 163 | 105 | 50 | 2½ | Do. |
| 349a | 150 | 105 | 100 | 4½ | Do. |
| 298a | 158 | 115 | 100 | 6 | Do. |
| 297a | 160 | 170 | 100 | 10 | Do. |
| 258a | 115 | 65 | 900 | ¾ | Insoluble. |
| 259a | 166 | 105 | 100 | 7 | Do. |
| 260a | 166 | 135 | 100 | 22 | Emulsifiable. |
| 261a | 152 | 150 | 100 | 14 | Do. |
| 262a | 160 | 165 | 100 | 48 | Do. |
| 267a | 150 | 145 | 50 | 12 | Do. |
| 282a | 160 | 185 | 100 | 6 | Do. |
| 288a | 150 | 145 | 50 | 14 | Do. |
| 293a | 155 | 185 | 160 | ¾ | Do. |
| 340a | 160 | 135 | 50 | 5½ | Do. |
| 305a | 150 | 80 | 50 | 3 | Do. |
| 306a | 150 | 190 | 100 | 2 | Do. |
| 308a | 152 | 140 | 50 | 15 | Do. |
| 289a | 156 | 170 | 100 | 8½ | Do. |
| 327a | 140 | 131 | 50 | 12½ | Do. |
| 328a | 150 | 185 | 100 | 5½ | Do. |
| 329a | 160 | 125 | 100 | 3¾ | Do. |
| 330a | 155 | 148 | 50 | 6 | Do. |
| 331a | 150 | 150 | 100 | 6¼ | Do. |

| Example No. | Third Addition of Ethylene Oxide | | | | |
|---|---|---|---|---|---|
| | $D_3$ | $E_3$ | $F_3$ | $G_3$ | $H_3$ |
| 205a | 150 | 155 | 150 | 1¾ | Emulsifiable. |
| 204a | 150 | 130 | 100 | 1⅚ | Soluble. |
| 195a | 150 | 130 | 50 | 3 | Emulsifiable. |
| 196a | 146 | 115 | 100 | 2 | Almost Soluble. |
| 197a | 120 | 55 | 100 | 2 | Becoming Soluble. |
| 203a | 146 | 140 | 80 | 10 | Emulsifiable. |
| 358a | 147 | 115 | 50 | 2 | Do. |
| 349a | 150 | 115 | 100 | 3½ | Becoming Soluble. |
| 298a | 158 | 95 | 100 | 6 | Emulsifiable. |
| 297a | 160 | 100 | 100 | 4 | Do. |
| 258a | 150 | 70 | 900 | ¼ | Do. |
| 259a | 166 | 150 | 200 | 7 | Do. |
| 260a | 166 | 160 | 100 | 22 | Do. |
| 261a | 160 | 140 | 100 | 24 | Do. |
| 262a | 162 | 165 | 100 | 6½ | Do. |
| 267a | 145 | 125 | 50 | 12 | Do. |
| 282a | 162 | 100 | 100 | 3 | Do. |
| 288a | 150 | 148 | 50 | 9 | Do. |
| 293a | 156 | 190 | 160 | 1¼ | Almost Soluble. |
| 340a | 155 | 121 | 50 | 6 | Emulsifiable. |
| 305a | 150 | 125 | 50 | 3 | Do. |
| 306a | 160 | 80 | 100 | 3 | Do. |
| 308a | 160 | 147 | 50 | 8 | Do. |
| 289a | 150 | 100 | 100 | 6 | Do. |
| 327a | 150 | 140 | 50 | 12 | Do. |
| 328a | 143 | 165 | 100 | 5 | Soluble. |
| 329a | 160 | 125 | 100 | 4 | Emulsifiable. |
| 330a | 164 | 170 | 100 | 5 | Do. |
| 331a | 152 | 115 | 100 | 6 | Soluble. |

| Example No. | Fourth Addition of Ethylene Oxide | | | | |
|---|---|---|---|---|---|
| | $D_4$ | $E_4$ | $F_4$ | $G_4$ | $H_4$ |
| 205a | 150 | 170 | 150 | 1¾ | Soluble. |
| 195a | 158 | 135 | 50 | 3½ | Emulsifiable. |
| 196a | 162 | 105 | 100 | 3½ | Soluble. |
| 197a | 134 | 80 | 100 | 2 | Becoming Soluble. |
| 203a | 158 | 165 | 80 | 12 | Emulsifiable. |
| 358a | 147 | 100 | 50 | 2½ | Do. |
| 349a | 150 | 90 | 100 | 3 | Almost Soluble. |
| 298a | 160 | 85 | 100 | 5 | Soluble. |
| 297a | 164 | 120 | 100 | 3¾ | Almost Soluble. |
| 258a | 115 | 50 | 900 | ½ | Becoming Soluble. |
| 259a | 167 | 90 | 100 | 6½ | Emulsifiable. |
| 260a | 168 | 165 | 100 | 22 | Almost Soluble. |
| 261a | 165 | 165 | 100 | 8 | Emulsifiable. |
| 262a | 146 | 150 | 100 | 6¼ | Do. |
| 267a | 150 | 90 | 50 | 7 | Do. |
| 282a | 166 | 162 | 100 | 2 | Soluble. |
| 288a | 146 | 140 | 50 | 6½ | Emulsifiable. |
| 340a | 152 | 119 | 50 | 6 | Do. |
| 305a | 140 | 140 | 50 | 3½ | Do. |
| 306a | 156 | 150 | 100 | 2 | Soluble. |
| 308a | 155 | 127 | 50 | 6 | Emulsifiable. |
| 289a | 148 | 115 | 100 | 6½ | Almost Soluble. |
| 327a | 160 | 165 | 100 | 8 | Emulsifiable. |
| 329a | 150 | 110 | 100 | 4½ | Soluble. |
| 330a | 160 | 155 | 100 | 6 | Emulsifiable. |

| Example No. | Fifth Addition of Ethylene Oxide | | | | |
|---|---|---|---|---|---|
| | $D_5$ | $E_5$ | $F_5$ | $G_5$ | $H_5$ |
| 195a | 157 | 130 | 50 | 5 | Emulsifiable. |
| 197a | 134 | 120 | 100 | 2 | Becoming Soluble. |
| 203a | 158 | 165 | 80 | 12 | Emulsifiable. |
| 358a | 150 | 109 | 50 | 5 | Do. |
| 349a | 164 | 75 | 100 | 3 | Soluble. |
| 297a | 160 | 120 | 100 | 3 | Do. |
| 258a | 117 | 250 | 900 | ½ | Almost Soluble. |
| 259a | 166 | 105 | 100 | 4 | Do. |
| 260a | 166 | 100 | 100 | 18 | Do. |
| 261a | 168 | 160 | 100 | 7 | Emulsifiable. |
| 262a | 160 | 175 | 100 | 6 | Becoming Soluble. |
| 267a | 155 | 152 | 50 | 10 | Emulsifiable. |
| 288a | 140 | 142 | 50 | 6 | Do. |
| 340a | 150 | 125 | 50 | 6½ | Do. |
| 305a | 160 | 148 | 100 | 7½ | Do. |
| 306a | 160 | 130 | 50 | 6 | Do. |
| 289a | 156 | 175 | 100 | 7 | Almost Soluble. |
| 327a | 160 | 150 | 100 | 8 | Soluble. |

| Example No. | Sixth Addition of Ethylene Oxide | | | | |
|---|---|---|---|---|---|
| | $D_6$ | $E_6$ | $F_6$ | $G_6$ | $H_6$ |
| 195a | 150 | 135 | 150 | 14 | Almost Soluble. |
| 197a | 150 | 110 | 100 | 2 | Do. |
| 203a | 160 | 160 | 240 | 30 | Do. |
| 358a | 154 | 123 | 100 | 13 | Soluble. |
| 258a | 155 | 50 | 1,350 | ½ | Do. |
| 259a | 160 | 125 | 1,000 | 18 | Almost Soluble. |
| 260a | 166 | 125 | 200 | 12 | Soluble. |
| 261a | 158 | 170 | 500 | 28 | Do. |
| 262a | 154 | 180 | 700 | 29 | Do. |
| 267a | 155 | 140 | 150 | 31 | Emulsifiable. |
| 288a | 150 | 144 | 100 | 13 | Soluble. |
| 340a | 158 | 145 | 50 | 10 | Emulsifiable. |
| 305a | 160 | 147 | 300 | 21 | Soluble. |
| 306a | 160 | 160 | 450 | 50 | Do. |

| Example No. | Resin | | | First Addition of Ethylene Oxide | | | | |
|---|---|---|---|---|---|---|---|---|
| | A | B | C | $D_1$ | $E_1$ | $F_1$ | $G_1$ | $H_1$ |
| 332a | 265 | 15.0 | 1.8 | 153 | 122 | 50 | 2 | Emulsifiable. |
| 333a | 332 | 13.0 | 2.0 | 150 | 75 | 100 | 1½ | Do. |
| 334a | 470 | 30.0 | 1.0 | 136 | 65 | 100 | 1 | Insoluble. |
| 335a | 205 | 44.0 | 2.0 | 142 | 120 | 100 | 9 | Emulsifiable. |
| 336a | 280 | 56.0 | 2.4 | 134 | 115 | 100 | 7 | Insoluble. |
| 337a | 223 | 34.0 | 2.0 | 130 | 100 | 100 | 6½ | Emulsifiable. |
| 338a | 203 | 36.0 | 1.5 | 140 | 105 | 100 | 17 | Do. |
| 339a | 183 | 51.8 | 1.9 | 156 | 143 | 50 | 15 | Do. |
| 213a | 795 | 50.0 | 0.5 | 150 | 92 | 39 | 8 | Insoluble. |
| 239a | 200 | 0 | 0.5 | 130 | 90 | 100 | 5 | Do. |
| 257a | 500 | 0 | 0.2 | 150 | 109 | 52 | 3 | Do. |
| 351a | 658 | 38.0 | 1.0 | 166 | 120 | 100 | 2½ | Do. |
| 352a | 400 | 0 | 1.0 | 158 | 160 | 100 | 6½ | Do. |
| 353a | 300 | 50.0 | 2.0 | 162 | 122 | 50 | 6 | Emulsifiable. |
| 354a | 500 | 50.0 | 1.2 | 134 | 132 | 100 | 2½ | Insoluble. |
| 355a | 372 | 36.7 | 2.0 | 150 | 120 | 100 | 10 | Do. |
| 356a | 412 | 35.0 | 2.0 | 140 | 95 | 100 | 3½ | Emulsifiable. |
| 346a | 400 | 50.0 | 2.0 | 160 | 150 | 100 | 14 | Do. |
| 344a | 472 | 25.0 | 1.2 | 150 | 100 | 80 | 3 | Insoluble. |
| 372a | 376.5 | 5.0 | 2.7 | 152 | 140 | 100 | 6 | Do. |
| 368a | 268 | 22.0 | 2.0 | 138 | 100 | 100 | 3 | Emulsifiable. |
| 370a | 584 | 31.0 | 2.0 | 150 | 100 | 50 | 6 | Insoluble. |
| 365a | 600 | 66.5 | 0.5 | 145 | 83 | 44 | 3 | Do. |
| 363a | 566.7 | 0 | 0.4 | 150 | 110 | 110 | 6¼ | Do. |
| 364a | 400 | 63 | 0.7 | 160 | 120 | 67 | 5 | Do. |
| 366a | 182.5 | 50 | 2.0 | 120 | 125 | 100 | 3 | Emulsifiable |
| 367a | 74.1 | 0 | 0.7 | 115 | 135 | 140 | 7 | Insoluble. |
| 373a | 548 | 0 | 0.2 | 140 | 100 | 53 | 2 | Do. |
| 374a | 626 | 0 | 0.2 | 150 | 45 | 50 | 2 | Do. |
| 375a | 500 | 0 | 0.1 | 142 | 115 | 50 | 3 | Emulsifiable. |

| Example No. | Second Addition of Ethylene Oxide | | | | |
|---|---|---|---|---|---|
| | D₂ | E₂ | F₂ | G₂ | H₂ |
| 332a | 155 | 120 | 50 | ¾ | Emulsifiable. |
| 333a | 150 | 110 | 100 | 3 | Do. |
| 334a | 160 | 135 | 100 | 2 | Do. |
| 335a | 146 | 175 | 100 | 12 | Soluble. |
| 336a | 136 | 148 | 100 | 6½ | Emulsifiable. |
| 337a | 140 | 80 | 100 | ½ | Do. |
| 338a | 140 | 140 | 100 | 15 | Do. |
| 339a | 150 | 145 | 50 | 14 | Do. |
| 213a | 155 | 119 | 92 | 12 | Do. |
| 239a | 146 | 130 | 75 | 10 | Do. |
| 257a | 151 | 87 | 55 | 4 | Do. |
| 351a | 156 | 115 | 100 | 4½ | Do. |
| 352a | 152 | 80 | 100 | 5 | Do. |
| 353a | 162 | 148 | 50 | 6 | Do. |
| 354a | 168 | 160 | 100 | 5¾ | Do. |
| 355a | 150 | 120 | 100 | 2 | Do. |
| 356a | 140 | 145 | 100 | 3 | Do. |
| 346a | 162 | 105 | 100 | 14 | Do. |
| 344a | 146 | 55 | 80 | 4 | Insoluble. |
| 372a | 150 | 130 | 100 | 12 | Emulsifiable. |
| 368a | 136 | 75 | 100 | 6 | Soluble. |
| 370a | 155 | 136 | 50 | 7 | Emulsifiable. |
| 365a | 155 | 85 | 44 | 2½ | Insoluble. |
| 363a | 150 | 90 | 57 | 3 | Do. |
| 364a | 160 | 50 | 99 | 5 | Do. |
| 366a | 118 | 100 | 100 | 1½ | Emulsifiable. |
| 367a | 115 | 135 | 34 | 7 | Do. |
| 373a | 140 | 110 | 49 | 3 | Insoluble. |
| 374a | 150 | 75 | 50 | 6 | Do. |
| 376a | 150 | 126 | 50 | 10 | Emulsifiable. |

| Example No. | Third Addition of Ethylene Oxide | | | | |
|---|---|---|---|---|---|
| | D₃ | E₃ | F₃ | G₃ | H₃ |
| 332a | 153 | 110 | 50 | 5 | Emulsifiable. |
| 333a | 158 | 100 | 100 | 2½ | Do. |
| 334a | 148 | 60 | 100 | 4 | Do. |
| 336a | 146 | 190 | 100 | 6 | Almost Soluble. |
| 337a | 140 | 125 | 100 | 6 | Emulsifiable. |
| 338a | 146 | 130 | 100 | 13½ | Soluble. |
| 339a | 150 | 139 | 50 | 20 | Emulsifiable. |
| 213a | 155 | 107 | 81 | 2 | Do. |
| 239a | 144 | 145 | 75 | 7 | Do. |
| 257a | 160 | 127 | 66 | 7½ | Do. |
| 351a | 154 | 130 | 100 | 4½ | Do. |
| 352a | 180 | 105 | 100 | 3 | Do. |
| 353a | 150 | 148 | 50 | 2½ | Do. |
| 354a | 166 | 150 | 100 | 6½ | Do. |
| 355a | 150 | 140 | 100 | 6 | Do. |
| 356a | 154 | 115 | 100 | 3¼ | Do. |
| 346a | 162 | 140 | 100 | 5 | Do. |
| 344a | 150 | 130 | 80 | 12 | Do. |
| 372a | 152 | 110 | 100 | 5½ | Becoming Soluble. |
| 370a | 155 | 114 | 50 | 6 | Emulsifiable. |
| 365a | 155 | 85 | 44 | 2½ | Insoluble. |
| 363a | 150 | 92 | 62 | 3 | Do. |
| 364a | 160 | 90 | 130 | 5 | Do. |
| 366a | 134 | 85 | 100 | 2 | Emulsifiable. |
| 367a | 135 | 125 | 46 | 6 | Almost Soluble. |
| 373a | 120 | 135 | 71 | 3 | Insoluble. |
| 374a | 150 | 120 | 65 | 10 | Emulsifiable. |
| 376a | 150 | 160 | 50 | 6 | Do. |

| Example No. | Fourth Addition of Ethylene Oxide | | | | |
|---|---|---|---|---|---|
| | D₄ | E₄ | F₄ | G₄ | H₄ |
| 332a | 150 | 125 | 50 | 4½ | Emulsifiable. |
| 333a | 162 | 115 | 100 | 5½ | Soluble. |
| 334a | 154 | 85 | 100 | 3 | Emulsifiable. |
| 336a | 140 | 140 | 100 | 6 | Almost Soluble. |
| 337a | 148 | 150 | 100 | 9 | Soluble. |
| 339a | 155 | 141 | 50 | 10 | Emulsifiable. |
| 213a | 160 | 110 | 80 | 4 | Do. |
| 239a | 150 | 95 | 75 | 7 | Do. |
| 257a | 160 | 119 | 57 | 6 | Do. |
| 351a | 150 | 110 | 100 | 6 | Do. |
| 352a | 162 | 85 | 100 | 4¾ | Almost Soluble. |
| 353a | 160 | 147 | 50 | 6 | Emulsifiable. |
| 354a | 166 | 150 | 100 | 6½ | Almost Soluble. |
| 355a | 140 | 135 | 100 | 7 | Emulsifiable. |
| 356a | 162 | 105 | 100 | 4½ | Almost Soluble. |
| 346a | 150 | 110 | 100 | 4½ | Emulsifiable. |
| 344a | 150 | 109 | 80 | 12 | Do. |
| 372a | 150 | 130 | 100 | 6 | Soluble. |
| 370a | 155 | 125 | 50 | 6 | Emulsifiable. |
| 365a | 150 | 85 | 44 | 2½ | Insoluble. |
| 363a | 150 | 120 | 62 | 3 | Do. |
| 364a | 160 | 125 | 141 | 8 | Emulsifiable. |
| 366a | 140 | 100 | 100 | 2½ | Do. |
| 367a | 124 | 115 | 34 | 6 | Soluble. |
| 373a | 140 | 125 | 43 | 10 | Emulsifiable. |
| 374a | 158 | 40 | 75 | 6 | Do. |
| 376a | 150 | 115 | 50 | 7 | Do. |

| Example No. | Fifth Edition of Ethylene Oxide | | | | |
|---|---|---|---|---|---|
| | D₅ | E₅ | F₅ | G₅ | H₅ |
| 332a | 150 | 132 | 50 | 3½ | Emulsifiable. |
| 334a | 160 | 70 | 100 | 4 | Do. |
| 336a | 148 | 110 | 100 | 5 | Almost Soluble. |
| 339a | 151 | 140 | 50 | 14 | Emulsifiable. |
| 213a | 160 | 104 | 81 | 3½ | Do. |
| 239a | 144 | 100 | 75 | 14 | Do. |
| 257a | 150 | 100 | 55 | 6 | Do. |
| 351a | 154 | 75 | 100 | 5 | Do. |
| 352a | 166 | 75 | 100 | 7 | Soluble. |
| 353a | 165 | 143 | 50 | 6½ | Almost Soluble. |
| 354a | 160 | 160 | 100 | 9 | Soluble. |
| 355a | 156 | 95 | 100 | 5¾ | Do. |
| 356a | 160 | 85 | 100 | 4½ | Do. |
| 344a | 164 | 105 | 80 | 10 | Emulsifiable. |
| 370a | 150 | 82 | 50 | 7 | Do. |
| 365a | 150 | 85 | 44 | 2½ | Do. |
| 363a | 150 | 125 | 82 | 3 | Do. |
| 364a | 160 | 125 | 106 | 16 | Do. |
| 366a | 126 | 85 | 100 | 2 | Do. |
| 373a | 150 | 90 | 50 | 9 | Do. |
| 374a | 160 | 95 | 75 | 5 | Do. |
| 376a | 150 | 115 | 50 | 6 | Do. |

| Example No. | Sixth Addition of Ethylene Oxide | | | | |
|---|---|---|---|---|---|
| | D₆ | E₆ | F₆ | G₆ | H₆ |
| 332a | 155 | 120 | 200 | 15 | Soluble. |
| 334a | 170 | 75 | 200 | 9 | Do. |
| 339a | 160 | 137 | 100 | 22 | Almost Soluble. |
| 213a | 150 | 107 | 135 | 7 | Soluble. |
| 239a | 160 | 135 | 300 | 38 | Emulsifiable. |
| 257a | 155 | 125 | 840 | 85 | Soluble. |
| 351a | 160 | 140 | 400 | 12½ | Almost Soluble. |
| 353a | 152 | 147 | 50 | 5 | Soluble. |
| 344a | 156 | 100 | 240 | 41 | Emulsifiable. |
| 370a | 150 | 135 | 440 | 12 | Soluble. |
| 365a | 155 | 65 | 35 | 2½ | Almost Soluble. |
| 363a | 155 | 135 | 455 | 15 | Do. |
| 364a | 160 | 110 | 159 | 28 | Emulsifiable. |
| 366a | 142 | 90 | 100 | 2½ | Almost Soluble. |
| 373a | 155 | 135 | 468 | 68 | Soluble. |
| 374a | 160 | 100 | 525 | 15 | Do. |
| 376a | 150 | 135 | 250 | 19 | Do. |

The oxyethylated products in the presence of the solvent were liquids varying in viscosity from relative mobility to a viscosity approaching that of castor oil or lightly blown vegetable oils. They varied in color from straw colored or light amber to very dark brownish or reddish colored. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

The following examples, Examples 1c–3c, are included to illustrate the technique of testing the effectiveness of the demulsifiers against oil field emulsions. It is to be understood that in the industrial use of these products, they are used in accordance with standard practices, some of which are subsequently described.

Example 1c

The demulsifier employed was the oxyalkylated derivative of the resin of Example 2a prepared from para-secondary butylphenol and formaldehyde using an acid catalyst oxyethylated with an amount of ethylene oxide equal in weight to the weight of the resin, following the procedure of Example 4b.

The oxyalkylated resin was prepared so the final product represented a 50% solution in xylene. The effectiveness of this oxyalkylated resin was examined by testing it in connection with an emulsion produced at the St. Gabriel field, St. Gabriel, Louisiana. The emulsion as produced was buff in color and contained approximately 70% to 80% B. S. & W., equivalent to 40% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than the hour, giving a clear separation. The gravity of the recovered oil was 34° A. P. I., and the B. S. & W. content was less than $\frac{1}{10}$ of 1%. In large scale use it is not necessary to get a complete resolution within an hour's time and the amount of demulsifier required would be substantially less.

*Example 2c*

The demulsifier employed was the oxyalkylated derivative of the resin of Example 3a prepared from para-tertiary amylphenol and formaldehyde, using an acid catalyst, oxyethylated with an amount of ethylene oxide equal in weight to the weight of the resin following the procedure of Example 5b.

The oxyalkylated resin was prepared so the final product represented a 50% solution in xylene. The effectiveness of this oxyalkylated resin was examined by testing it in connection with an emulsion produced at the South Houston field, South Houston, Texas. The emulsion as produced was brown in color and contained approximately 70% to 75% B. S. & W., equivalent to 37% to 38% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 28° A. P. I., and the B. S. & W. content was less than $\frac{2}{10}$ of 1%.

*Example 3c*

The demulsifier employed was the oxyalkylated derivative of the resin of Example 11a prepared from styrylphenol and formaldehyde, using an acid catalyst oxyethylated with an amount of ethylene oxide equal in weight to the weight of the resin, following the procedure of Example 9b.

The oxyalkylated resin was prepared so the final product represented a 50% solution in xylene. The effectiveness of this oxyalkylated resin was examined by testing it in connection with an emulsion produced at the Hastings field, Hastings, Texas. The emulsion produced was buff in color and contained approximately 65% to 70% B. S. & W., equivalent to 34% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 32° A. P. I., and the B. S. & W. content was less than $\frac{1}{10}$ of 1%.

Actually, in considering the ratio of alkylene oxide to add, and we have previously pointed out that this can be predetermined using laboratory tests, it is our actual preference from a practical standpoint to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows. We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, or by the use of higher molecular weight aldehydes than formaldehyde. If such resins are used, a solvent need not be added but may be added as a matter of convenience or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points as indicated in the following table:

| Percentage | Pounds of Ethylene Oxide Added per 8 pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a Du Nouy tensiometer or dropping pipette, or any other procedure for measuring inter-facial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin which will result in an insoluble rubber at the ultimate stages of oxyethylation but not in the earlier stages. In other words, with such resins addition of 2 or 3 moles of the oxyalkylating agent per structural unit, particularly ethylene oxide, gives a surface-active product which is perfectly satisfactory, while more extensive oxyethylation yields an insoluble rubber, that is, an unsuitable product.

It may be well to call attention to one result which may be noted in a long drawn-out oxyalkylation, particularly oxyethylation, which would not appear in a normally conducted reaction. Extended heating causes cross-linking with some resins, and if carried far enough, causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface active. Such material frequently is best mixed with a polar solvent, such as alcohol or the like, and preferably an alcoholic solution is used. The point which we want to make here, however, is this: Stringiness or rubberization at this stage may with some resins possibly be the result of etherification. Thus, if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus in the case of a phenol-aldehyde resin:

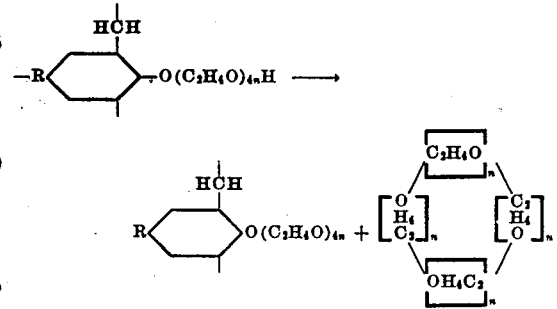

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to the reactive positions present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five structural units, each unit with a reactive hydrogen. If a minimum of two moles of ethylene oxide per structural unit are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains of ethyleneoxy units would have 5 units; there might be some having, for example, 4 and 6 units, or for that matter 3 to 7 units. Nor is there any basis for assuming that the number of molecules of the oxyalklating agent added to each of the molecules of the resin is the same, or different. Thus, where formulae are given to illustrate or depict the oxyalkylated products, distribution of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semipolar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. The increased viscosity, resinous character, and decreased solubility, etc., of the higher polymers in comparison with the dimer, frequently are all that is required to establish that the resin contains 3 or more structural units per molecule.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,00 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or subsurface- or surface-active. Such resins in turn are oxyalkylation-susceptible, water-insoluble, organic solvent-soluble, fusible resins. Based on actual large scale application in a large number of oil fields in the United States and certain foreign countries, we believe that this type of material, either as such or in the form of derivatives, will ultimately be employed in most of the chemical demulsifying agents used throughout the world.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, attention is directed to the copending application of Arthur F. Wirtel, Serial No. 8,734, filed February 16, 1948. That application contemplates, among other things, the use of a mixture comprising:

Oxyalkylated derivative, for example, the product of Example 1b, 20%;

A cyclohexylamine salt of a polypropylated naphthalene mono-sulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative rather than the resin itself. As an example of such procedure, reference is made to our co-pending applications, Serial Nos. 726,201 and 726,204, both filed February 3, 1947, both now abandoned.

We claim:

1. A process for breaking petroleum emulsions of the water-in-oil type characterized by subjecting the emulsion to the action of a demulsifier including a hydrophile oxyalkylated synthetic resin; said synthetic resin being one in which the ratio of oxyalkylene groups to structural units is at least 2 to 1 and the alkylene radicals of the oxyalkylene groups are selected from the group consisting of ethylene, propylene, butylene, hydroxy propylene and hydroxy butylene radicals.

2. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble synthetic resin; said oxyalkylated synthetic resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 1 to 20; with the proviso that at least 2 moles of alkylene oxide be introduced for each resinic structural unit.

3. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble synthetic resin; said oxyalkylated synthetic resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 1 to 20; with the proviso that at least 2 moles of alkylene oxide be introduced for each resinic structural unit; and with the final proviso that the hydrophile properties of said oxyalkylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble synthetic resin; said oxyethylated synthetic resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each resinic structural unit; and with the final proviso that the hydrophile properties of said oxyethylated resin in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble synthetic resin; said oxyethylated synthetic resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each resinic structural unit; said resin being characterized by having a hydroxyl value equivalent of at least 20; and with the final proviso that the hydrophile properties of said oxyethylated resin in an equal weight of xylene are sufficient to produce an emulsion when said xylene solution is shaken vigorously with one to three volumes of water.

6. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, non-phenolic synthetic resin; said oxyethylated synthetic resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each resinic structural unit; said resin being characterized by having a hydroxyl value equivalent of at least 20; and with the final proviso that the hydrophile properties of said oxyethylated resin in an equal weight of xylene are sufficient to produce an emulsion when said xylene solution is shaken vigorously with one to three volumes of water.

7. The process of claim 6 wherein the resin is an amine aldehyde resin.

8. The process of claim 6 wherein the resin is a polycarboxy-polyamine resin.

9. The process of claim 6 wherein the resin is a sulphonamide-formaldehyde resin.

MELVIN DE GROOTE.
BERNHARD KEISER.

REFERENCES CITED

The following references are of record in the file of this patent:

UNITED STATES PATENTS

| Number | Name | Date |
|---|---|---|
| 2,060,410 | Balle | Nov. 10, 1936 |
| 2,076,624 | De Groote | Apr. 13, 1937 |
| 2,243,330 | De Groote et al. | May 27, 1941 |
| 2,278,838 | De Groote et al. | Apr. 7, 1942 |
| 2,307,058 | Moeller | Jan. 5, 1943 |
| 2,317,726 | Boedeker et al. | Apr. 27, 1943 |
| 2,330,474 | De Groote | Sept. 28, 1943 |
| 2,385,970 | De Groote et al. | Oct. 2, 1945 |
| 2,454,541 | Bock et al. | Nov. 23, 1948 |